(12) United States Patent
Bonk

(10) Patent No.: US 6,860,562 B2
(45) Date of Patent: Mar. 1, 2005

(54) FOLD, TUMBLE, AND KNEEL SEAT ASSEMBLY

(75) Inventor: Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 10/686,049

(22) Filed: Oct. 15, 2003

(65) Prior Publication Data

US 2004/0124684 A1 Jul. 1, 2004

Related U.S. Application Data

(63) Continuation-in-part of application No. 10/288,246, filed on Nov. 5, 2002.
(60) Provisional application No. 60/507,390, filed on Sep. 30, 2003.

(51) Int. Cl.$^7$ ................................................ B60N 2/36
(52) U.S. Cl. ........................ 297/378.12; 297/378.13; 297/378.14; 297/331; 297/336
(58) Field of Search .................... 297/378.13, 344.15, 297/344.13, 331, 336, 378.14

(56) References Cited

U.S. PATENT DOCUMENTS

| | | | | |
|---|---|---|---|---|
| 3,880,464 A | * | 4/1975 | Murphy et al. | ..... 297/378.13 X |
| 4,475,769 A | * | 10/1984 | Crawford et al. | ........... 297/331 |
| 4,484,776 A | * | 11/1984 | Gokimoto et al. | .. 297/378.13 X |
| 4,636,003 A | * | 1/1987 | Siebler | ........................ 297/336 |
| 4,695,094 A | * | 9/1987 | Siebler | ........................ 297/331 |
| 4,700,989 A | * | 10/1987 | Ercilla | ........................ 297/331 |
| 4,736,985 A | * | 4/1988 | Fourrey et al. | ............. 297/331 |
| 5,765,894 A | * | 6/1998 | Okazaki et al. | ..... 297/378.13 X |
| 6,000,742 A | * | 12/1999 | Schaefer et al. | ........ 297/336 X |
| 6,220,665 B1 | * | 4/2001 | Dingel et al. | ........... 297/336 X |
| 6,375,255 B1 | * | 4/2002 | Maruta et al. | ...... 297/378.13 X |
| 6,478,358 B1 | * | 11/2002 | Okazaki et al. | ......... 297/336 X |
| 6,513,873 B2 | * | 2/2003 | Tsuda et al. | ............ 297/336 X |
| 6,520,581 B1 | * | 2/2003 | Tame | .......................... 297/336 |
| 6,523,899 B1 | * | 2/2003 | Tame | .......................... 297/331 |
| 6,595,588 B2 | * | 7/2003 | Ellerich et al. | ............. 297/331 |
| 6,655,738 B2 | * | 12/2003 | Kammerer | .................. 297/331 |

* cited by examiner

Primary Examiner—Rodney B. White
(74) Attorney, Agent, or Firm—Harness, Dickey & Pierce, P.L.C.

(57) ABSTRACT

A seat adjustment mechanism includes at least one recliner mechanism, a latch mechanism, and a kneel mechanism. The recliner mechanism serves to articulate a seatback relative to a seat while the floor latch and kneel mechanisms provide for dumping and pivoting of a seat assembly respectively. In addition, a second recliner mechanism, second floor latch mechanism, and second kneel mechanism may be provided on an opposite side of the seat assembly. A first interlock mechanism operably couples the first recliner mechanism and first latch mechanism while a second interlock mechanism couples the second recliner mechanism and second kneel mechanism. The first and second interlock mechanisms prevent the first and second recliner mechanisms from rotating to a usable position if either the first floor latch mechanism or second kneel mechanism is not securely latched.

29 Claims, 51 Drawing Sheets

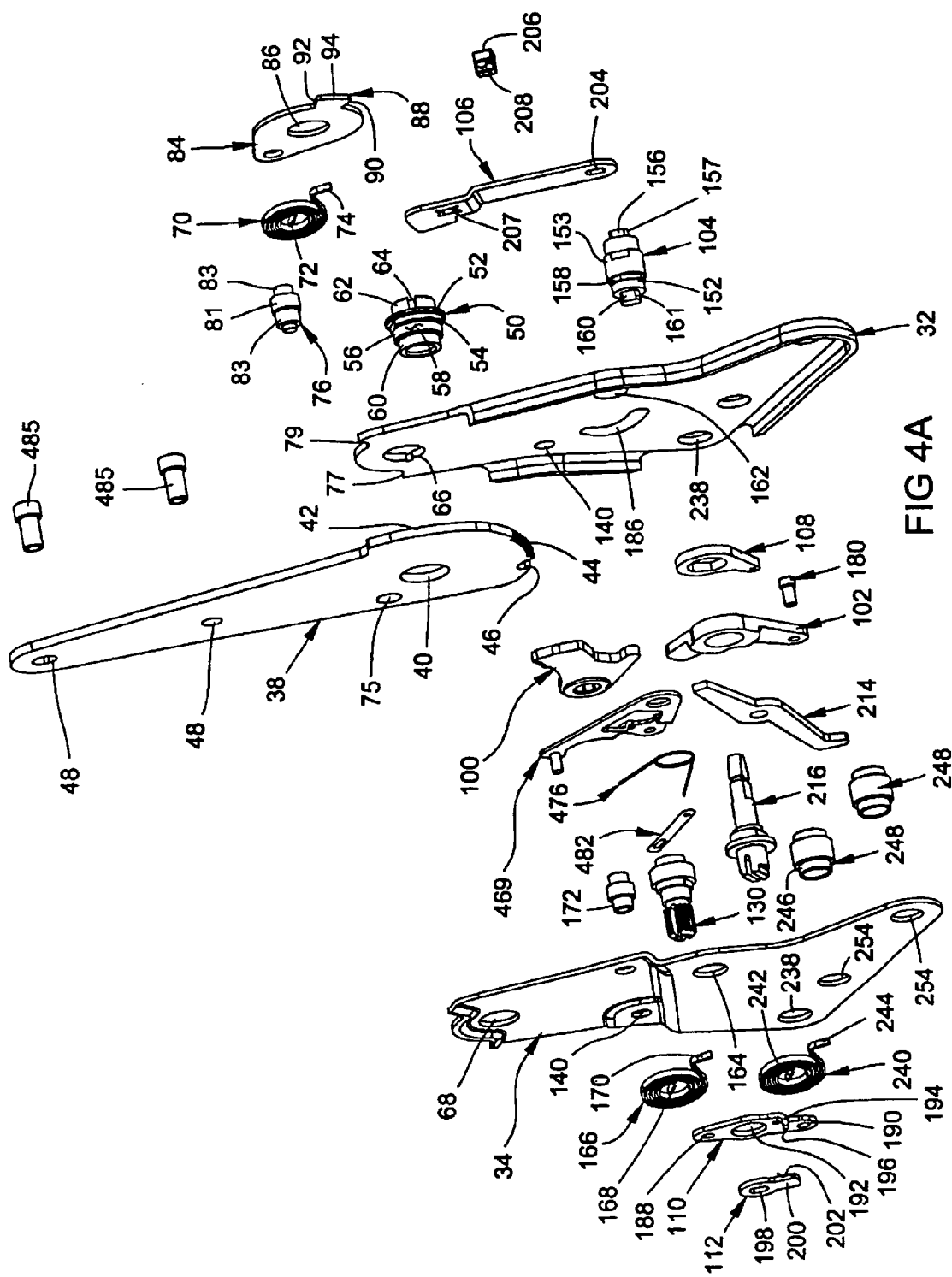

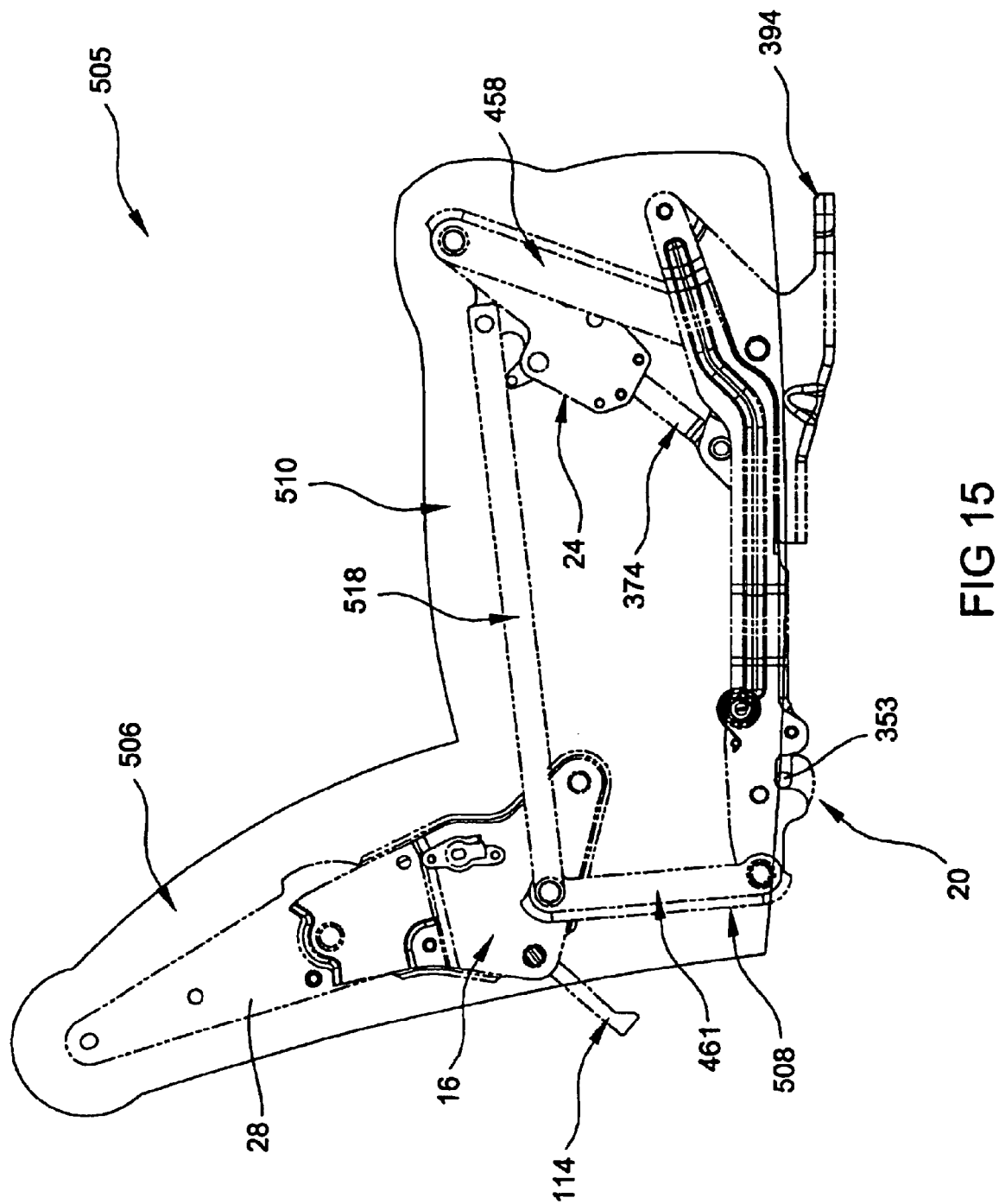

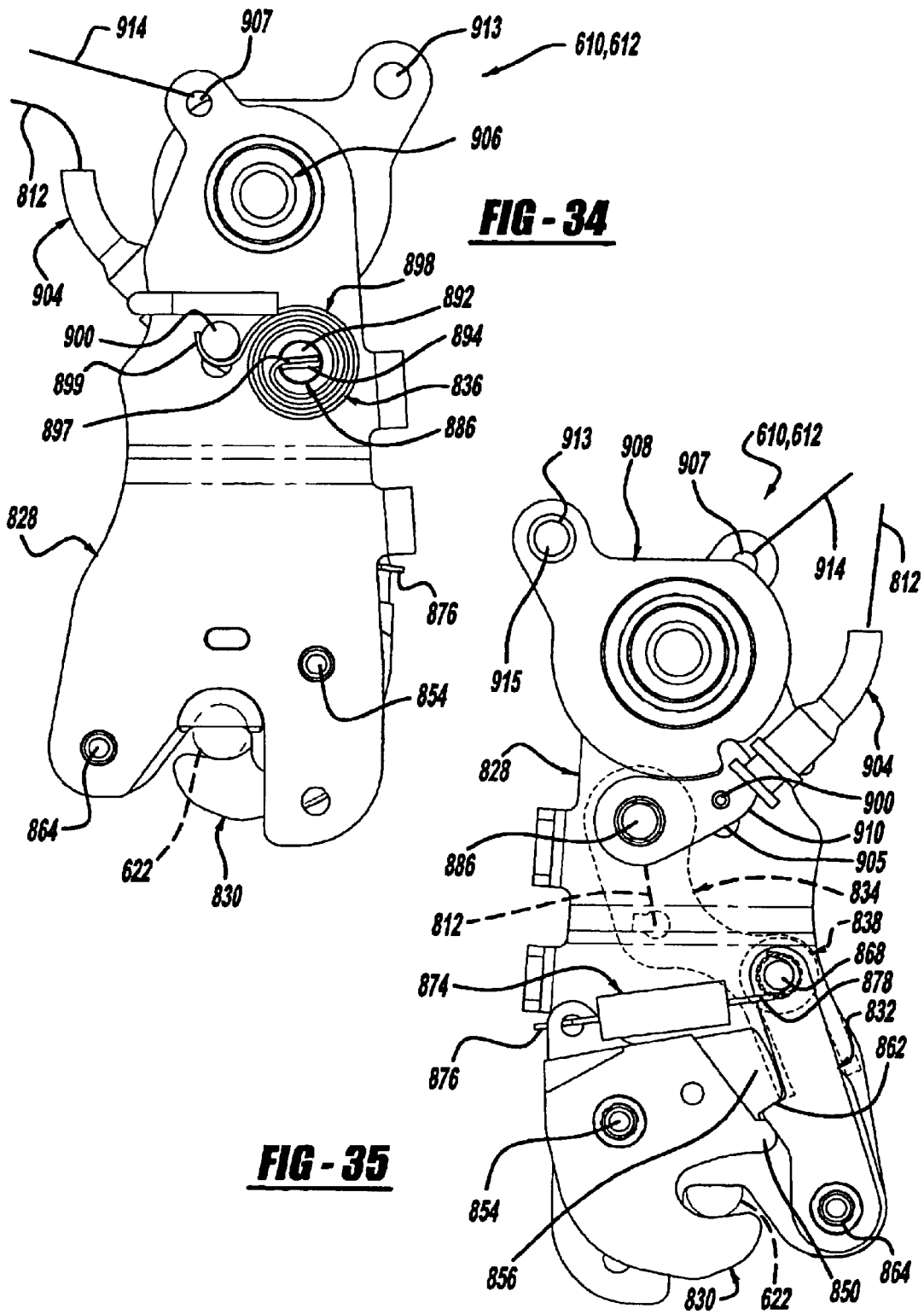

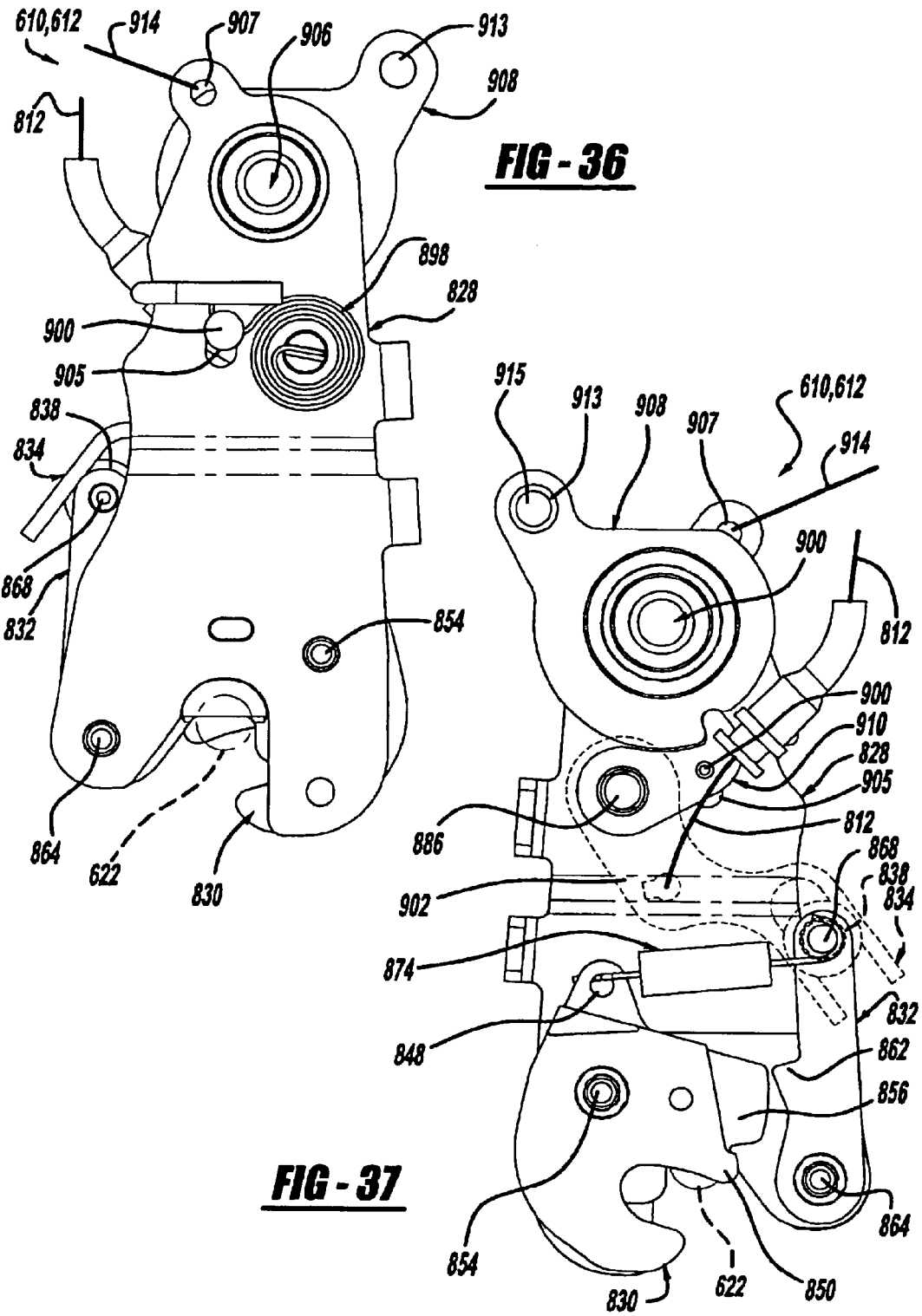

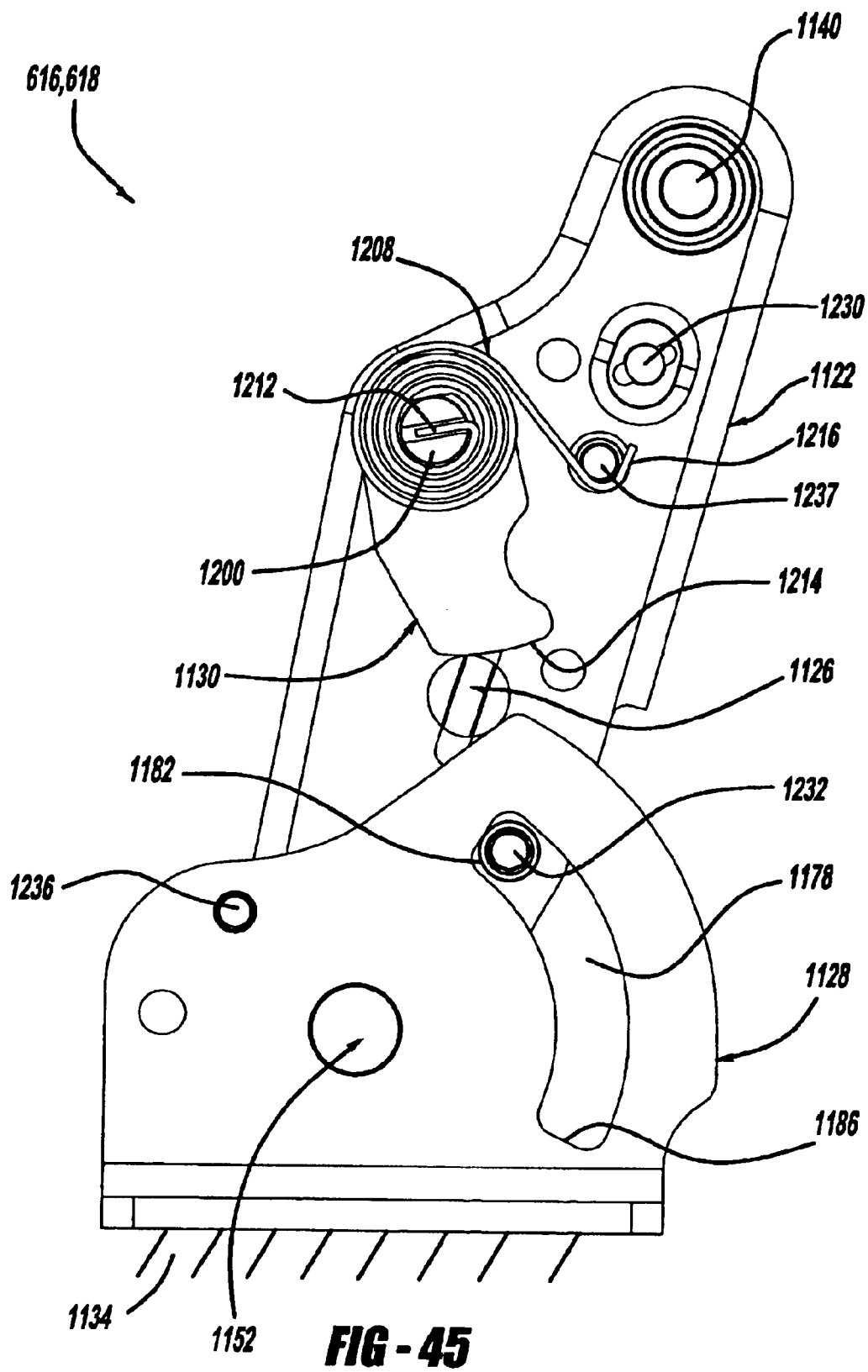

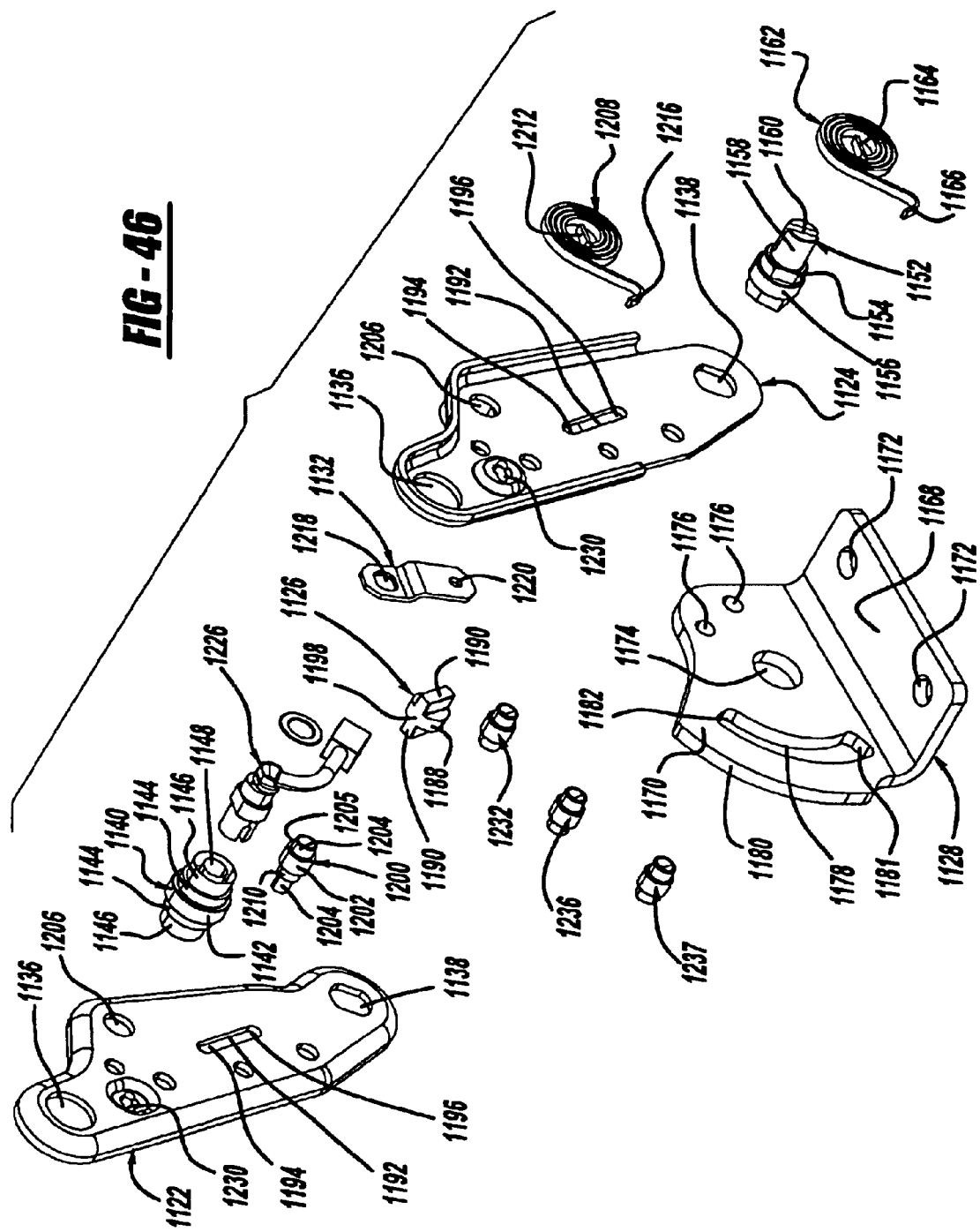

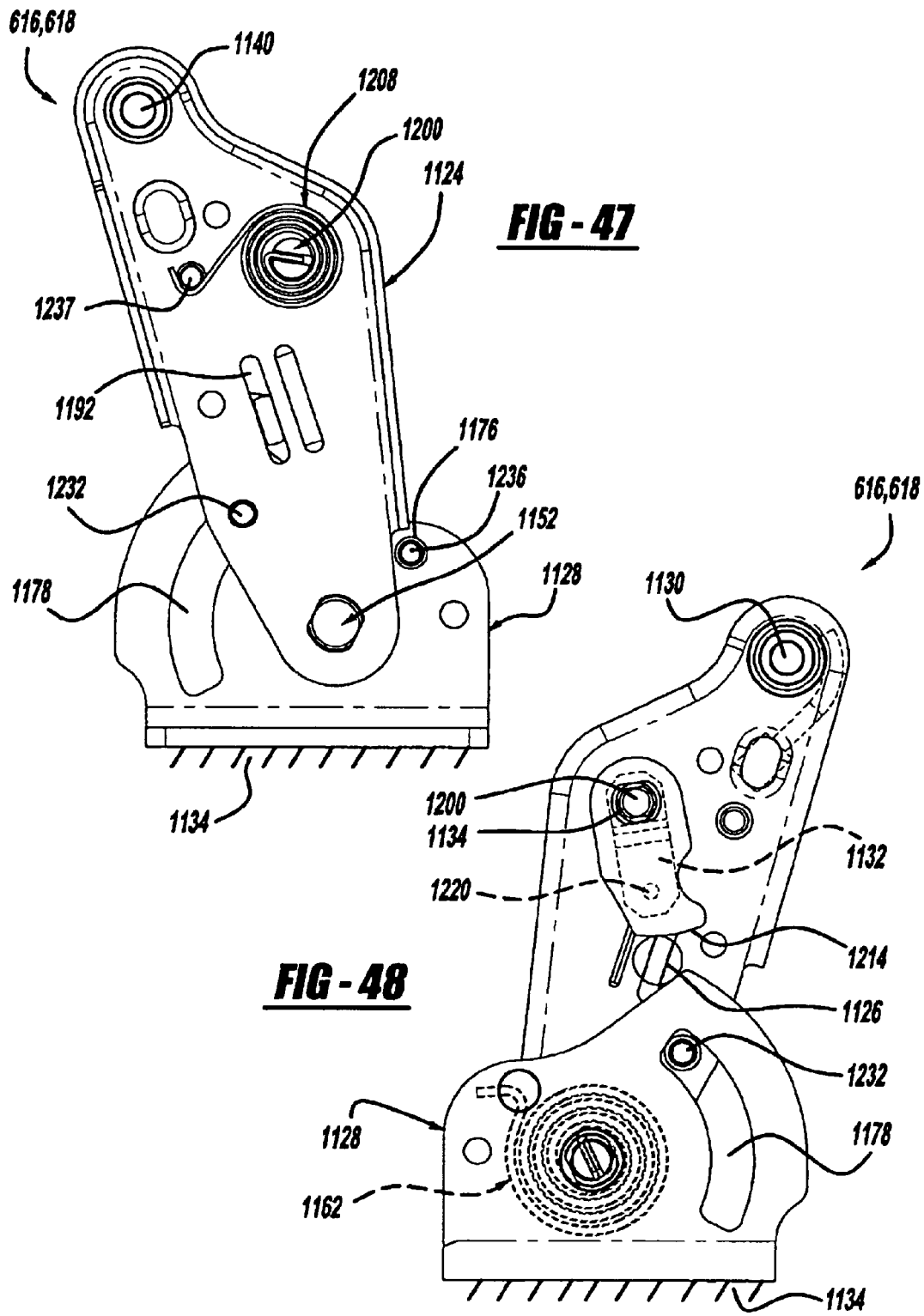

FOLD, TUMBLE, AND KNEEL SEAT ASSEMBLY

This application is a continuation-in-part of U.S. patent application Ser. No. 10/288,246, filed on Nov. 5, 2002, and claims the benefit of U.S. Provisional Application No. 60/507,390, filed on Sep. 30, 2003. The disclosures of the above applications are incorporated herein by reference.

FIELD OF THE INVENTION

The present invention relates to a seat assembly and, more particularly, to integrated recliner, floor-latch, and kneel mechanisms for a seat assembly.

BACKGROUND OF THE INVENTION

Seat assemblies, such as those used in vehicles, generally include a recliner mechanism for enabling motion of a seatback relative to a seat. Many seat assemblies include the ability of being folded about a forward pivot to provide added floor space within a vehicle or access to an otherwise obstructed space. To enable reclining and stowing operation of the seat assembly, integrated recliner and floor-latch mechanisms are traditionally provided as an assembly. The floor-latch mechanism typically extends downward from the seat for selective engagement with a floor. Generally, actuation of a lever in a first direction enables reclining motion of the seatback relative to the seat. Further actuation of the lever releases the seat assembly from engagement with the floor to enable forward pivoting of the complete seat assembly.

In addition, some seat assemblies provide the ability to further articulate a seat such that the seat assembly articulates forward to further increase the cargo area behind the seat. To enable articulation of the seat assembly a kneel mechanism is traditionally provided such that actuation of a lever in a first direction actuates the kneel mechanism to allow the seat assembly to articulate forward or "kneel" relative to its design or upright position.

Traditional seat assemblies suffer from a disadvantage that even though the seat assembly may not be properly engaged with the floor or properly engaged in an upright position, the seatback is fully actuable and positionable relative to the seat. As can be appreciated, the floor latch mechanism or kneel mechanism may appear to be fully latched when returned to a usable position when in fact either may be in an unlatched condition. This is particularly true in the case of a kneeling function because the seat assembly is not drastically out of position from its fully latched and secure position. In either situation, an occupant may falsely believe that the seat assembly is properly secured to the floor via the floor-latch mechanism or secured in the upright position via the kneel mechanism and occupy the seat.

SUMMARY OF THE INVENTION

A seat adjustment mechanism includes at least one recliner mechanism, a latch mechanism, and a kneel mechanism. In one embodiment a first recliner mechanism is in operable communication with a first latch mechanism and a first kneel mechanism. The recliner mechanism serves to articulate a seatback relative to a seat while the floor latch and kneel mechanisms provide for dumping and pivoting of a seat assembly respectively. In addition, a second recliner mechanism, second floor latch mechanism, and second kneel mechanism may be provided on an opposite side of the seat assembly from the first recliner mechanism, first floor latch mechanism, and first kneel mechanism.

A first interlock mechanism operably couples the first recliner mechanism and first latch mechanism while a second interlock mechanism couples the second recliner mechanism and second kneel mechanism. The first and second interlock mechanisms prevent the first and second recliner mechanisms from rotating to a usable position if either the first floor latch mechanism or second kneel mechanism is not securely latched. Further, the first and second recliner mechanisms, first and second floor latch mechanisms, and first and second kneel mechanisms are in operable communication with one another such that if the first mechanism is in the latched position, the second mechanism will also be in the latched position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4a is an exploded view a first recliner mechanism of the recliner, floor-latch, and kneel assembly;

FIG. 4b is a is a more detailed exploded view of particular components of FIG. 4a;

FIG. 5b is a is a more detailed exploded view of particular components of FIG. 5a;

FIG. 6b is a is a more detailed exploded view of particular components of FIG. 6a;

FIG. 15 is a side view of the recliner, floor-latch, and kneel assembly in a seat assembly;

FIG. 34 is a side view of the latch mechanism of FIG. 32 in a latched position;

FIG. 35 is a side view of the latch mechanism of FIG. 32 with part of a housing removed to show the latch mechanism in a latched position;

FIG. 36 is a side view of the latch mechanism of FIG. 32 in an unlatched position;

FIG. 37 is a side view of the latch mechanism of FIG. 32 with part of a housing removed to show the latch mechanism in an unlatched position;

FIG. 45 is a side view of a kneel mechanism in accordance with the principals of the present invention;

FIG. 46 is an exploded view of the kneel mechanism of FIG. 45;

FIG. 47 is a side view of a first side of the kneel mechanism of FIG. 45 in a locked position;

FIG. 48 is a side view of a second side of the kneel mechanism of FIG. 45 in a locked position;

DETAILED DESCRIPTION OF THE PREFERRED EMBODIMENTS

The following description of the preferred embodiments is merely exemplary in nature and is in no way intended to limit the invention, its application, or uses.

Figure 1:
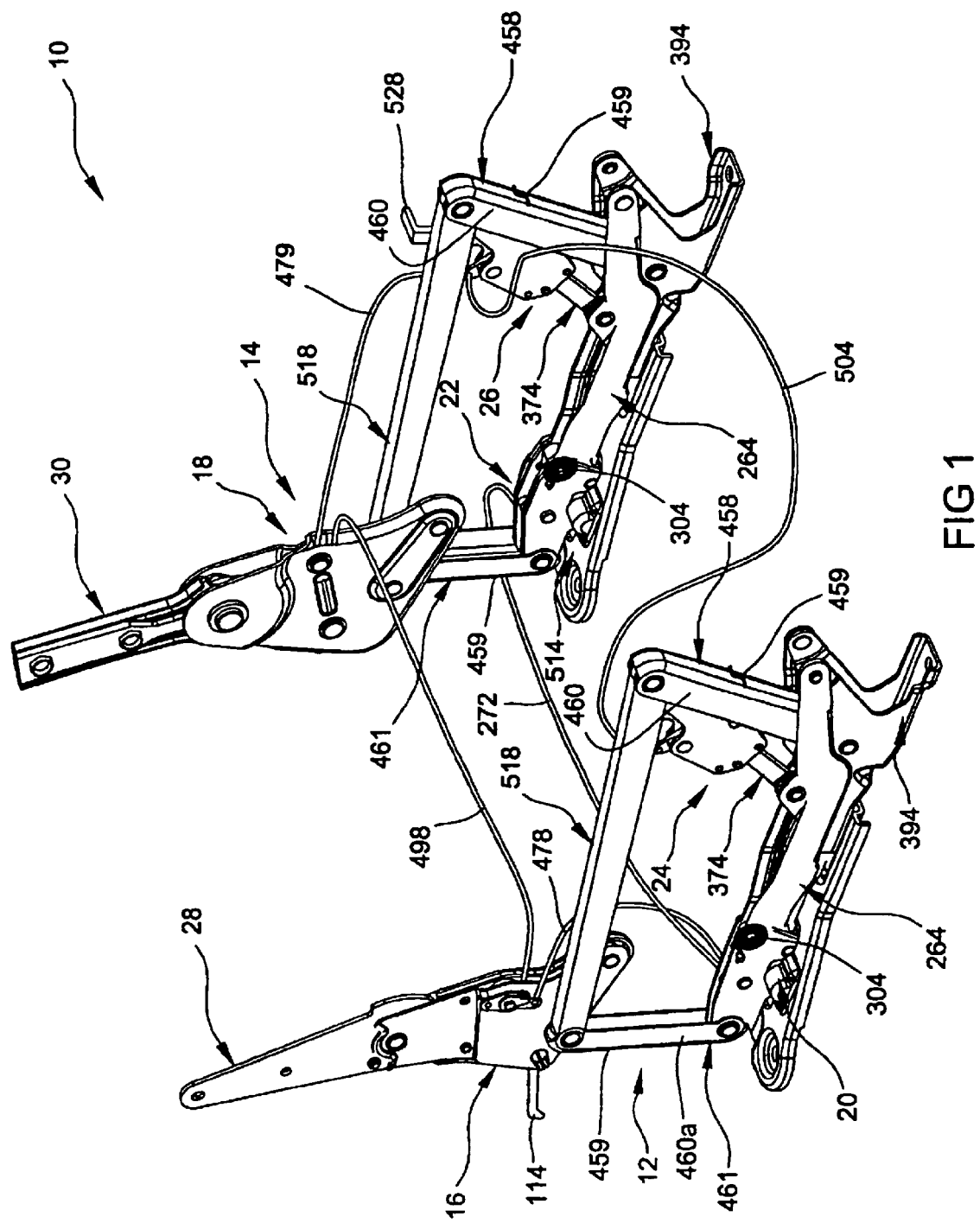
FIG. 1 is a perspective view of a recliner, floor-latch, and kneel assembly in accordance with the principles of the present invention.
Figure 2:
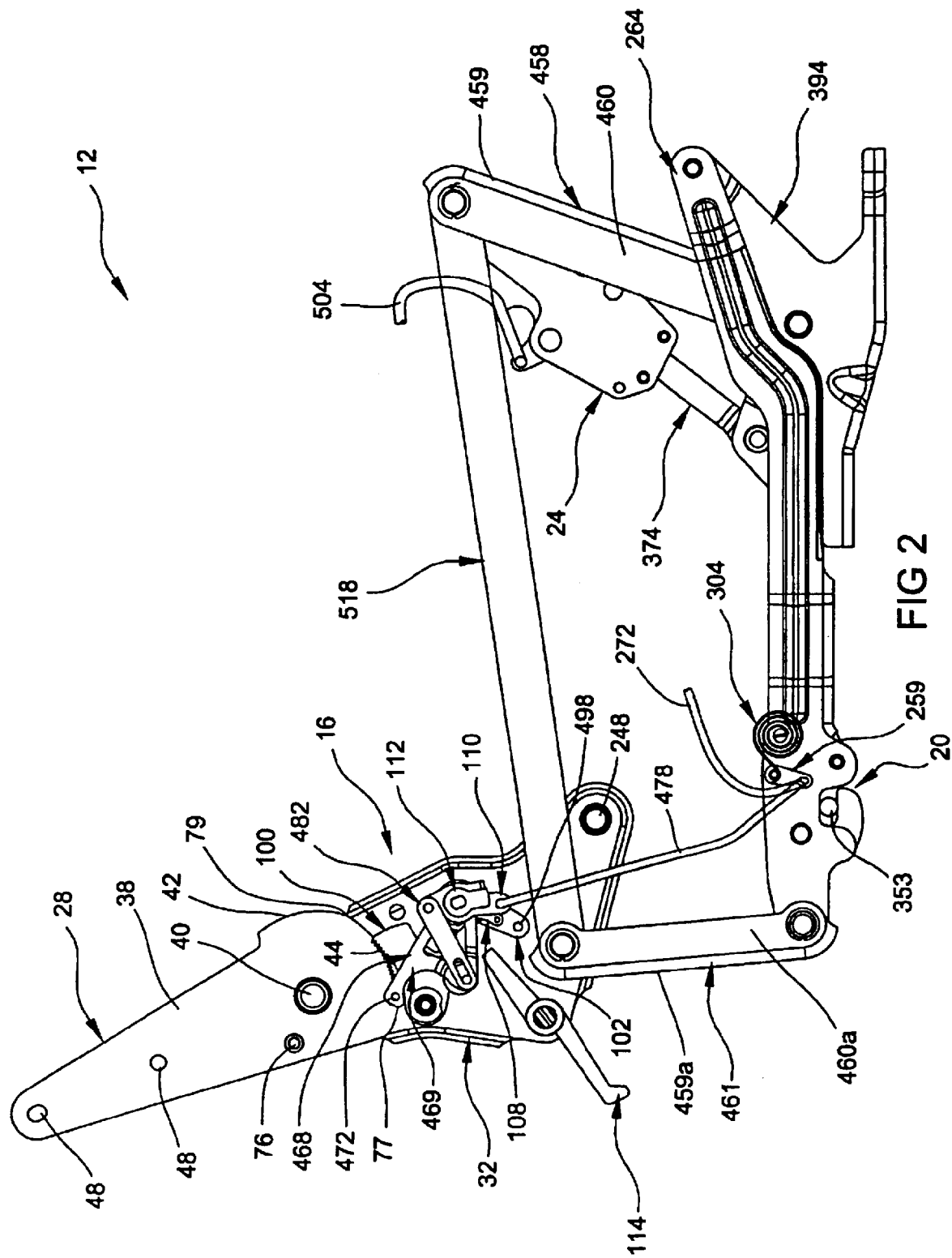
FIG. 2 is a side view of a first half of the recliner, floor-latch, and kneel assembly of FIG. 1 having an outer plate removed.
Figure 3:
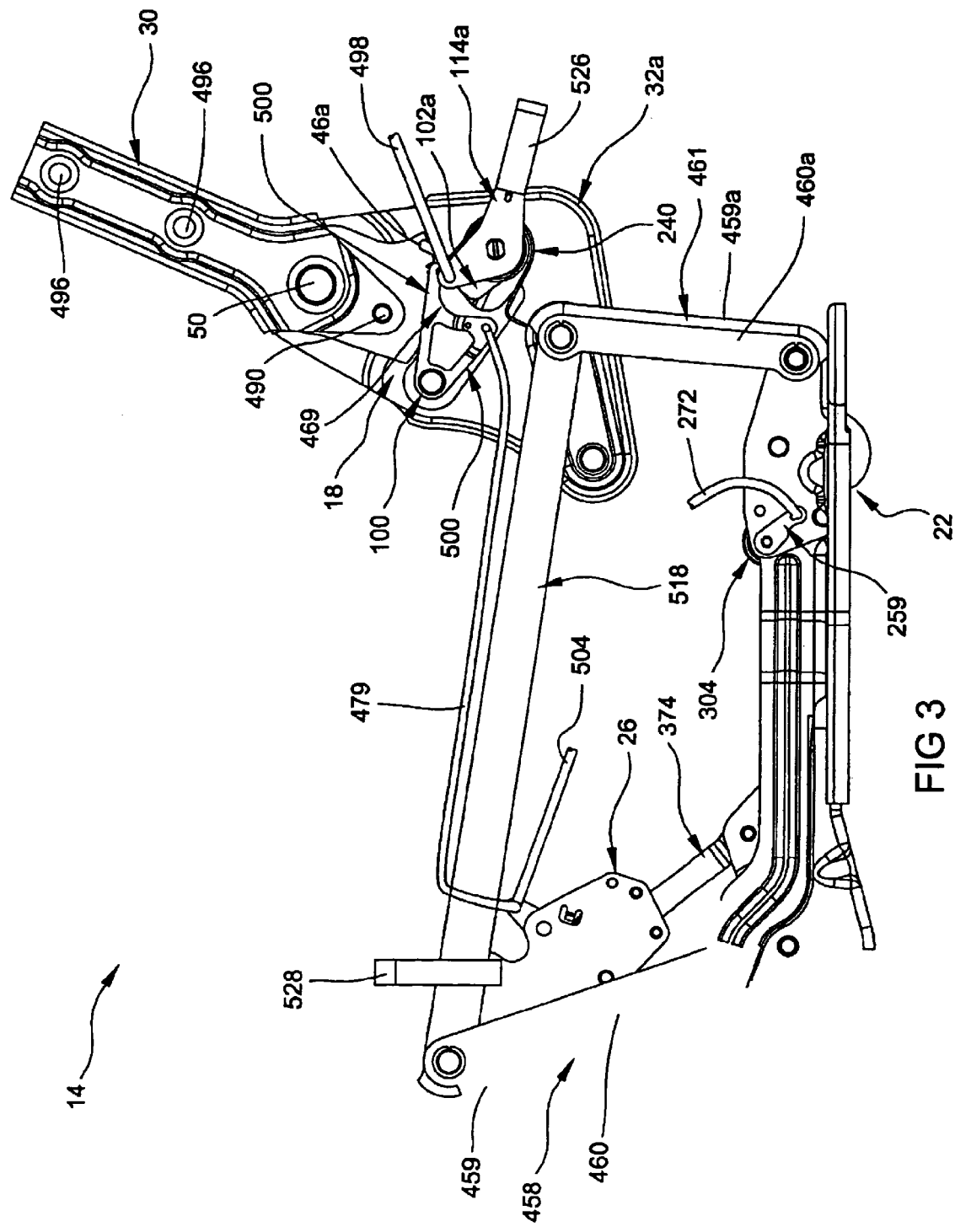
FIG. 3 is a side view of a second half of the recliner, floor-latch, and kneel assembly of FIG. 1 having an outer plate removed.
Figure 13A:
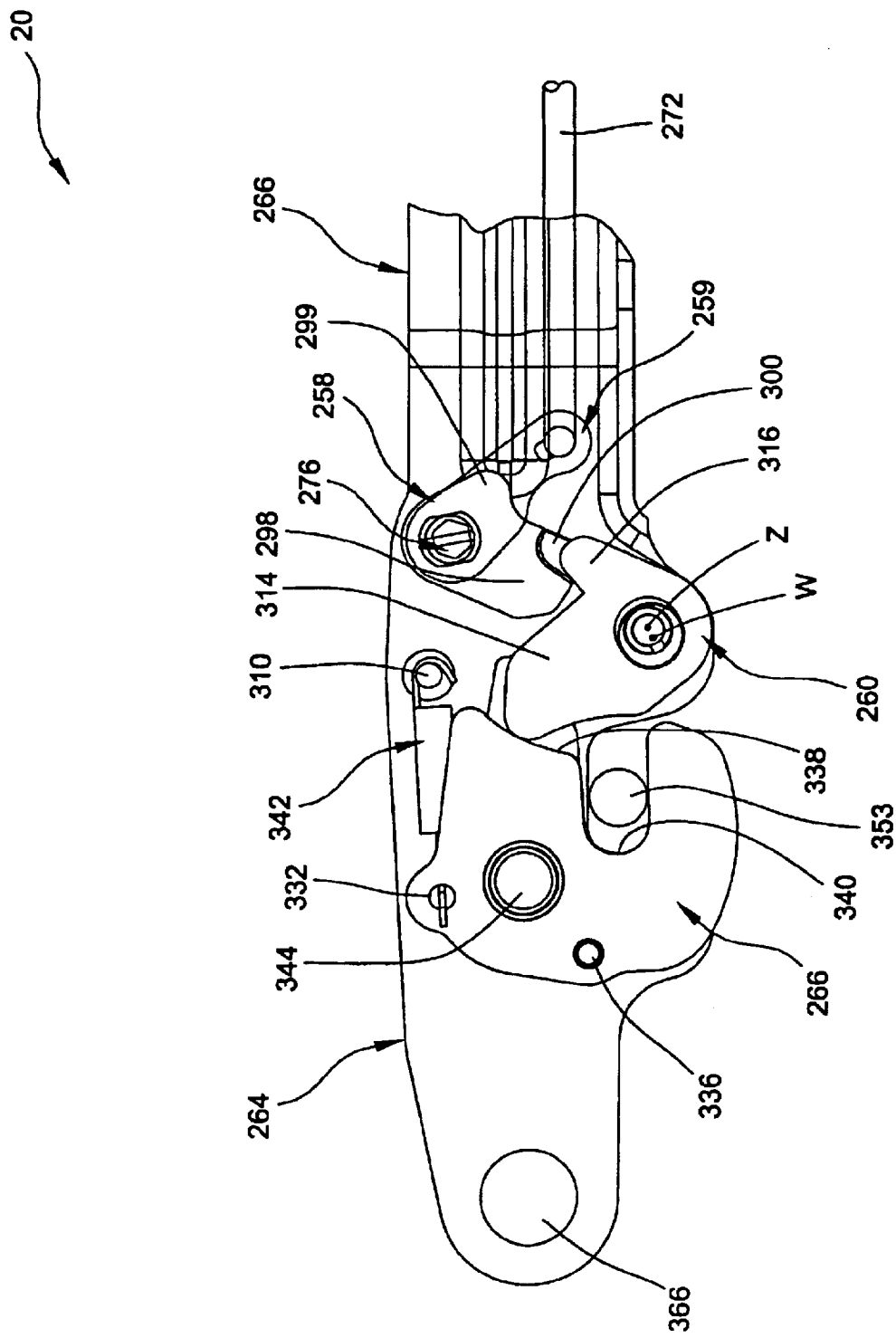
FIG. 13a is a side view of the latch mechanism with part of a housing removed to show the internal workings of the latch mechanism in the latched position.
Figure 13B:
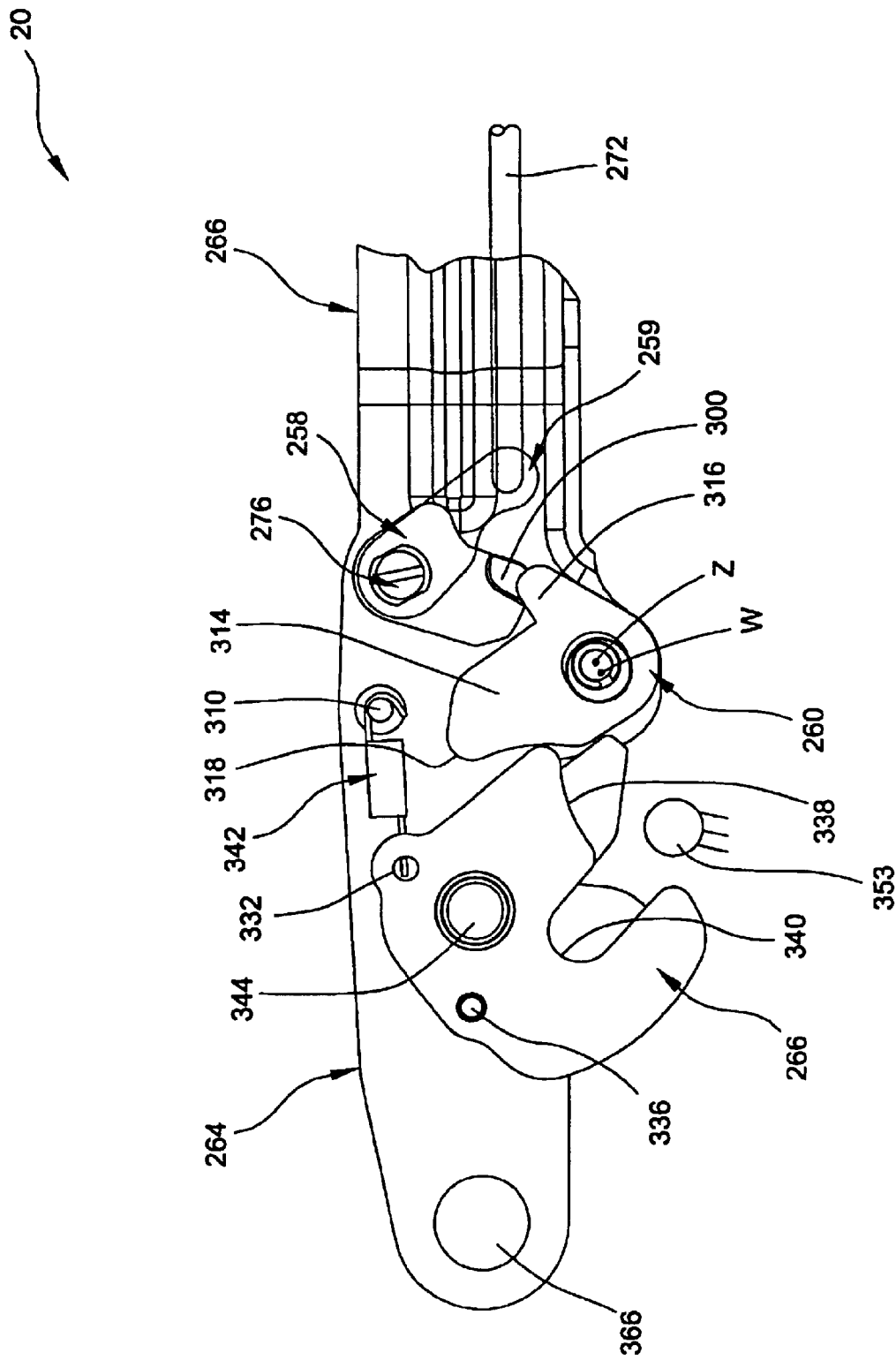
FIG. 13b is a side view of the latch mechanism with part of a housing removed to show the internal workings of the latch mechanism in the unlatched position.
Figure 14A:
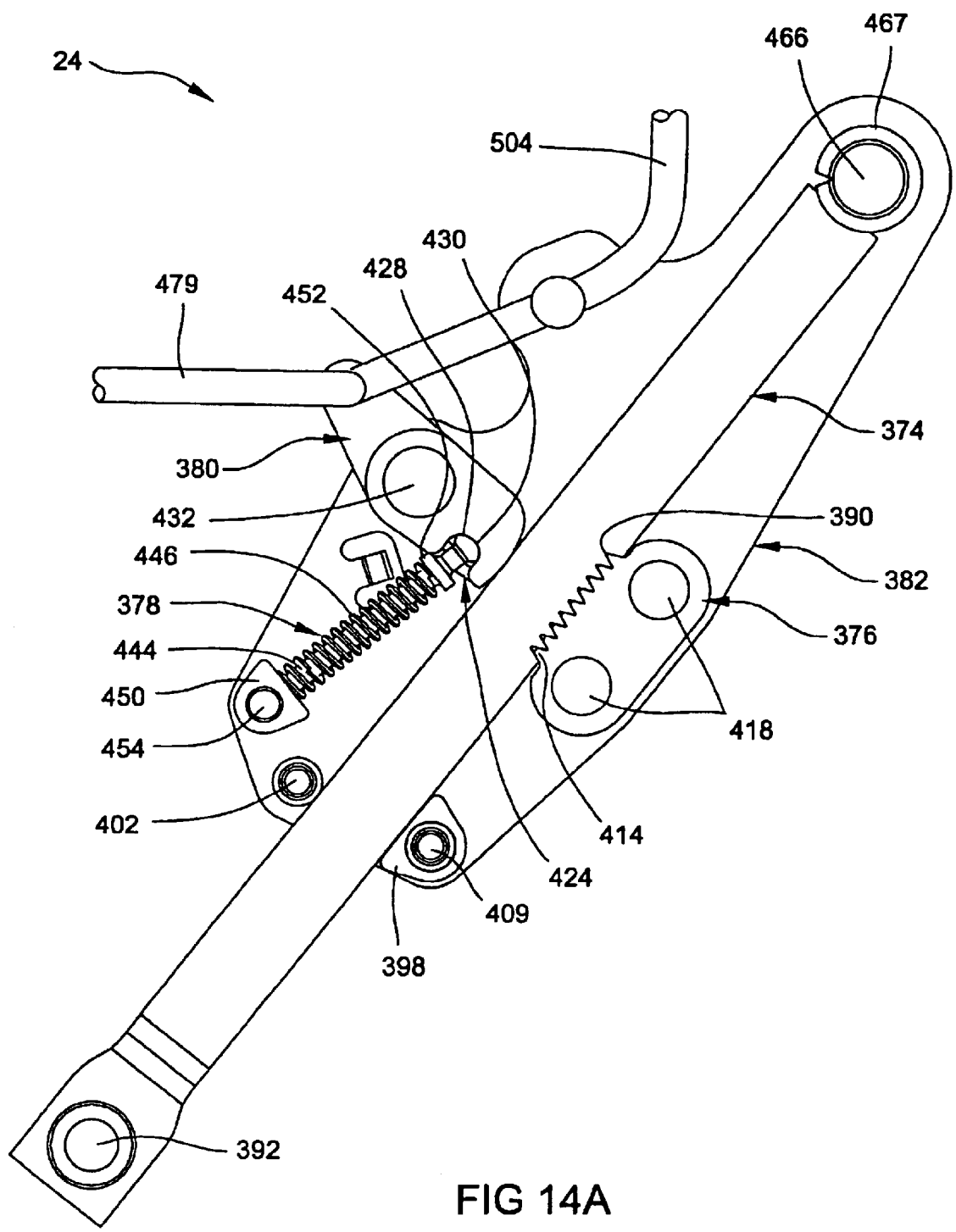
FIG. 14a is a side view of the kneel mechanism with part of a housing removed to show the internal workings of the kneel mechanism in the latched position.
Figure 14B:
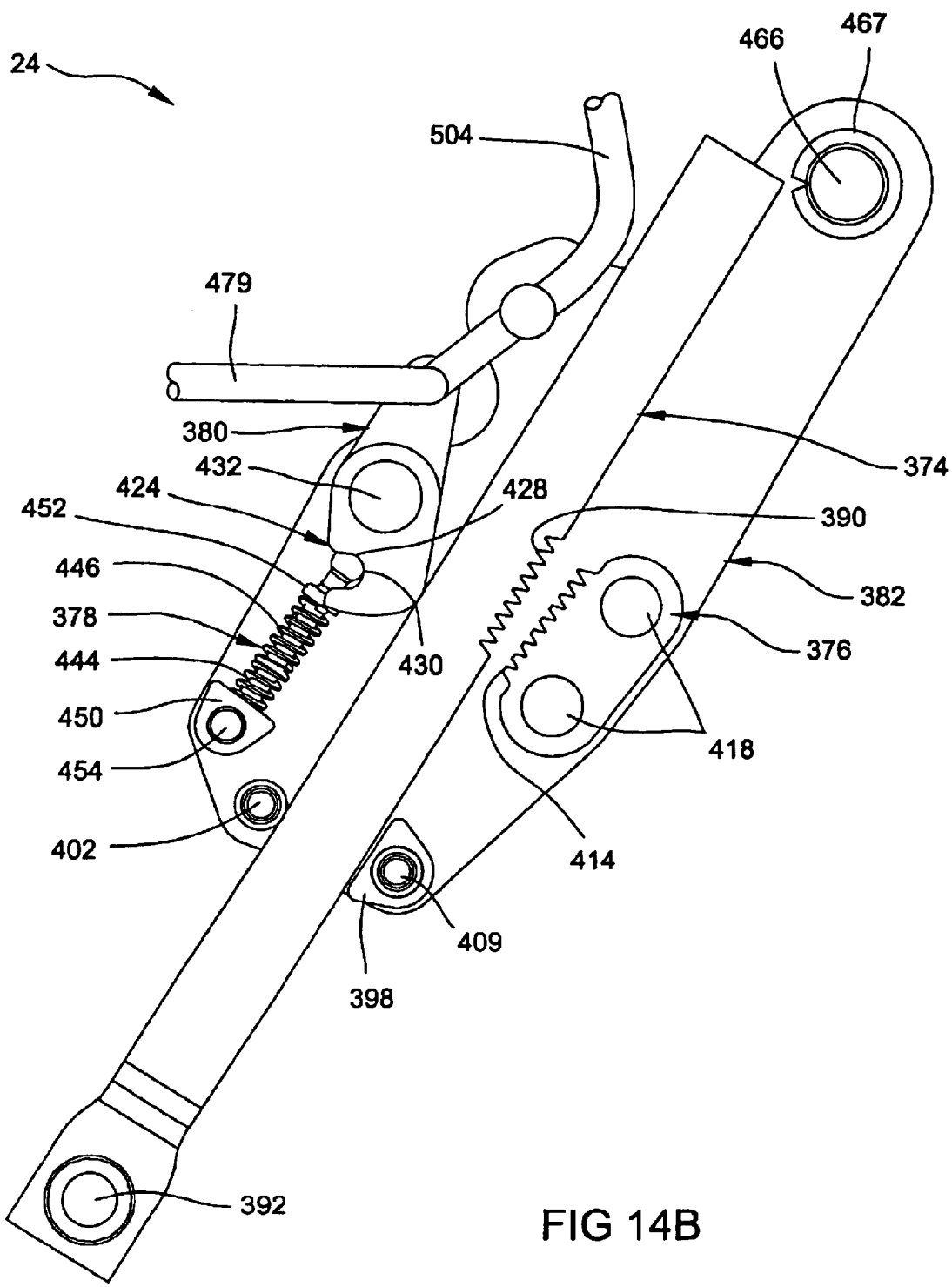
FIG. 14b is a side view of the kneel mechanism with part of a housing removed to show the internal workings of the kneel mechanism in the unlatched position.
Figure 17:
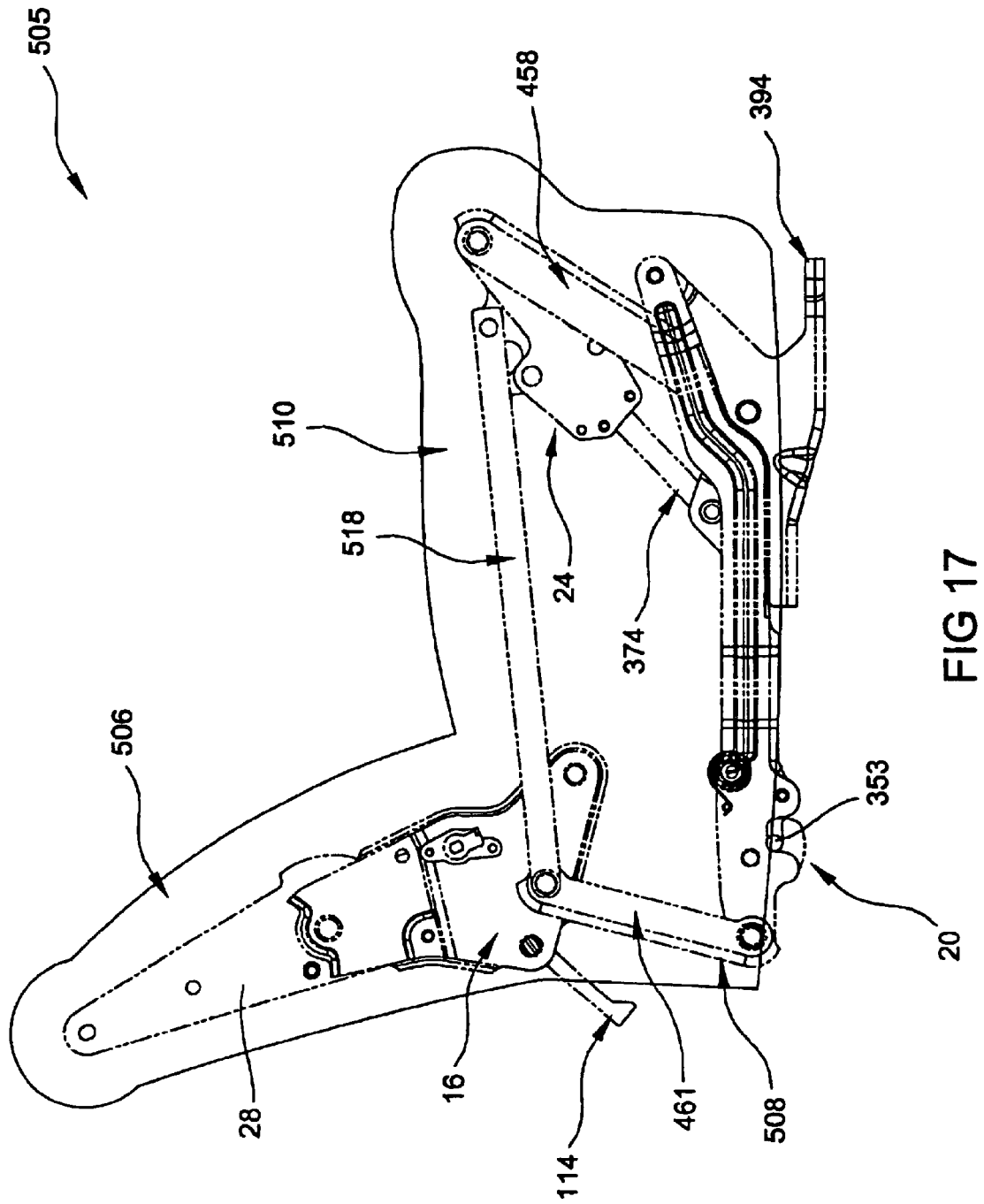
FIG. 17 is a side view of the seat assembly in the kneeled position.

With reference to FIGS. 1 through 3, a combination recliner, floor-latch, and kneel (RFK) assembly 10 for use with a seat assembly and operable in a first mode to enable recline or forward folding of a seatback relative to a seat, in a second mode to enable both forward folding of a seatback relative to a seat and forward dumping of a seat assembly, and in a third mode to allow forward articulation of a seat assembly or "kneeling". The RFK assembly 10 includes operably interconnected first and second RFK halves 12, 14 respectively including first and second recliner mechanisms 16, 18, fist and second floor-latch mechanisms 20, 22, and first and second kneel mechanisms 24, 26. Also provided are upward extending seatback supports 28, 30 operably interconnected with the recliner mechanisms 16, 18 for selectively positioning the seatback supports. The floor-latch mechanisms 20, 22 selectively engage a pair of strikers 353 disposed on a floor for securing the seat assembly thereto, as shown in FIGS. 13a and 13b and discussed in further detail below. Kneel mechanisms 24, 26 selectively engage a pair of cross-members pivotably supported on a seat structure for securing the seat in an upright position, as shown in FIGS. 14a, 14b and FIG. 17 as discussed in further detail below.

The first RFK half 12 includes inner and outer plates 32, 34 between which the first recliner mechanism 16 is operably supported. The first seatback support 28 is pivotally supported between the inner and outer plates 32, 34 and is in selective engagement with the recliner mechanism 16 for pivotally positioning the first seatback support 28. An actuation lever 114 is pivotally supported between the inner and outer plates 32, 34 and is in operable engagement with the first recliner mechanism 16 and the first floor-latch mechanism 20, as well as the second recliner mechanism 18 of the second RFK half 14 as will be discussed in more detail below.

The first seatback support 28 includes a generally triangular-shaped plate 38 having a pivot aperture 40 therethrough and an arcuate edge 42. A portion of the arcuate edge 42 includes a plurality of teeth 44 formed therein and an interlock notch 46. Auxiliary apertures 48 are provided for attachment of a seatback frame (not shown) thereto. The seatback support 28 is pivotally supported between the inner and outer plates 32, 34 by a seatback support pivot 50. The seatback support pivot 50 includes a disc end 52, a keyed cylindrical section 54, a first cylindrical section 56 having a bearing surface 58, a second cylindrical section 60, and a third cylindrical section 62 having a diametric notch 64 formed therein. The support pivot 50 is received through a keyed aperture 66 of the inner plate 32, the pivot aperture 40 of the first seatback support 28, and a pivot aperture 68 of the outer plate 34. The keyed cylindrical section 54 aligns with the keyed aperture 66 of the inner plate 32 for fixing the support pivot 50 from rotating relative to the inner and outer plates 32, 34. The first cylindrical section 56 aligns within the pivot aperture 40 of the first seatback support 28, whereby the first seatback support 28 pivots on the bearing surface 58. The second cylindrical extension 60 aligns with the pivot aperture 68 of the outer plate 34 and the third cylindrical section 62 extends from the disc end 52.

The first seatback support 28 is biased by a coil spring 70 including a central flat 72 that engages the diametric notch 64 of the third cylindrical section 62 and an outwardly extending arm 74 that engages a post 76 extending from the first seatback support 28 through attachment aperture 75. The post 76 includes a central cylindrical section 81 having two cylindrical sections 83 extending therefrom for interaction with the inner and outer plates 32, 34 as will be discussed further below. In this manner, as the first seatback support 28 is caused to pivot clockwise (CW) relative to the view shown in FIG. 2, the cylindrical section 83 of the post 76 engages the extending arm 74 to bias against the reclining motion.

The first seatback support 28 further includes a sector plate 84 for interaction with the first floor latch mechanism 20 as will be discussed further below. The sector plate 84 includes an attachment aperture 86 formed therethrough for rotatably receiving the support pivot 50, and a cam surface 88. The cam surface 88 includes a first reaction surface 90, a second reaction surface 92, an arcuate surface 94 disposed generally between the first and second reaction surfaces 90, 92. The sector plate 84 is fixedly attached to the first seatback support 28 by post 76 for rotation therewith.

As the first seatback support 28 is caused to pivot relative to the inner and outer plates 32, 34, the post 76 may abut the inner and outer plates 32, 34 at a first stop 77 during reclining or counterclockwise (CCW) rotation relative to the view shown in FIG. 2 to prohibit further pivotal motion of the first seatback support 28 relative to the inner and outer plates 32, 34. During forward pivoting or clockwise (CW) rotation of the first seatback support 28 relative to the view shown in FIG. 2, the post 76 may abut the second stop 79 and prevent further forward movement of the first seatback support 28 relative to the inner and outer plates 32, 34. In this manner, a range of pivotal motion of the first seatback support 28 is defined.

The first recliner mechanism 16 includes a pawl 100, a recliner cam 102, a main pivot 104, a trigger plate 106, a latch cam 108, a latch link 110, a key 112, and an actuation lever 114. The pawl 100 includes first and second extensions 116, 118 and an attachment aperture 120. The first extension 116 includes a plurality of teeth 122 for selective engagement with the teeth 44 of the first seatback support 28 for defining a plurality of pivotal positions (i.e., recline positions) of the seat-back support 28 relative to the inner and outer plates 32, 34 and an engagement face 124 for interaction with the recliner cam 102 as will be described further below. The second extension 118 includes an engagement face 126 and is generally opposite the engagement face 122 such that a cam recess 128 is defined therebetween.

Figure 4B:
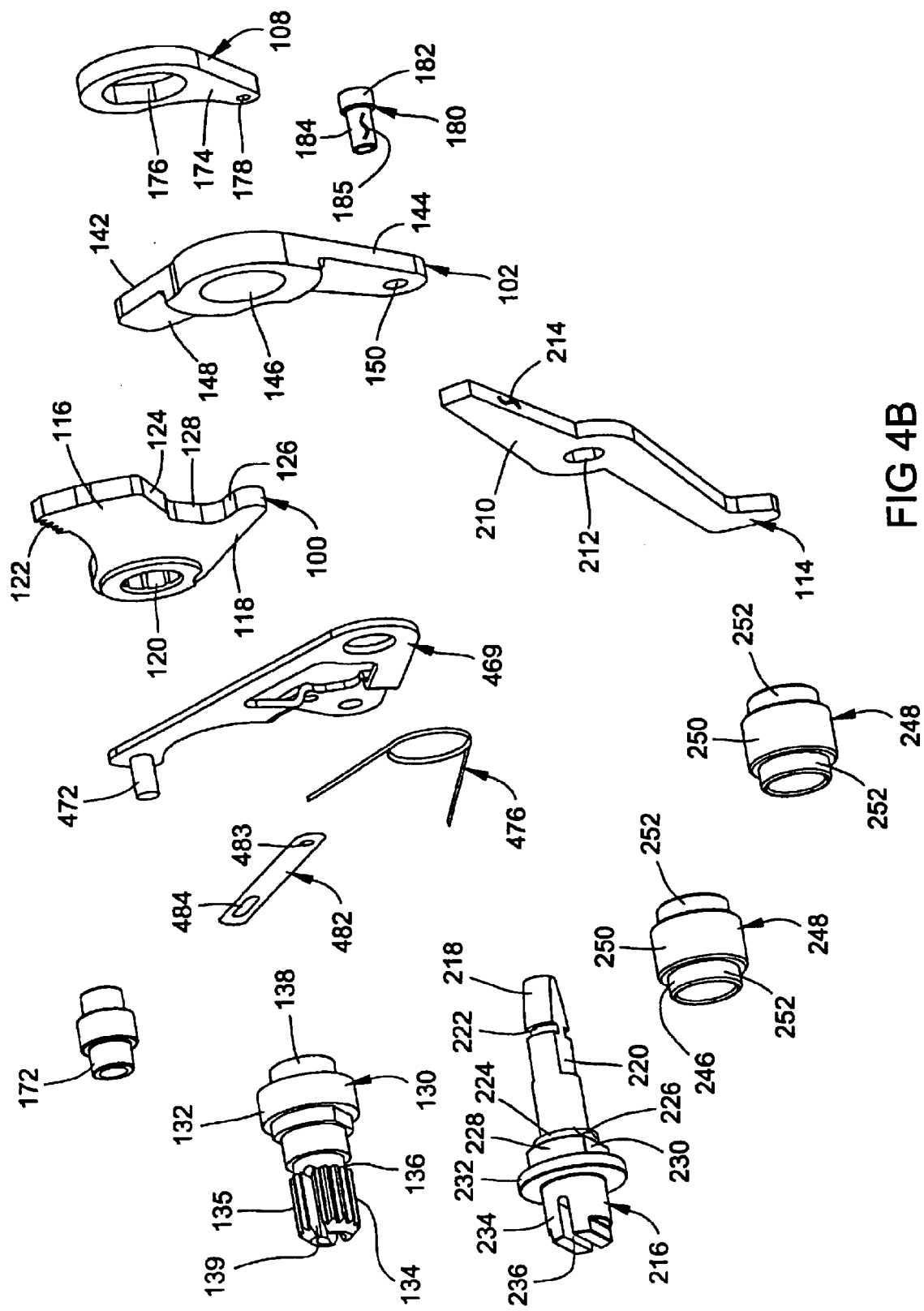

The pawl 100 is pivotably supported between inner and outer plates 32, 34 by a pivot 130, whereby pivot 130 includes a central cylindrical section 132 flanked by first and second cylindrical sections 136, 138. The first cylindrical section 136 includes an engagement surface 134 for mating engagement with the pawl 100 such that the pawl 100 is fixed for rotation with the pivot 130. The first cylindrical section 136 is received by the attachment aperture 120 such that the pawl 100 is restricted from rotating about engagement surface 134 while the first and second cylindrical sections 136,138 are rotatably attached to the inner and outer plates 32, 34 through apertures 140. In this regard, the central cylindrical section 132 serves as a spacer between the inner and outer plates 32, 34. Relative rotation between the pawl 100 and the attachment aperture 120 is accomplished by a splined connection 135 as shown in FIGS. 4a and 4b. While the splined connection 135 is disclosed, any other suitable means of preventing relative rotation between the pawl 100 and the pivot 130 such as welding are anticipated and should be considered within the scope of the present invention. The first cylindrical section 136 further includes a spring slot 139 generally formed along its length for attachment to coil spring 166. Coil spring 166 includes a central flat 168 received by spring slot 139 and an extension 170 abutting spring post 172 which is fixedly attached to the inner plate 32 such that the coil spring 166 biases the pawl 100 in a first rotational direction (counterclockwise (CCW) as shown in FIG. 2).

The recliner cam 102 is a generally flat member having first and second extensions 142, 144 and an attachment aperture 146 formed therethrough. The first extension 142 includes a reaction surface 148 for interaction with engagement faces 124, 126 of pawl 100 while the second extension 144 includes a cable aperture 150 for communication with the second recliner mechanism 18, as will be described further below.

The latch cam 108 is a generally flat member having a first extension 174 and a keyed attachment aperture 176 formed therethrough. The first extension 174 includes a pin aperture 178 at its distal end for receiving a pin 180. Pin 180 includes first and second cylindrical sections 182, 184, whereby the first cylindrical section 182 is slidably received by slot 186 of inner plate 32 such that slot 186 defines the range of motion of pin 180 and subsequently the latch cam 108. The second cylindrical section 184 includes a bearing surface 185 and is fixedly received into pin aperture 178. The second cylindrical section 184 extends generally through the latch cam 108 towards the outer plate 34 for interaction with the actuation lever 114.

The latch link 110 is an elongate generally flat member having a an attachment aperture 188, a cable aperture 190, a central attachment aperture 192, and a tab 194 for interaction with the key 112. The central attachment aperture 192 receives the main pivot 104 for pivotal support between the inner and outer plates 32, 34. The attachment aperture 188 and cable aperture 190 are generally disposed at opposite ends of the latch link 110 having the central attachment aperture 192 disposed therebetween. The tab 194 extends from the latch link 110 generally towards outer plate 34 and includes an engagement face 196 for interaction with the key 112, as will be discussed further below.

The key 112 includes a keyed attachment aperture 198 and an extension 200 having an engagement face 202. The key 112 is fixedly received by the main pivot 104 such that rotation therebetween is prohibited. As such, when the main pivot 104 is caused to rotate sufficiently in the second rotational direction (CW as shown in FIG. 2), the tab 112 rotates therewith. Sufficient rotation of the key 112 causes the engagement face 202 to contact the tab 194 and subsequently rotate the latch link 110.

The trigger plate 106 includes a first end having an attachment aperture 204 and a second end having a pin 206 attached thereto. The attachment aperture 204 fixedly receives the main pivot 104 which when rotated, cause the trigger plate 106 to rotate therewith. The pin 206 includes a reaction face 208 for interaction with the sector plate 84 and is press fit into a notch 207 on the trigger plate 106. While the present invention discloses a pin 206 press fit to the trigger plate 106, other suitable methods of fixedly attaching the pin 206 to the trigger plate 106 such as welding for forming together is anticipated and should be considered within the scope of the present invention.

The recliner cam 102 and latch link 110 are pivotably supported between the inner and outer plates 32, 34 about the main pivot 104. The latch cam 108 and key 112 are supported between the inner and outer plates 32, 34 by the main pivot 104 while the trigger plate 106 is fixedly supported on an outer surface of the inner plate 32 by the main pivot 104. It should be understood that the trigger plate 106, latch cam 108, and key 112 are supported by the main pivot 104 by the first, second, and third keyed extensions 156, 158, 160, respectively, and rotate as the main pivot 104 rotates while the recliner cam 102 and latch link 110 are free to rotate relative to the main pivot 104.

The main pivot 104 includes a central cylindrical section 152 having a bearing surface, a cylindrical section 153 acting as a spacer between the inner and outer plates 32, 34, and first, second, and third keyed extensions 156, 158, 160. The first keyed extension 156 includes arcuate bearing surface 157 and is received through attachment aperture 162 of inner plate 32 while the third keyed extension 160 includes arcuate bearing surface 161 and is received through attachment aperture 164 of the outer plate 34 such that the main pivot 104 is permitted to rotate on bearing surfaces 157 and 161 relative to the inner and outer plates 32, 34. The central cylindrical section 152 receives attachment aperture 146 of the recliner cam 102, whereby the recliner cam 102 is allowed to pivot about bearing surface 154 relative to the main pivot 104.

The actuation lever 114 generally includes a flat plate having a lever arm 210 and a keyed spindle aperture 212. The lever arm 210 includes a reaction surface 214, which interacts with the recliner cam 102 and the latch cam 108 for selective actuation of the first seatback support 28. The actuation lever 114 is pivotally supported between the inner and outer plates 32, 34 by a spindle 216. The spindle 216 includes a conical cylinder section 218 having flats 220 and notches 222 formed therein, a second cylinder section 224 having a bearing surface 226, a keyed cylindrical section 228 having keys 230 formed therein, a central disc-shaped section 232, and a fourth cylindrical section 234 including a notch 236. The spindle 216 is received through the spindle aperture 212, whereby the keys 230 of the keyed cylindrical section 228 align with keys of the spindle aperture 212 for prohibiting relative rotational motion of the spindle 216 within the spindle aperture 212. The spindle 216 is further disposed through a pair of support apertures 238 of the inner and outer plates 32, 34, supporting the spindle 216 therebetween.

The actuation lever 114 is rotationally biased in a neutral position by a coil spring 240. The coil spring 240 includes a central flat 242 and an outwardly extending arm 244. The central flat 242 is received by the notch 236 of the fourth cylindrical section 234 and the extending arm 244 engages an anchor point 246 on the outer plate 34. As the actuation lever 114 is caused to rotate from the neutral position, the coil spring 240 biases the actuation lever 114 back towards the neutral position.

A spacer 248 is further provided for spacing the inner and outer plates 32, 34. The spacer 248 includes a central cylindrical section 250 and side cylindrical sections 252. The side cylindrical sections 252 are received into apertures 254 of the inner and outer plates 32, 34, whereby the spacer 248 is supported therebetween. A width of the central cylindrical section 250 defines a distance between the inner and outer plates 32, 34.

Figure 6A:
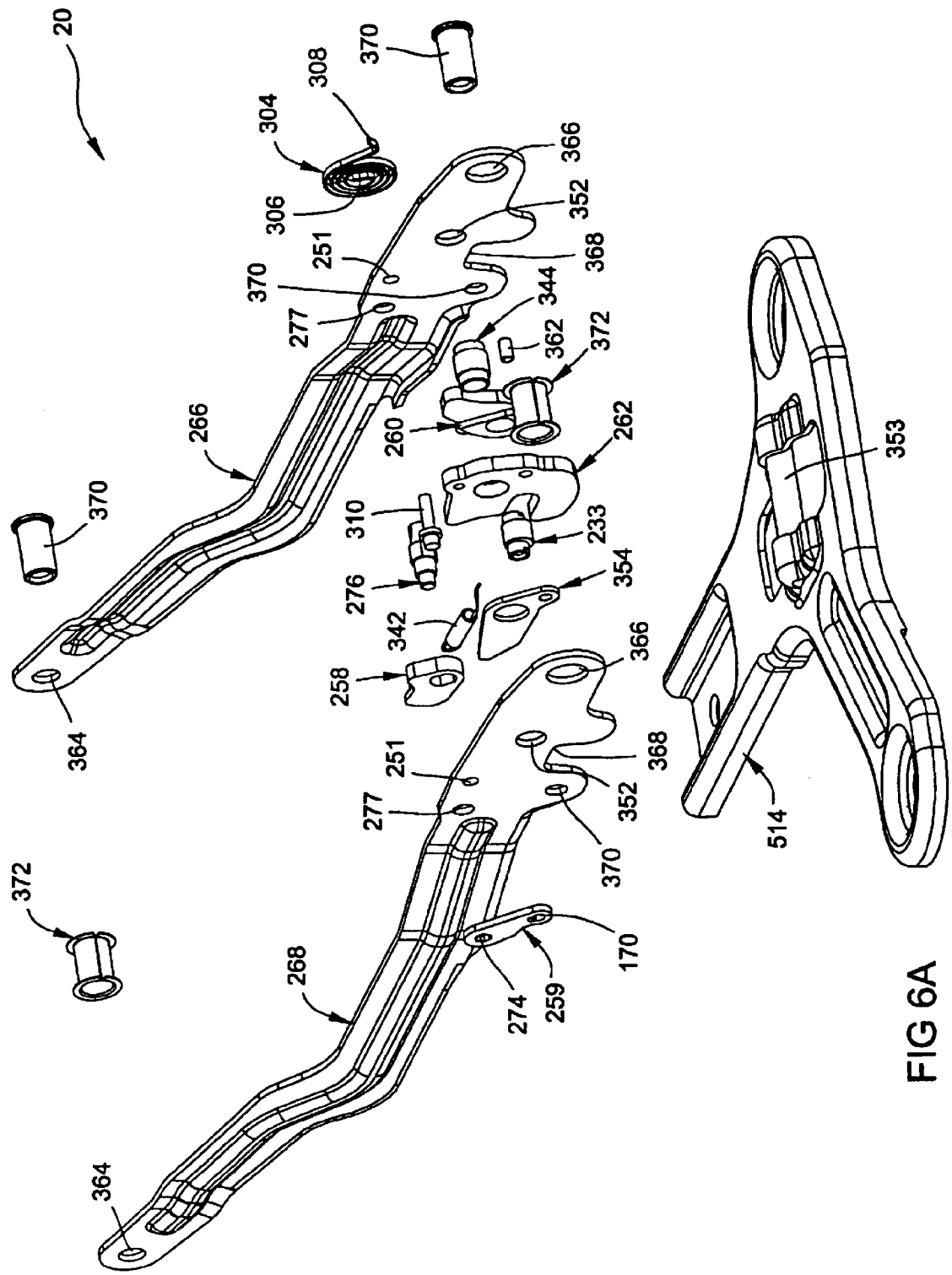
FIG. 6a is an exploded view of the latch mechanism of the recliner, floor-latch, and kneel assembly.
Figure 6B:
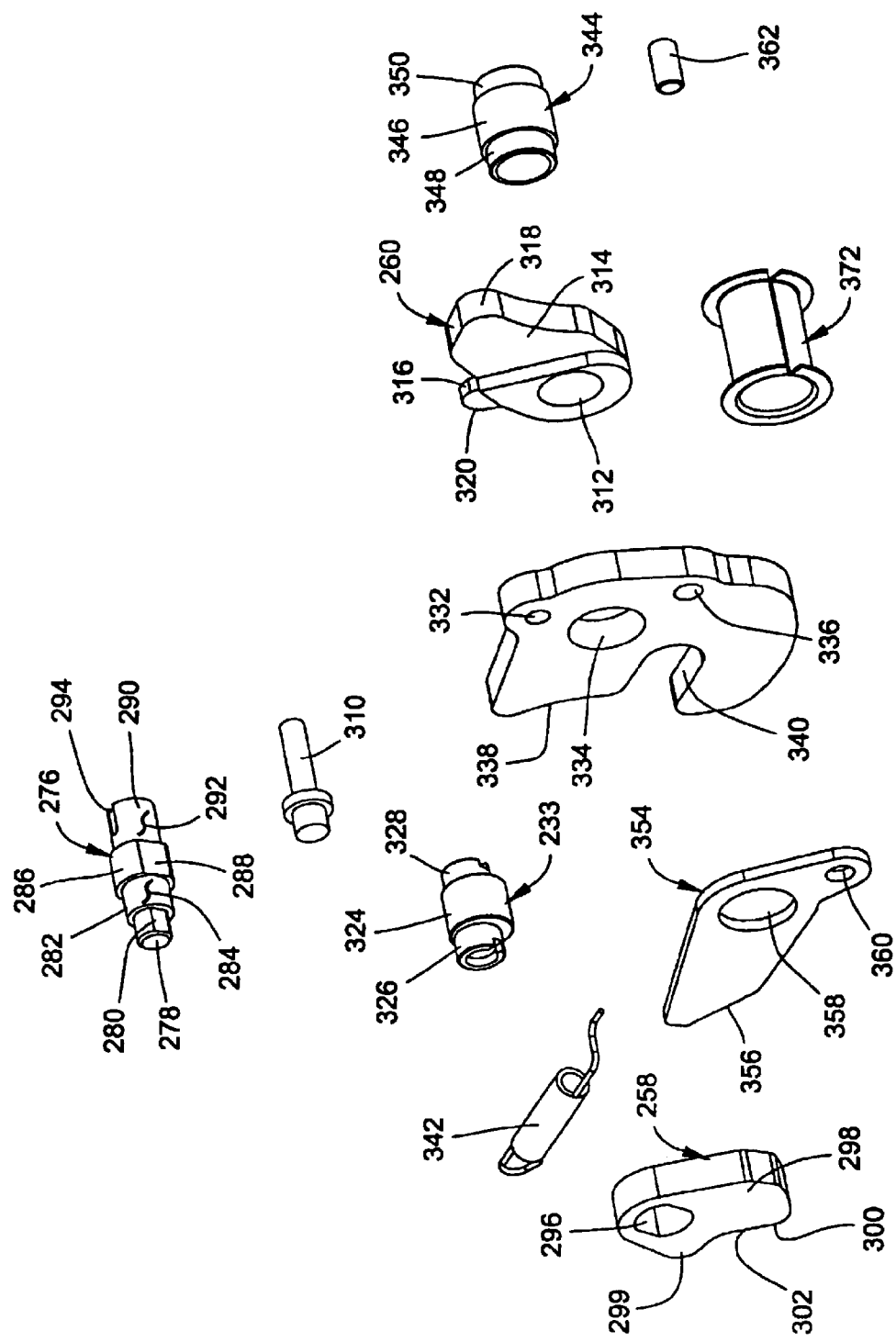

As best shown in FIGS. 6a and 6b, the first floor latch mechanism 20 includes an actuation lever 259, an actuation cam 258, a latch cam 260, a latch 262, and a housing 264 having first and second housing plates 266, 268. The actuation lever 259 includes a cable aperture 170 which receives a first cable 478 for communication with the first recliner mechanism 16 and a second cable 272 for communication with the second floor latch mechanism 22 as will be described further below. Specifically, the first cable 478 is received by the cable aperture 190 of the latch link 110 and communicates with the first recliner mechanism 16 to selectively prevent actuation of the first seatback support 28 if either of the first and second floor latch mechanisms 20, 22 are in an unlatched position as will be discussed further below.

The actuation lever 259 further includes a keyed aperture 274 for receiving pivot 276. Pivot 276 includes a first cylindrical section 278 having flats 280 formed thereon, a second cylindrical section 282 having a bearing surface 284, a third cylindrical section 286 having flats 288, and a fourth cylindrical section 290 having a bearing surface 292 and a slot 294 formed longitudinally therethrough. The keyed aperture 274 of the actuation lever 259 receives the first cylindrical section 278 of pivot 276 whereby flats 280 matingly receive the keyed aperture 274 to prevent relative rotation between the pivot 276 and the actuation lever 259.

The actuation cam 258 is a generally flat member having a keyed attachment aperture 296 and first and second extensions 298, 299. The keyed attachment aperture 296 matingly receives the third cylindrical section 286 of pivot 276, whereby flats 288 cooperate with the keyed aperture 296 to prevent relative rotation therebetween. The second and fourth cylindrical sections 282, 290 of pivot 276 are received into apertures 277 of the first and second housing plates 266, 268 thus enabling the actuation cam 258 to rotate on bearing surfaces 284, 292 relative to the housing 264. The first extension 298 further includes a recess 300 having an engagement face 302 disposed generally opposite the keyed attachment aperture 296 for interaction with the latch cam 260 while the second extension 299 selectively engages the actuation cam 258 as will be discussed further below.

The actuation cam 258 is biased by a coil spring 304 in a second rotational direction (clockwise (CW) as shown in FIGS. 13a and 13b). The coil spring 304 is disposed on an outside face of the first housing plate 266 and includes a central flat 306 that engages the longitudinal slot 294 formed in the fourth cylindrical section 290 and an outwardly extending arm 308 that engages a post 310 extending from the first housing plate 266 through aperture 251. In this manner, the actuation cam 258 is caused to pivot clockwise (CW) as shown in FIGS. 13a and 13b towards a latched position, whereby the post 310 engages the extending arm 308 to bias against rotation in a counterclockwise direction (CCW) towards an unlatched position. As such, the actuation cam 258 is biased into a latching position such that a sufficient force must be applied to overcome the bias of coil spring 304 to unlatch the first floor latch mechanism 20.

The latch cam 260 includes a central attachment aperture 312 and first and second extensions 314, 316. The first extension 314 includes an engagement face 318 for selective engagement with the latch 262, while the second extension 316 includes a reaction face 320 for selective interaction with the second extension 299 of the actuation cam 258. The latch cam 260 is pivotably supported between the first and second housing plates 266, 268 by a pivot 233, which includes a central cylindrical section 324 with first and second cylindrical sections 326, 328 axially extending therefrom, each having bearing surfaces. The first and second cylindrical sections 326, 328 are received into apertures 370 of the first and second housing plates 266, 268, to rotatably support the first and second cylindrical sections 326, 328 therebetween. The central cylindrical section 324, which is of a larger diameter than the first and second cylindrical sections 326, 328, is press fit into the central attachment aperture 312 of the latch cam 260. Further, a center axis W of the central cylindrical section 324 is offset from a central axis Z of the first and second cylindrical sections 324, 326, as best shown in FIGS. 13a and 13b. Thus, as the latch cam 260 is caused to pivot, pivotal motion thereof is supported by pivot 322, whereby axis W rotates about the central axis Z. In this manner, the latch cam 260 not only rotates between the first and second housing plates 266, 268, but also shifts therebetween. As such, the latch cam 260 is biased towards engagement with the latch 262 due to the aforementioned shift accomplished by pivot 322 and by the overall difference in size between the larger first extension 314 and the smaller second extension 316.

The latch 262 is a flat plate including a spring aperture 332, a pivot aperture 334, an attachment aperture 336, a reaction face 338, and a striker recess 340. The spring aperture 332 provides an attachment for a latch spring 342, whereby the latch spring 342 is attached to the housing 264 at post 310 and biases the latch 262 in the second rotational direction. The pivot aperture 334 receives a latch pivot 344 therethrough for pivotably supporting the latch 262. The latch pivot 344 includes a central cylindrical 346 section with first and second cylindrical sections 348, 350 axially extending therefrom, each having bearing surfaces. The first and second cylindrical sections 348, 350 are received into apertures 352 of the first and second housing plates 266, 268 and are pivotably supported therebetween. The central cylindrical section 346 is received through the pivot aperture 334 of the latch 262. The striker recess 340 is formed to selectively receive a striker 353 therein, as discussed in detail herein below. The reaction face 338 of the latch 262 is selectively engaged by engagement face 318 of the latch cam 260 to retain the latch 262 in a closed or latched position. This engagement prohibits movement of the latch 262, thereby preventing the latch 262 from rotating.

The latch 262 further includes a latch plate 354 having a reaction face 356, a pivot aperture 358, and an attachment aperture 360. The latch plate 354 lies adjacent to the latch 262, whereby the latch pivot 344 is received through the pivot aperture 358. A rivet 362 is provided and received through the attachment aperture 360 to fix the latch plate 354 for rotation with the latch 262. The latch plate 354 extends a distance over the reaction face 338 of the latch 262.

The housing 264 is a generally elongate member including a first end having an attachment aperture 364 and a second end having an attachment aperture 366, whereby the various latch components are disposed therebetween. The housing 264 further includes a latch recess 368 providing clearance for a striker 353 to interact with the first floor latch mechanism 20. The first and second ends receive a rivet 370 through their respective attachment apertures 364,366 to fixedly attach the first and second housing plates 266, 268. In one embodiment, the first and second ends of the housing 264 receive support members as will be discussed further below. In this manner, the support members pivot about a collar 372 axially surrounding rivet 370.

Figure 7:
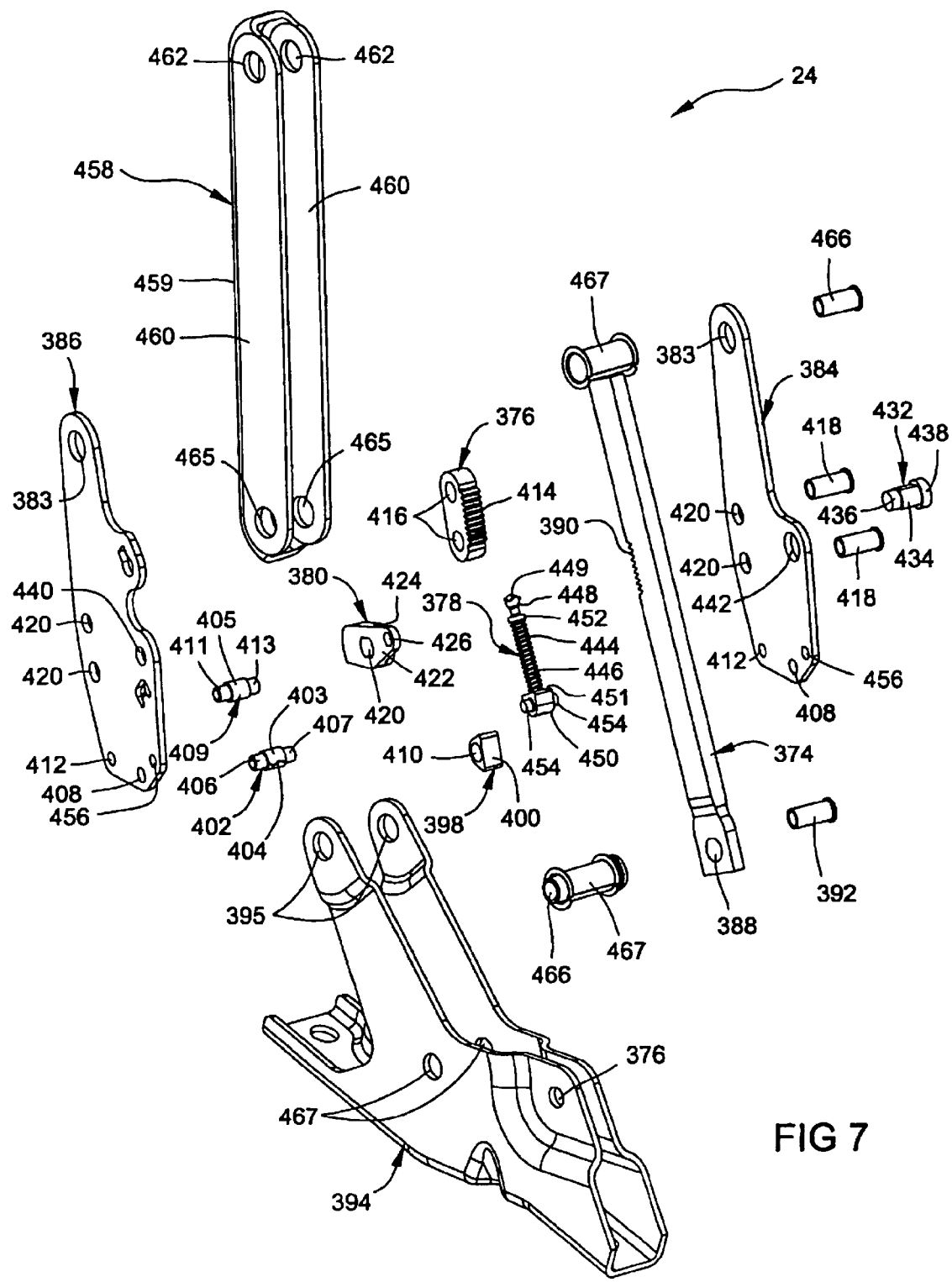
FIG. 7 is an exploded view of the kneel mechanism of the recliner, floor-latch, and kneel assembly.

The first kneel mechanism 24 includes a cross member 374, a locking pawl 376, a spring assembly 378, an actuation lever 380, and a housing 382 including first and second housing plates 384, 386, as shown in FIG. 7. The cross member 374 is a generally flat member having an attachment aperture 388 at a first end and a plurality of teeth 390 for selective interaction with the locking pawl 376. The attachment aperture 388 receives rivet 392 to pivotably attach the cross member 374 to a lower bracket 394 through attachment apertures 376 of the lower bracket 394. A second end of the cross member 374 is slidably received into the housing 382, whereby movement of the cross member 374 within the housing 382 is bounded by a cross member guide 398 having a bearing surface 400 and a rivet 402. Rivet 402 includes a central cylindrical section 403 flanked by first and second cylindrical sections 406, 407 and further includes a bearing surface 404 for interaction with the cross member 374. The first and second cylindrical sections 406, 407 of rivet 402 are received into apertures 408 of the first and second housing plates 384, 386 such that the central cylindrical section 404 serves as a spacer therebetween.

The cross member guide 398 has a generally triangular shape and includes a central aperture 410 and bearing surface 400. The central aperture 410 of the cross member guide 374 receives the central section 405 of a second rivet 409, whereby the first and second cylindrical sections 411, 413 are received by apertures 412 of the housing 382 and serve to fixedly attach the first and second housing plates 384, 386 while the central cylindrical section 405, in cooperation with the cross member guide 398, serves as a spacer therebetween. As previously mentioned, the cross member guide 398 and rivet 402 serve to restrict the movement of the cross member 374 within the housing 382. Specifically, the distance from bearing surface 400 to the central cylindrical section 403 of rivet 402 defines the range of motion that the cross member 374 is permitted to laterally move relative to the housing 382.

The locking pawl 376 is a generally flat member having a plurality of teeth 414 and attachment apertures 416 formed therethrough. Attachment apertures 416 are disposed opposite one another and receive rivets 418 to fixedly attach the locking pawl 376 to the housing 382 through apertures 420 of the inner and outer housing plates 384, 386. The plurality of teeth 414 are disposed generally between apertures 416 as best seen in FIG. 7. The teeth 414 selectively engage the teeth 390 of the cross member 374 to selectively fix the cross member 374 to the housing 382 thus preventing relative movement therebetween.

The actuation lever 380 includes a keyed attachment aperture 420, an extension 422, and a recess 424 for interaction with the spring assembly 378. The extension 422 extends from the keyed attachment aperture 420 and includes a cable attachment aperture 426. The recess 424 is disposed generally at the base of the extension 422 and includes a socket 428 having a bearing surface 430 as best shown in FIGS. 14*a* and 14*b*. The keyed attachment aperture 420 receives a pivot 432 which rotatably supports the actuation lever 380 between the first and second housing plates 384,386. The pivot 432 includes a central keyed section 434 and first and second cylindrical sections 436, 438. The central keyed section 434 matingly receives the keyed attachment aperture 420 such that the actuation lever 380 is caused to rotate with pivot 432. The first cylindrical section 436 is rotatably received through aperture 440 of the first housing plate 384 while the second cylindrical section 438 is rotatably received through attachment aperture 442 of the second housing plate 386. In one embodiment, the second cylindrical section 438 receives an external handle 528 for manual manipulation of the actuation lever 380, as will be discussed further below. While an external handle 528 is disclosed, it should be understood that the actuation lever 380 could include an integral handle and should be considered within the scope of the present invention. Further, while an external handle 528 is disclosed as part of the first kneel mechanism 24, it should be understood that the external handle 528 could also be incorporated with the actuation lever 380 of the second kneel mechanism 26.

The spring assembly 378 includes an elongate post 444 and a spring 446. The post 444 has a ball 448 including a bearing surface 449 at a first end and a spring block 450 having a reaction surface 451 at a second end. The ball 448 further includes a collar 452 axially surrounding the post 444 for interaction with the spring 446. The spring block 450 further includes cylindrical posts 454 received by apertures 456 of the inner and outer housing plates 384, 386 to fix the spring anchor 450 therebetween. The ball 448 is matingly received by the socket 428 for pivotal movement therein, whereby the bearing surface 430 of the socket 428 reacts against the bearing surface of the ball 448. Specifically, the spring 446 is disposed between the ball 448 and the spring block 450 such that a first end of the spring 446 reacts against the collar 352 of the ball 448 and a second end of the spring 446 reacts against the reaction surface 451 of the spring block 450 causing pivotal movement of the ball 448. In this manner, the spring 446 biases the actuation lever 380 into engagement with the cross member 374 and subsequently into a locked position.

The housing 382 is pivotably supported by a front support member 458 such that the housing 382 is allowed to pivot relative thereto. The front support member 458 is an elongate member having a front face 459 and includes integral side supports 460 formed therewith. The side supports 460 include a first set of apertures 462 at a first end that receive a pivot 466 having an axially surrounding collar 467, whereby the housing 382 rotates relative to the front support member 458 about collar 467. Specifically, the pivot 466 is received through apertures 383 of the inner and outer housing plates 384, 386 such that the side supports 460 of the front support member 458 are disposed on an outer face of the inner and outer housing plates 384, 386 respectively. The front support member 458 is rotatably attached to the lower bracket 394 at a second end through attachment apertures 467 of the lower bracket 394 and attachment apertures 465 of the front support member 458. Again, apertures 465 of the front support member 458 and apertures 467 of the lower bracket 394 receive a second pivot 466 having a second axially surrounding collar 467 such that the front support member 458 rotates relative to the lower bracket 394 about collar 467.

In this manner, the front support member 458 is allowed to pivot relative to the housing 382 and the lower bracket 394. Specifically, as the cross member 374 disengages the locking pawl 376 the housing 382 is free to rotate relative to the front support member 458. In addition, as the cross member 374 disengages the locking pawl 376, the front support member 458 is allowed to pivot relative to the lower bracket 394, allowing the housing 382 and the front support member 458 to articulate forward and concurrently move down as shown in FIG. 17.

The first RFK half 12 further includes a first interlock assembly 468 having an interlock plate 469 to prohibit positioning the first seatback support 28 in a use or upright position if either floor-latch mechanism 20, 22 or either kneel mechanism 24, 26 are not properly latched as shown in FIGS. 2, 4*a*, and 4*b*. The floor latch mechanisms 20, 22 are considered in the latched position when securely latched to a striker 353 while the kneel mechanisms 24, 26 are considered in the latched position when the locking pawl 376 is securely engaged to the cross member 374.

The interlock plate 469 is pivotally supported adjacent an outer surface of the first outer plate 34 by the main pivot 104 and includes an interlock post 472 selectively engagable with the seat-back support 28. A wire spring 476 is disposed about the interlock plate 469 to impart a bias force on the interlock plate 469. In this manner, the interlock post 472 is biased toward engagement with the seat-back support 28. However, a first interlock cable 478 operably interconnects the interlock plate 469 and the first floor latch mechanism 20 through the latch link 110. Specifically, the first interlock cable 478 is received through cable aperture 190 of the latch link 110 at a first end and received by the cable aperture 270 of the actuation lever 259 of the first floor latch mechanism 20. As the first interlock cable 478 is placed under tension, the latch link 110 rotates and thereby causes a link 482 to engage the interlock plate 269. The link 482 includes an attachment aperture 483 and a longitudinal slot 484. The latch link 110 is rotatably attached to the link 482 by a rivet 485 received through aperture 483 of the link 482 and aperture 188 of the latch link 110. The longitudinal slot is similarly attached to the interlock plate 469 by another rivet 485.

As explained in further detail below, tension on the first interlock cable 478 is present when both floor-latch mechanisms 20, 22 are properly engaged, thereby rotating the latch link 110 and link 482 such that the interlock plate 269 is pulled against the bias of the spring 476 and enabling return of the seat-back support 28 from a forward-fold position to a use or upright position. If, on the other hand, either floor-latch mechanism 20, 22 is not properly secure, the first interlock cable 478 is slack, causing the interlock plate 269 to bias into engagement with the seat-back support 28 by the wire spring 476. In this situation, return rotation of the seat-back support 28 from a forward-fold position causes the interlock post 472 to engage the interlock notch 46, thereby preventing return of the seat-back support 28 to a use or upright position.

The second RFK half 14 includes inner and outer plates 32*a*, 34*a* between which the second recliner mechanism 18 is operably supported. The second seatback support 30 is pivotally supported between the inner and outer plates 32*a*, 34*a* and is in selective engagement with the recliner mechanism 18 for pivotally positioning the second seatback support 30 as best shown in FIG. 3. An actuation lever 114*a* is pivotally supported between the inner and outer plates 32*a*, 34*a* and is in operable engagement with the second recliner mechanism 18 as well as the first recliner mechanism 16 of the first RFK half 12. In view of the substantial similarity in structure and function of the components associated with the first RFK half 12 with respect to the second RFK half 14, like reference numerals are used hereinafter and in the drawings to identify like components while like reference numerals containing letter extensions are used to identify those components that have been modified.

Figure 5A:
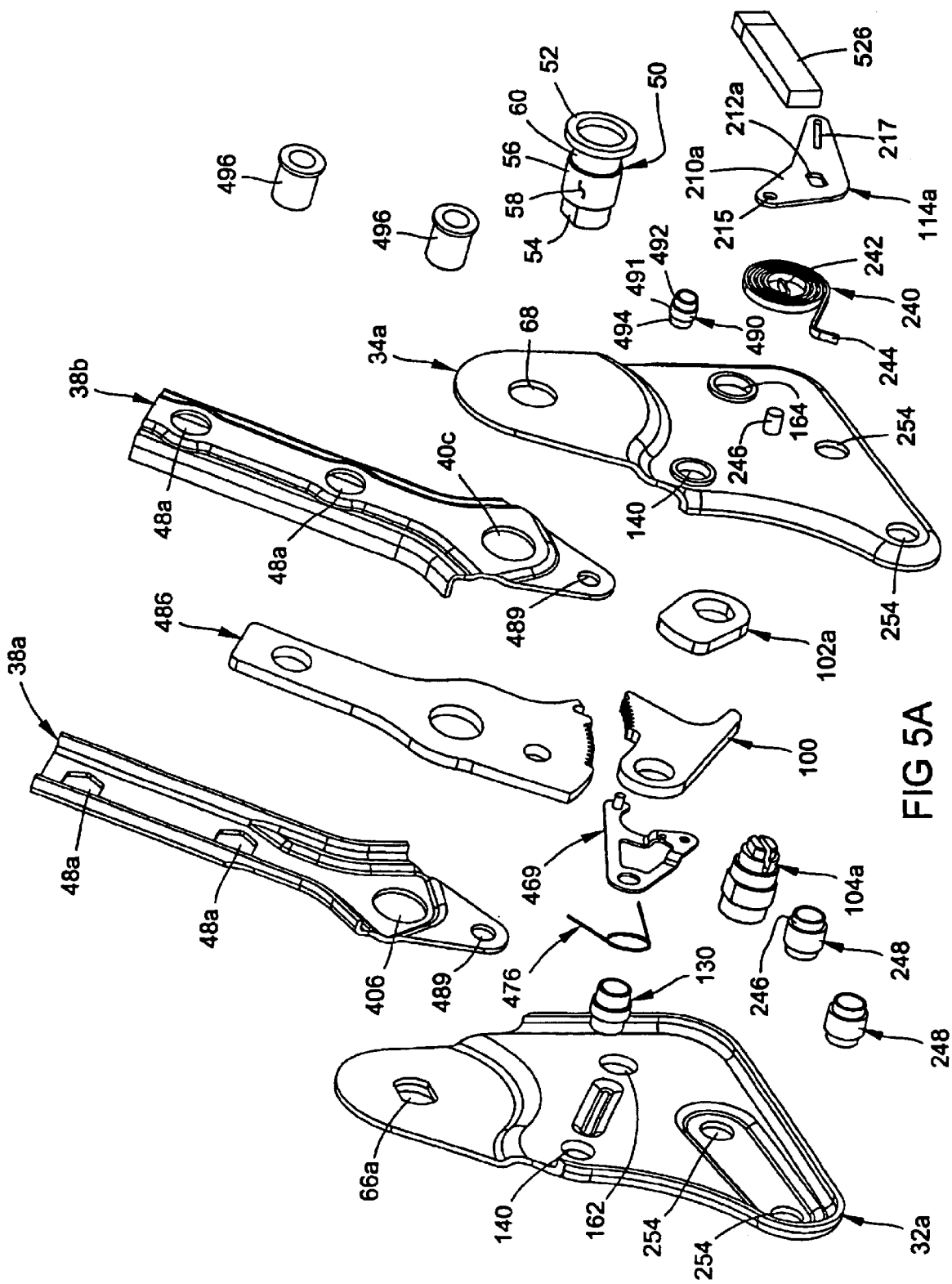
FIG. 5a is an exploded view the second recliner mechanism of the recliner, floor-latch, and kneel assembly.
Figure 5B:
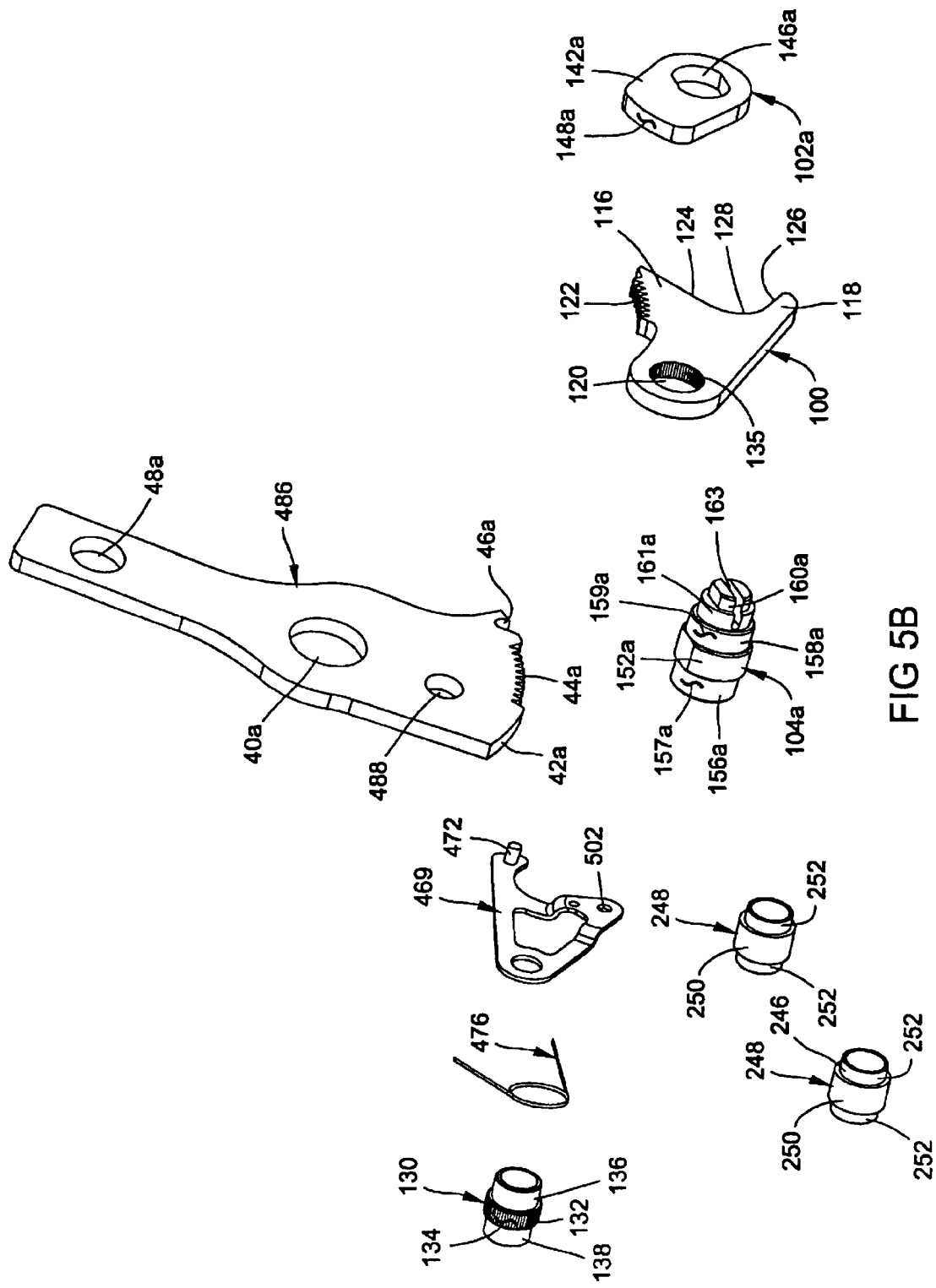

The second seatback support 30 includes first and second generally triangular-shaped housing plates 38a, 38b and a locking plate 486 disposed therebetween as best shown in FIGS. 3, 5a, and 5b. Locking plate 486 is a generally flat member having a pivot aperture 40a, an attachment aperture 488, and an arcuate edge 42a. A portion of the arcuate edge 42a includes a plurality of teeth 44a formed therein and an interlock notch 46a. The first and second housing plates 38a, 38b include pivot apertures 40b, 40c and an attachment aperture 489. In addition, the locking plate 486 and the first and second housing plates 38a, 38b include auxiliary apertures 48a for attachment of a seatback frame (not shown) thereto.

As previously discussed, the locking plate 486 is disposed between the first and second housing plates 38a, 38b and is attached therebetween by a rivet 490 having a central cylindrical section 491 received by aperture 488 of the locking plate. Rivet 490 further includes first and second cylindrical sections 492, 494 disposed on opposite sides of the central cylindrical section 491, whereby cylindrical sections 492, 494 are received by attachment apertures 489 of the first and second housing plates 38a, 38b such that the locking plate 486 is fixedly held therebetween. In addition, the central cylindrical section 491 has a larger diameter than that of the first and second cylindrical sections 492, 494 and as such acts as a spacer between the first and second housing plates 38a, 38b. In this manner, the locking plate 486 is fixed for rotation with the first and second housing plates 38a, 38b. In addition, rivets 496 are received through auxiliary apertures of the first and second housing plates 38a, 38b and the locking plate 486 to further fix the housing plates 38a, 38b and the locking plate 486 together as best shown in FIGS. 3, 5a, and 5b.

The seatback support 30 is pivotally supported between the inner and outer plates 32a, 34a by a seatback support pivot 50. The seatback support pivot 50 includes a disc end 52, a keyed cylindrical section 54, a first cylindrical section 56 having a bearing surface 58, and a second cylindrical section 60. The support pivot 50 is received through a keyed aperture 66a of the inner plate 32a, the pivot apertures 40b, 40c of the first and second housing plates 38a, 38b, the pivot aperture 40a of the locking plate 486, and a pivot aperture 68a of the outer plate 34a. The keyed cylindrical section 54 aligns with the keyed aperture 66a of the inner plate 32a for fixing the support pivot 50 from rotating relative to the inner and outer plates 32a, 34a. The first cylindrical section 56 aligns within the pivot apertures 40b, 40c of the first and second housing plates 38a,38b and the pivot aperture 40a of the locking plate 486, whereby the second seatback support 30 pivots on the bearing surface 58. The second cylindrical extension 60 aligns with the pivot aperture 68 of the outer plate 34a.

The second recliner mechanism 18 includes a pawl 100, a recliner cam 102a, a main pivot 104a, and an actuation lever 114a. The pawl 100 includes first and second extensions 116, 118 and an attachment aperture 120. The first extension 116 includes a plurality of teeth 122 for selective engagement with the teeth 44a of the second seatback support 30 for defining a plurality of pivotal positions (i.e., recline positions) of the seat-back support 30 relative to the inner and outer plates 32a, 34a and an engagement face 124 for interaction with the recliner cam 102a as will be described further below. The second extension includes an engagement face 126 and is generally opposite the engagement face 124 such that a cam recess 128 is defined therebetween.

The pawl 100 is pivotably supported between inner and outer plates 32a, 34a by a pivot 130 whereby pivot 130 includes a central cylindrical section 132 having engagement surface 134 and is flanked by first and second cylindrical sections 136, 138. The central cylindrical section 132 is received by the attachment aperture 120 such that the pawl 100 is restricted from rotating about engagement surface 134 while the first and second cylindrical sections 136, 138 are rotatably attached to the inner and outer plates 32a, 34a through apertures 140. Relative rotation between the pawl 100 and the attachment aperture 120 is accomplished by a splined connection 135 as shown in FIG. 5b. While the splined connection 135 is disclosed, any other suitable means of preventing relative rotation between the pawl 100 and the pivot 130 such as welding are anticipated and should be considered within the scope of the present invention.

The recliner cam 102a is a generally flat member having an extension 142a and a keyed attachment aperture 146a formed therethrough. The extension 142a includes a reaction surface 148a for interaction with engagement faces 124 and 126 of pawl 100. The recliner cam 102a is pivotably supported between the inner and outer plates 32a, 34a about the main pivot 104a.

The main pivot 104a includes a central keyed section 152a flanked by first and second cylindrical sections 156a, 158a having bearings surfaces 157a, 159a and a third keyed section 160a extending from a third cylindrical section 161a. The first cylindrical section 156a is received through attachment aperture 162 of inner plate 32a while the second cylindrical section 158a is received through attachment aperture 164 of the outer plate 34a such that the main pivot 104a is permitted to rotate on the first and second bearing surfaces 157a, 159a relative to the inner and outer plates 32a, 34a. The central cylindrical section 152a receives attachment aperture 146a of the recliner cam 102, whereby the recliner cam 102a is allowed to pivot relative to the housing plates 32a, 34a. Specifically, the keyed attachment aperture 146a of the recliner cam 102a matingly receives the central keyed section 152a of the main pivot 104a to prevent relative rotation therebetween.

The third cylindrical section 161a is disposed adjacent the second cylindrical section 158a and extends generally through attachment aperture 164 of the outer plate 34a. The third keyed section 160a is disposed adjacent the third cylindrical section 161a and extends generally away from an outer surface of the outer plate 34a. The third cylindrical section 161 and third keyed section 160a further include a slot 163 extending generally therethrough for interaction with the actuation lever as will be discussed in further detail herein below.

The actuation lever 114a generally includes a flat plate having a lever arm 210a and a keyed aperture 212a. The lever arm 210a includes a cable attachment aperture 215 at a first end and a slot 217 at a second end. The cable attachment aperture receives a cable 498 for communication with the first recliner mechanism 16. Specifically, cable 498 interconnects the actuation lever 114a of the second recliner mechanism 18 and the recliner cam 102 of the first recliner mechanism 16 such that as one of either the recliner cam 102 or the actuation lever 114a is caused to rotate the other is also caused to rotate. In one embodiment the slot 217 is provided with a handle 526 for manual manipulation of the actuation lever 114a as will be discussed further below. The keyed aperture 212a is matingly received by the third keyed section 160a of the main pivot 104a such that the main pivot 104a is fixed for rotation with the actuation lever 114a.

The actuation lever 114a is rotationally biased in a neutral position by a coil spring 240. The coil spring 240 includes a central flat 242 and an outwardly extending arm 244. The central flat 242 is received by the slot 217 of the third cylindrical section 161a and the third keyed section 160a while the extending arm 244 engages an anchor point 246 on the outer plate 34a. As the actuation lever 114a is caused to rotate from the neutral position, the coil spring 240 biases the actuation lever 114a back towards the neutral position.

A spacer 248 is further provided for spacing the inner and outer plates 32a, 34a. The spacer 248 includes a central cylindrical section 250 and side cylindrical sections 252. The side cylindrical sections 252 are received into apertures 254 of the inner and outer plates 32, 34, whereby the spacer 248 is supported therebetween. A width of the central cylindrical section 250 defines a distance between the inner and outer plates 32a, 34a.

The second RFK half 14 further includes a second interlock assembly 500 having an interlock plate 469 to prohibit positioning the second seatback support 30 in a use or upright position if either floor-latch mechanism 20, 22 or either kneel mechanism 24, 26 are not properly latched. The floor latch mechanisms 20, 22 are considered in the latched position when securely latched to a striker 353 while the kneel mechanisms 24, 26 are considered in the latched position when the locking pawl 376 is securely engaged to the cross member 374.

The interlock plate 469 is pivotally supported adjacent an outer surface of outer plate 34a by pivot 130 and includes an interlock post 472 selectively engagable with the seat-back support 30. A wire spring 476 is disposed about the interlock plate 469 to impart a bias force on the interlock plate 469. In this manner, the interlock post 472 is biased toward engagement with the seat-back support 30. However, a second interlock cable 479 operably interconnects the interlock plate 469 and the second kneel mechanism 26. Specifically, the second interlock cable 479 is received through a cable aperture 502 of the interlock plate 469 at a first end and received by the second kneel mechanism 26 at a second end. As the second interlock cable 479 is placed under tension, the interlock plate 469 rotates and thereby allows movement of the second seatback support.

As explained in further detail below, tension on the second interlock cable 479 is present when both kneel mechanisms 24, 26 are properly engaged, thereby causing the interlock plate 269 to be pulled against the bias of the spring 476 and enabling return of the seat-back support 30 from a forward-fold position to a use or upright position. If, on the other hand, either kneel mechanisms 24, 26 is not properly secure, the second interlock cable 479 is slack, causing the interlock plate 269 to bias into engagement with the seat-back support 30 by the wire spring 476. In this situation, return rotation of the seat-back support 30 from a forward-fold position causes the interlock post 472 to engage the interlock notch 46a, thereby preventing return of the seat-back support 30 to a use or upright position.

While the first interlock assembly 468 is disclosed in operable communication with the first floor latch mechanism 20 and the second interlock assembly 500 is disclosed in operable communication with the second kneel mechanism 24, it should be understood that the first interlock assembly 468 could alternatively be in operable communication with the second floor latch mechanism 22 while the second interlock assembly 500 could be in operable communication with the first kneel mechanism 24, and should be considered within the scope of the present invention. In addition, the first interlock assembly 468 could be operably connected to either the first or second kneel mechanism 24, 26, while the second interlock assembly 500 could be operably connected to either the first or second floor latch mechanism 20, 22, and should be considered within the scope of the present invention.

The second RFK half 14 further includes the second floor latch mechanism 22 and the second kneel mechanism 26. The second floor latch mechanism 22 and second kneel mechanism 26 are virtually identical to the first floor latch mechanism 20 and the first kneel mechanism 24 respectively and have been described in detail above. Again, like reference numerals are used hereinafter and in the drawings to identify like components while like reference numerals containing letter extensions are used to identify those components that have been modified.

The first and second floor latch mechanisms 20, 22 are in operable communication with one another through cable 272 such that when either of the floor latch mechanisms are latched or unlatched, the other floor latch mechanism is also caused to be latched or unlatched. Similarly, the first and second recliner mechanisms 16, 18 are in operable communication with each other via cable 498 such that as either of the recliner mechanisms are released, the other recliner mechanism also releases, thereby allowing for pivotable adjustment of the first and second seatback supports 28, 30.

Another cable 504 is provided to interconnect the first and second kneel mechanisms 24, 26 such that when either of the kneel mechanisms are latched or unlatched, the other kneel mechanism is also caused to be latched or unlatched. Specifically, a first end of cable 504 is received by the actuation lever 380 at the cable attachment aperture 426 on the first kneel mechanism 24 while a second end of cable 504 is similarly received by the cable attachment aperture 426 of the second kneel mechanism 26. Rotation of either actuation lever 380 will simultaneously cause the cable 504 to be placed under tension and subsequently rotate the other actuation lever 380 causing the kneel mechanism to disengage the cross member 374.

Figure 16:
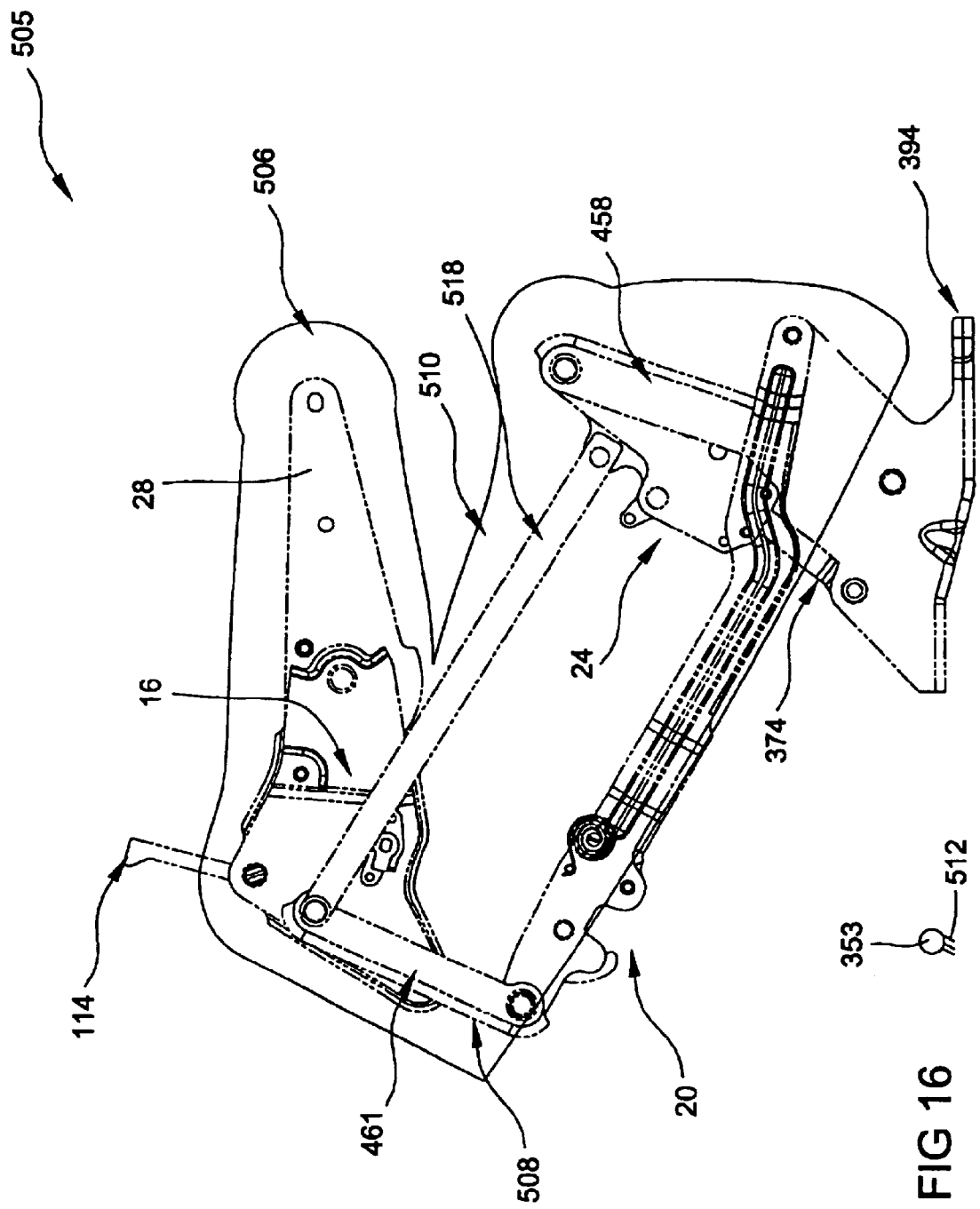
FIG. 16 is a side view of the seat assembly partially dumped forward.

In one embodiment, the RFK 10 is integrated into a vehicle seat assembly 505 having a seatback 506, a support structure 508, and a seat bottom 510, as best shown in FIGS. 15–17. The support structure includes a set of strikers 353 fixedly mounted to a vehicle structure 512 through mounting bracket 514, front support members 458 pivotably supported by lower brackets 394, rear support members 461 pivotably supported by the first and second floor latch mechanisms 20, 22, and seat bottom support brackets 518 pivotably supported by the front and rear support members 458, 461.

The seat bottom 510 is supported by the front and rear support members 458, 461. The front support members 458 are rotatably attached to the lower bracket 394 through attachment apertures 467 of the lower bracket 394 and attachment apertures 465 of the front support member 458. Specifically, apertures 465 of the front support member 458 and apertures 467 of the lower bracket 394 receive a pivot 466 having an axially surrounding collar 467 such that the front support member 458 rotates relative to the lower bracket 394 about collar 467.

The rear support members 461 are substantially similar to the front support members 458, whereby like reference numerals are used hereinafter and in the drawings to identify like components while like reference numerals containing letter extensions are used to identify those components that have been modified. The rear support members 461 include a front face 459 and including integral side supports 460a formed therewith. The side supports 460a include a first set of apertures 462a at a first end that receive a pivot 466 having an axially surrounding collar 467. The rear support members 461 are rotatably attached to through attachment apertures 364 of the first and second floor latch mechanisms 20, 22. Attachment apertures 364 receive another pivot 466 having an axially surrounding collar 467 such that the rear support members 461 rotate relative to housings 264 of the first and second floor latch mechanisms 20, 22 about collar 467.

The front and rear support members 458, 461 are pivotably supported at one end by the seat bottom support brackets 518 and at a second end by housing 462. The seat bottom support brackets 518 are elongate members having side support members 520, 522 including first and second attachment apertures 524, 526 formed therethrough. The seat bottom support brackets 518 are received by the side supports 460 of the front support members 458 such that the first attachment apertures 524 line up with the attachment apertures 462 of the front support member 458 and are pivotably attached thereto by another pivot 466. Pivot 466 again includes an axial collar 467 on which the front support member 458 and seat bottom support brackets 518 pivot.

The housing 462 is pivotably connected to the rear support brackets 461 at one end as previously discussed, and to the lower bracket 394 at the other end. Attachment apertures 366 receive another pivot 466 having an axial collar 467 to pivotably attach the housing 462 to the lower bracket 394 through attachment apertures 395 of the lower bracket 394. As such the housing 462 is allowed to pivot relative to the lower bracket 394 about the collar 467. In this manner, the housing 462 is pivotably connected to the front support member 458 since the front support member 458 is pivotably supported by the lower bracket 394 at attachment aperture 395.

With particular reference to FIGS. 8–17, the operation of the RFK 10 will be described in detail. The RFK 10 provides for three operational modes including articulation of the seatback 506 relative to the seat bottom 510, articulation of the seatback 506 relative to the seat bottom 510 including forward dumping of the seat assembly 505, and kneeling of the seat assembly 505 relative to the vehicle structure 512.

The first operational mode includes articulation of the seatback 506 relative to the seat bottom 510 and is best shown in FIGS. 8–12. In one embodiment, the seat 505 is provided with a handle 526 fixedly attached to the actuation lever 114a of the second recliner mechanism 18. To articulate the seatback 506 relative to the seat bottom 510 a force is applied to the handle 526 such that the actuation lever 114a is caused to rotate. Sufficient rotation of the actuation lever 114a causes rotation of the main pivot 104a and subsequently the recliner cam 102a. Rotation of the recliner cam 102a causes the reaction face 148a to disengage the first extension of the pawl 100. Without the bias from the recliner cam 102a, the pawl 100 is caused to rotate in the first rotational direction, or counterclockwise (CCW) as shown in FIG. 3. Sufficient rotation of the pawl 100 disengages the teeth 122 of the pawl 100 from the teeth 44a of the second seatback support 30. In this manner the seatback support 30, and subsequently the seatback 506, are free to rotate.

Figure 8:
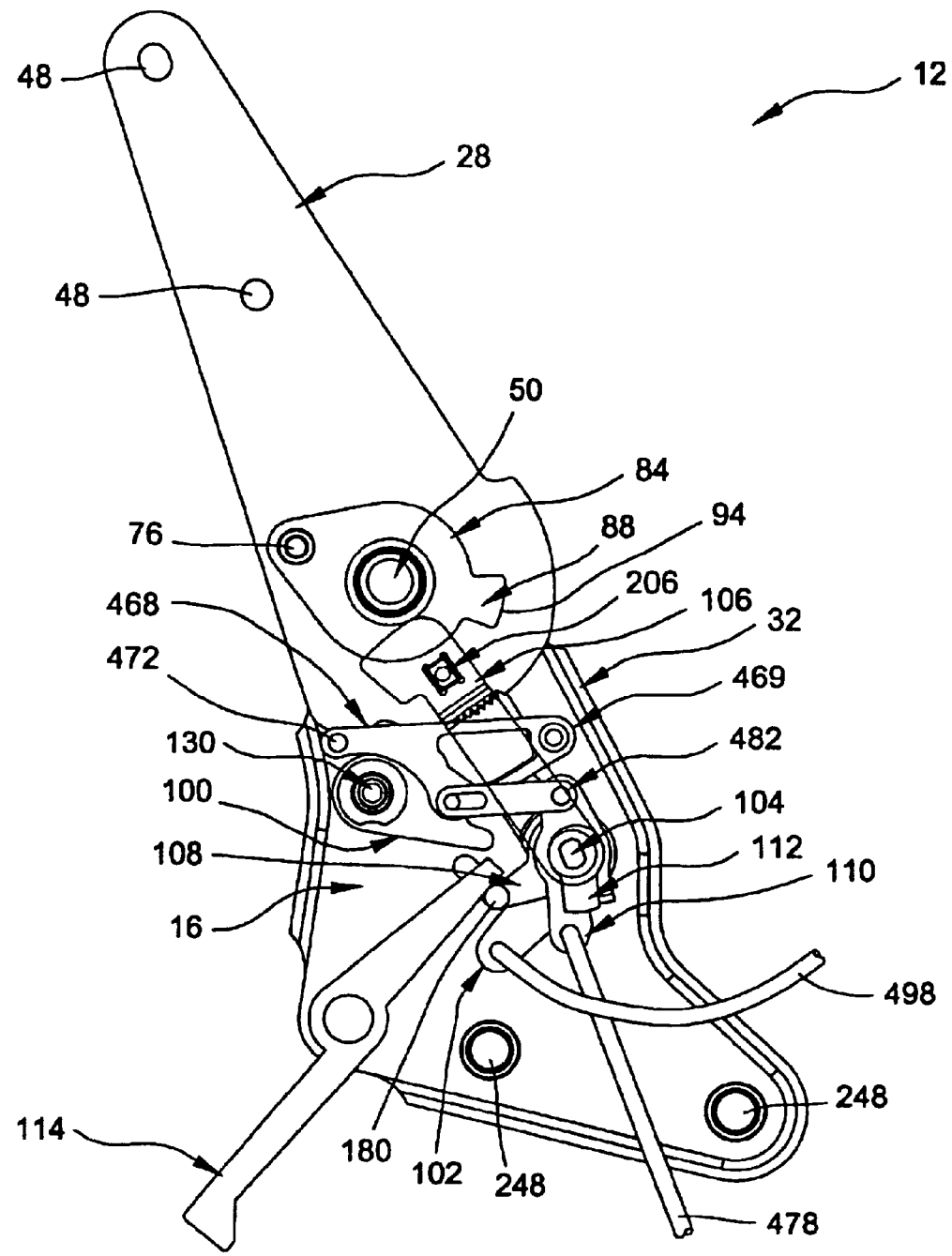
FIG. 8 is a side view of the first recliner mechanism with a trigger assembly activated.

As the recliner cam 102a is caused to rotate, cable 498 is placed under tension and subsequently applies a force to the second extension 144 of the recliner cam 102 of the first RFK half 12. As a sufficient force is applied to the second extension 144, the recliner cam 102 is caused to rotate about the main pivot 104. Sufficient rotation of the recliner cam 102 will cause the first extension 142 to disengage the pawl 100, thereby allowing the pawl 100 to rotate in the second rotational direction, or clockwise (CW) as shown in FIG. 8. Further rotation of the recliner cam 102 causes the first extension 142 to engage the second extension 118 of the pawl 100 to further rotate the pawl in the second rotational direction. Once the pawl 100 is rotated sufficiently in the first rotational direction the teeth 122 of the pawl 100 disengage the teeth 44 of the first seatback support 28, thereby allowing the first seatback support 28 to rotate relative to the inner and outer plates 32, 34.

Having both the first and second recliner mechanisms 16, 18 disengaged from the first and second seatback supports 28, 20 respectively allows the coil spring 70 to rotate the first seatback support 28 in the second rotational direction, or clockwise as shown in FIG. 8. Because the first and second seatback supports 28, 30 are received by the seatback 506 rotation of either of the first or second seatback supports 28, 30 causes the other to rotate therewith. As previously discussed, forward or clockwise (CW) rotation of the first seatback support 28 subsequently rotates the second seatback support 30 and the seatback 506 relative to the seat bottom 510. Rotation of the first seatback support 28 is limited by the interaction of the post 76 and the first reaction surface 79 of the inner plate 32. Specifically, when the seatback 506 is sufficiently rotated, post 76 engages the first reaction surface 79 to prevent further forward movement of the first seatback support 28 relative to the inner and outer plates 32, 34. In this manner, a range of pivotal motion of the first and second seatback supports 28, 30 is defined.

To return the seatback 506 to a usable position, a force is applied generally to the seatback 506 against the bias of the coil spring 70 causing the seatback 506 to be rotated in the first rotational direction (CCW). Sufficient rotation of the seatback 506 causes the pawl 100 of the first recliner mechanism 12 to reengage the teeth 44 of the first seatback support 28 such that the seatback support 28 returns to the most forward locked position relative to the seat bottom 510. Specifically, the coil spring 166 biases the pawl 100 into engagement with the first seatback support 28 and is held in engagement with the first seatback support 28 by the coil spring 166 and the first extension 142 of the recliner cam 102, as will be discussed further below. Concurrently, the pawl 100 of the second recliner mechanism 14 reengages the teeth 44a of the second seatback support 30 due to the bias of coil spring 240. Specifically, as the actuation lever 114a is released, the coil spring 240 biases the actuation lever 114a in the second rotational direction, or CW as shown in FIG. 3, such that the actuation lever 114a rotates the main pivot 104a.

Rotation of the main pivot 104a causes the recliner cam 102a to rotate in the second rotational direction, or CW, thus causing the recliner cam 102a to disengage the second extension 116 of the pawl 100 and engage the first extension 118. When reaction surface 148a of the recliner cam 102a contacts the engagement face 124a of the pawl 100 the pawl is caused to rotate in the first rotational direction or CCW. As such, the pawl 100 is biased into engagement with the second seatback support 30. Sufficient rotation of the seatback 506 causes the pawl 100 of the second recliner mechanism 14 to reengage the teeth 44a of the second seatback support 30 such that the seatback support 30 returns to the most forward locked position relative to the seat bottom 510.

As the seatback 506 is returned to the upright or usable position, the coil spring 240 biases the actuation lever 114a in the second rotational or CW direction. Movement of the actuation lever 114a in this manner causes the cable 498 to move therewith. As the cable 498 moves, the recliner cam 102 of the first recliner mechanism 16 is caused to rotate in the first rotational direction (CCW) and subsequently causes the first extension 142 to engage the first extension 116 of the pawl. As such, the first extension 142 of the recliner cam 102 causes the pawl 100 to rotate CCW until the pawl 100 engages the first seatback support 28. Once the pawl 100 engages the first seatback support 28, the first extension 142 serves to hold the pawl 100 in engagement with the first seatback support 28.

To further adjust the seatback 506 relative to the seat bottom 510 such that the seatback 506 is reclined or moved from a forward-most upright position, a force is again applied to the handle 526 and concurrently to the seatback 506. As the handle 526 causes the actuation lever 114a to rotate, the pawl 100 of the first recliner mechanism 16 and the pawl 100 of the second recliner mechanism 18 respectively disengage the first and second seatback supports 28, 30 such that pivotable movement of the seatback 506 against the bias of the coil spring 70 is permitted as previously discussed. Once the seatback 506 is sufficiently rotated in the first rotational direction (CCW) such that the desired angle of the seatback 506 relative to the seat bottom 510 is achieved, the handle 526 is released and the pawl 100 of the first recliner mechanism 16 and the pawl 100 of the second recliner mechanism 18 lock the seatback 506 in the desired position as previously discussed.

The second operational mode includes articulation of the seatback 506 relative to the seat bottom 510 including forward dumping of the seat assembly 505. In one embodiment, the RFK assembly 10 is incorporated into a seat 505 as best shown in FIGS. 15–17. To articulate the seatback 506 relative to the seat bottom 510, a force is applied to the actuation lever 114 against the bias of coil spring 240 causing the lever arm 210 of the actuation lever 114 to rotate in the second rotational direction (CW) relative to the view in FIG. 8 and engage the recliner cam 102 and the latch cam 108. Specifically, sufficient rotation of the actuation lever 114 causes the lever arm 210 to contact the second cylindrical section 184 of pin 180, thereby causing the latch cam 108 to rotate in the first rotational direction (CCW) and causing the main pivot 104 to rotate therewith.

As the pin 180 is rotated in the first rotational direction (CCW), the second cylindrical section 184 of pin 180 will eventually engage the second extension 144 of the recliner cam 102 causing the recliner cam 102 to rotate therewith. As previously discussed in the first operational mode, rotation of the recliner cam 102 causes the pawl 100 to disengage the first seatback support 28 to allow pivotal movement of the seatback 506 relative to the seat bottom 510. In addition, rotation of the recliner cam 102 causes the cable 498 to be placed under tension, thereby rotating the actuation lever 114a and releasing the pawl 100 of the second recliner mechanism 18 from the second seatback support 30. With both the first and second seatback supports 28, 20 released from their respective recliner mechanisms 16, 18, the seatback 506 is free to rotate under the bias of coil spring 70 in the second rotational direction (CW).

As the seatback 506 is released and allowed to rotate, continued rotation of the actuation handle 114 causes further rotation of the main pivot 104. Rotation of the main pivot causes the latch cam 108, trigger plate 106, and key 112 to rotate therewith. Further rotation of the latch cam 108 causes the main pivot 104 to rotate the trigger plate 106 such that the trigger plate 106 is in an activated position and able to interact with the first seatback support 28 as best shown in FIG. 8. More particularly, as the trigger plate 106 is sufficiently rotated by the main pivot 104, the forward (CW) rotation of the first seatback support 28 will cause the sector plate 184 to engage the trigger plate as shown in FIG. 9.

Figure 10:
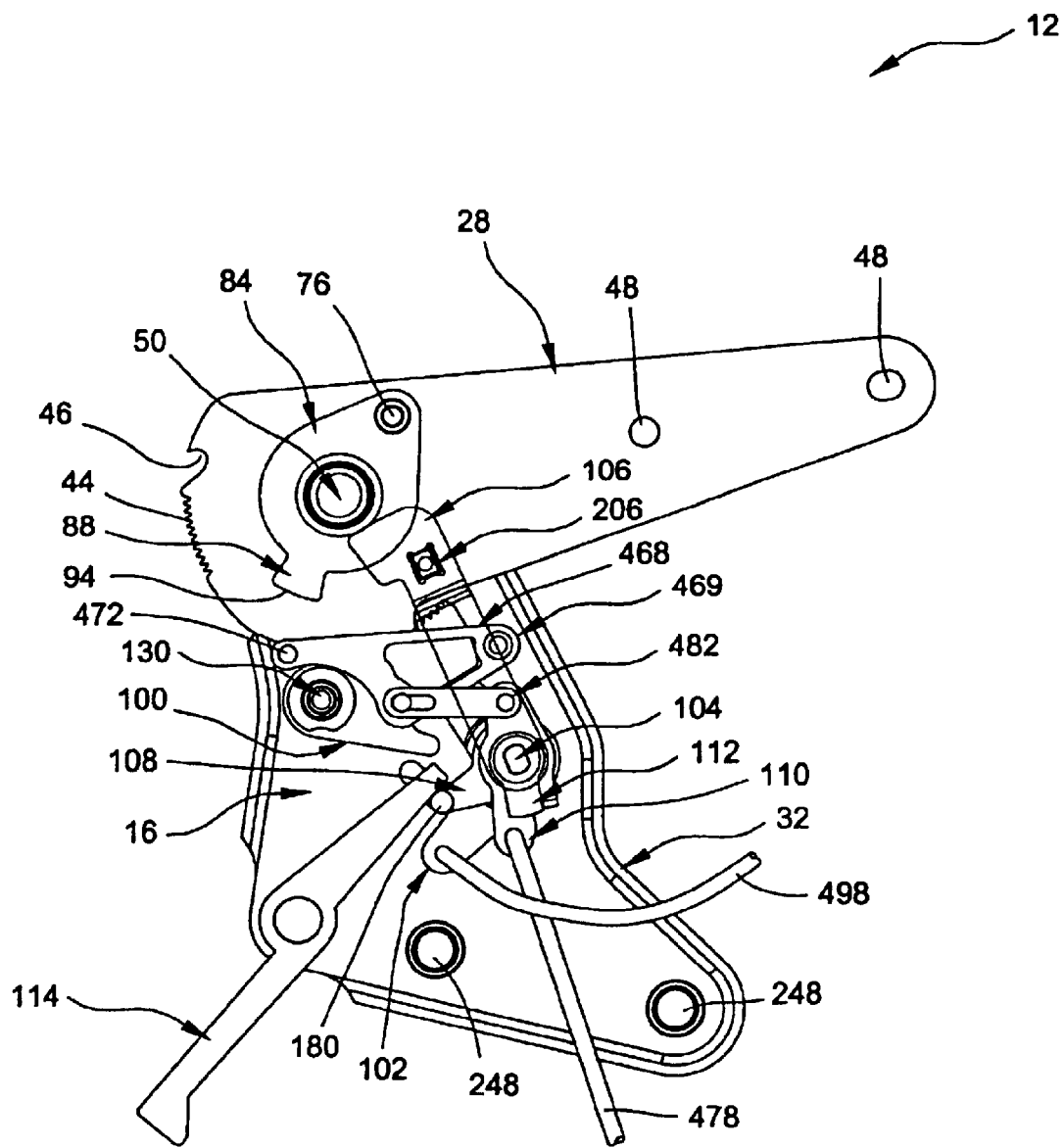
FIG. 10 is a side view of the first recliner mechanism with a trigger mechanism reset.
Figure 11:
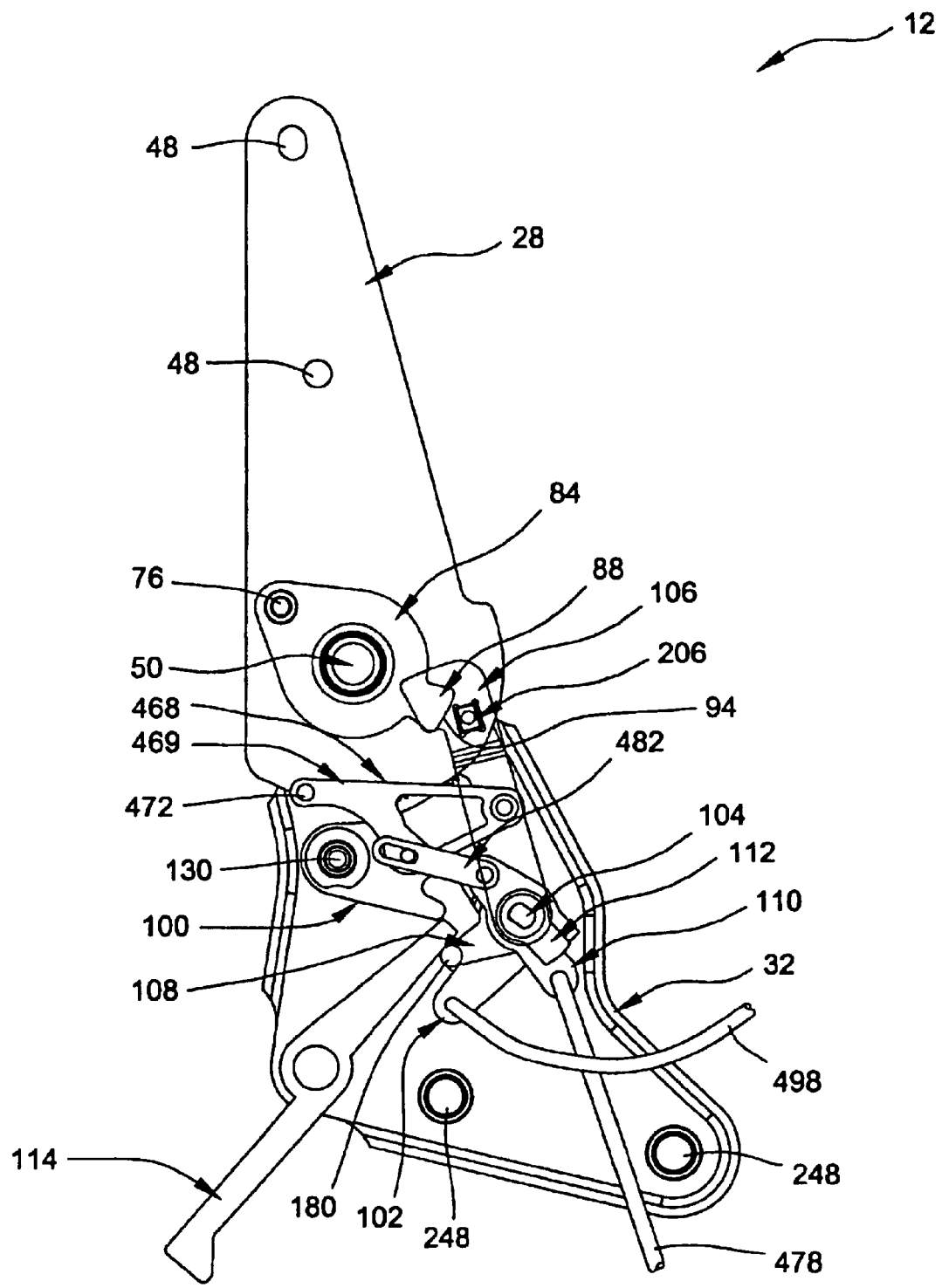
FIG. 11 is a side view of an interlock mechanism in the locked position.
Figure 12:
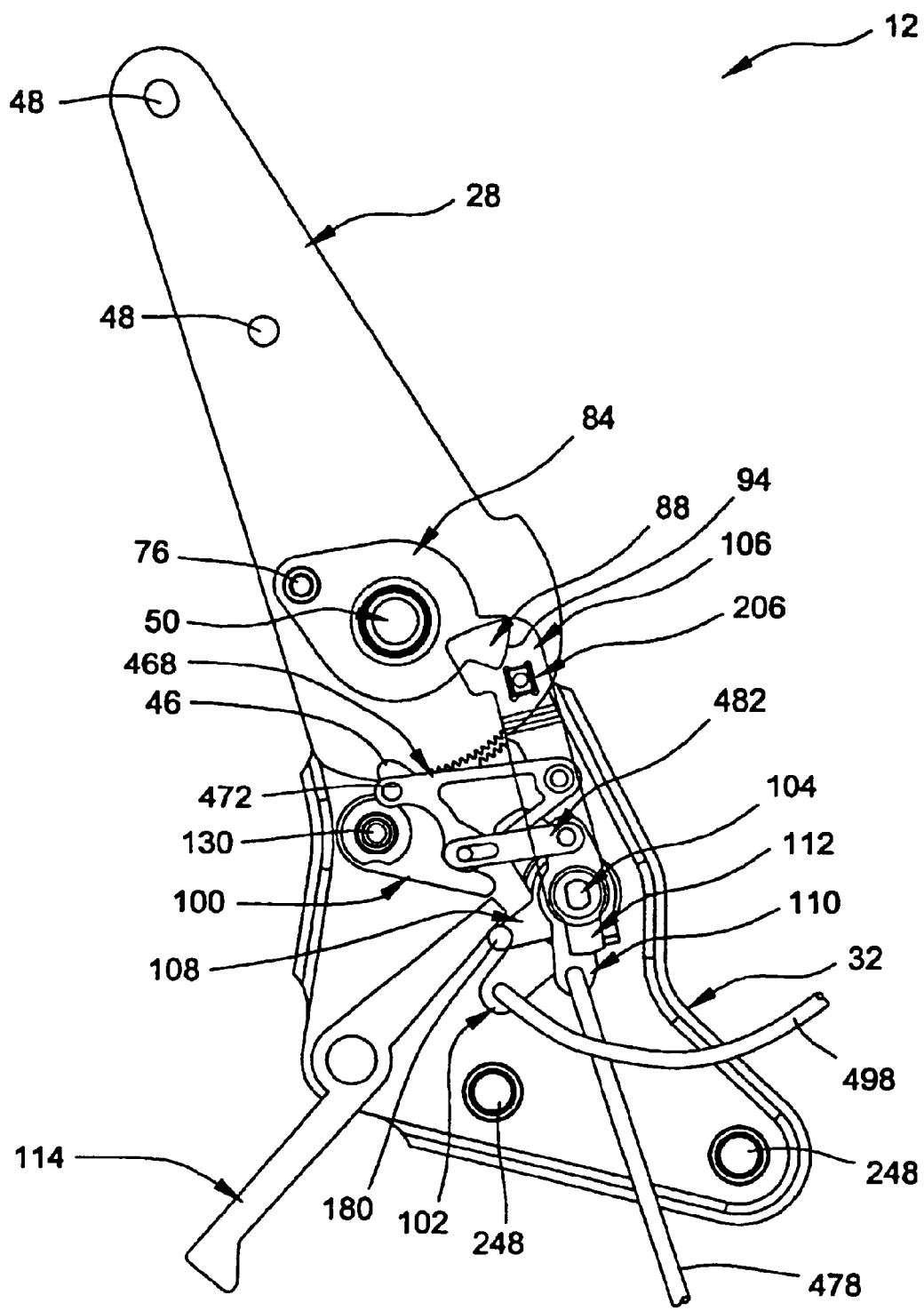
FIG. 12 is a side view of an interlock mechanism in the released position.

As the main pivot 104 rotates the trigger plate 106 into an activated position, the pin 206 of the trigger plate 106 engages the first reaction surface 90 of the sector plate 184 as the seatback 506 is caused to rotate forward (CW) under the bias of the coil spring 70. Continued rotation of the seatback 506 causes the pin 206 to move from the first reaction surface 90 and onto the arcuate surface 94 as shown in FIG. 9. As the pin 206 moves along the arcuate surface 94 generally from the first reaction surface 90 to the second reaction surface 92, the trigger plate 106 is caused to further rotate in the first rotational direction (CCW). Once the pin 206 has completely moved from the first reaction surface 90 across the arcuate surface 94, the pin 206 then disengages the cam surface 88 altogether and the first seatback support 28 continues forward rotation as best shown in FIGS. 10–12.

Figure 9:
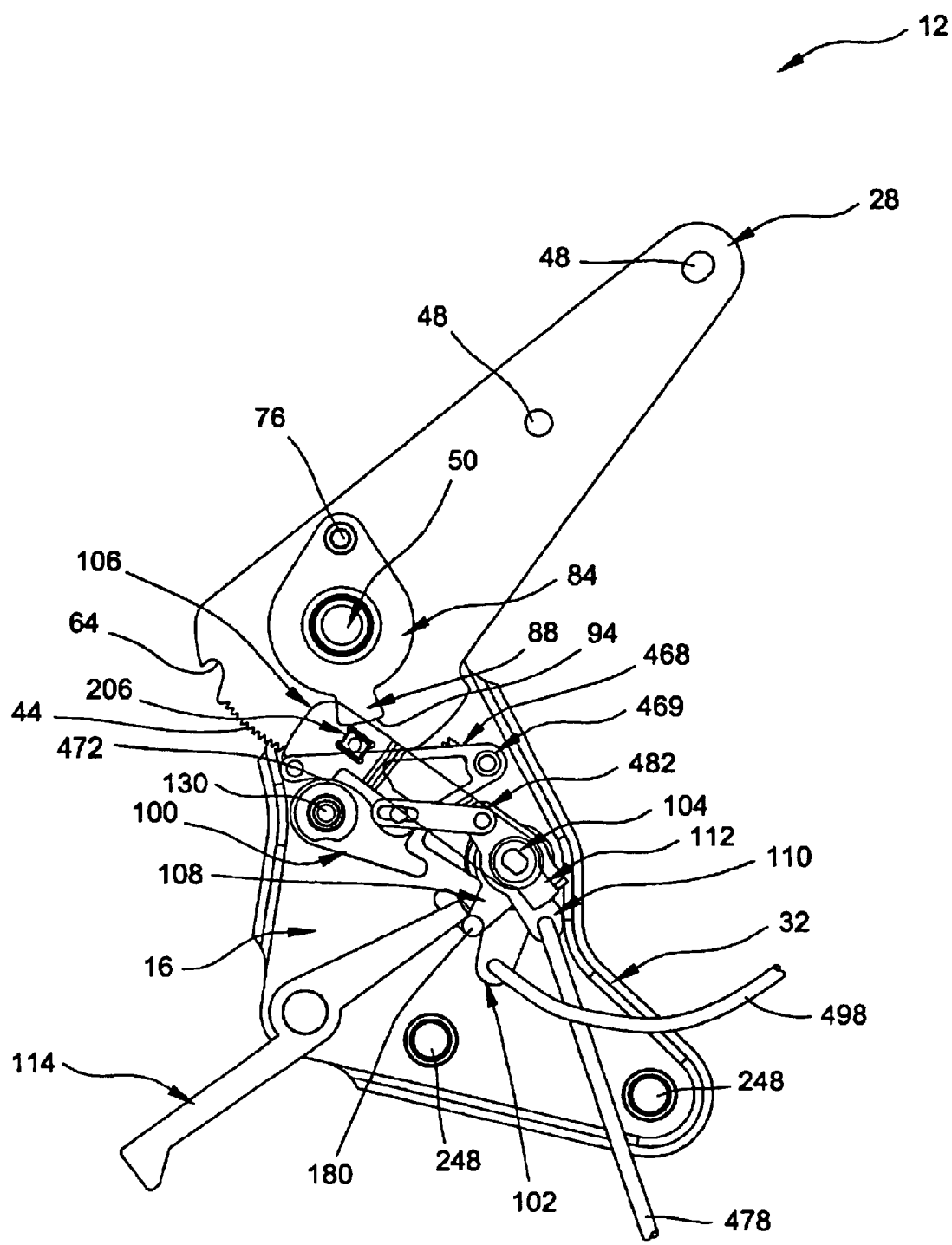
FIG. 9 is a side view of the first recliner mechanism with a trigger activated and contacting a seatback support member.

Further rotation of the main pivot 104 caused by the rotation of the trigger plate 106 causes the key 112 to engage the tab 194 of the latch link 110 and rotate the latch link 110 as best shown in FIG. 9. Rotation of the latch link 110 causes the cable 478 to be placed under tension, thereby causing the actuation handle 259 of the first floor latch mechanism 20 to rotate and release the first floor latch mechanism 20 from the striker 353. Specifically, as the actuation handle 259 rotates, the actuation cam 258 is caused to rotate against the bias of coil spring 304 and engage the latch cam 260. As the extension 298 of the actuation cam 258 rotates in the first rotational direction (CCW), the engagement face 302 of the extension 298 will contact the second extension 316 of the latch cam 260 and cause the latch cam 260 to rotate in the second rotational direction or CW as best shown in FIGS. 13a and 13b. Continued rotation of the actuation cam 258 and subsequently the latch cam 260 causes the first extension 314 of the latch cam 260 to disengage the reaction face 338 of the latch 262.

At this point, the latch 262 is free to pivot unrestricted by the latch cam 260 and as such, the latch spring 342 causes the latch 262 to rotate in the in the first rotational direction (CCW). Sufficient rotation of the latch 262 will release the latch 262 from the striker 253, thereby releasing the first floor latch mechanism 20 from the vehicle structure 512.

To fully dump the seat 505 forward both floor latch mechanisms must be disengaged from their respective strikers 353. The second floor latch mechanism 22 operates in the same fashion as the first floor latch mechanism 20 with the exception that the second floor latch mechanism 22 does not communicate directly with the first recliner mechanism 16. The second floor latch mechanism 22 is actuated through the cable 272 interconnecting the actuation lever 259 of the first floor latch mechanism 20 and the actuation lever 259 of the second floor latch mechanism 22. Specifically, as the actuation lever 259 of the first floor latch mechanism 20 is caused to rotate, the cable 272 is placed under tension and causes the actuation lever 259 of the second floor latch mechanism 22 to rotate. As such, the first and second floor latch mechanisms 20,22 are generally concurrently released from their respective strikers 353 as shown in FIG. 13b, thereby allowing the seat 505 to dump forward and rotate about pivot 166 such that the front support members 458 rotate relative to the lower bracket 394. At this point, the seatback 506 is fully pivoted forward and the seat 505 is fully dumped forward.

To return the seat to a usable condition, a force is applied generally to the seat 505 such that the front support members 458 rotate relative to the lower bracket 394 about pivot 166 in the first rotational direction (CCW as shown in FIG. 16). As the seat 505 is rotated into position, the first and second floor latch mechanisms 20,22 are free to accept strikers 353 and re-latch to the vehicle structure 512. The latch plate 354 is positioned such that the reaction face 356 of the latch plate 512 receives a striker 353 and causes the latch 262 to rotate in the second rotational direction (CW). In this manner, the striker recess 340 accepts the striker 353 and further rotates the latch 262 CCW against the bias of the latch spring 342 as shown in FIG. 13*a*.

With particular reference to FIG. 13*a*, the latch 262 is again held in the latched position due to the engagement of the latch cam 260. Specifically, the engagement face 318 of the latch cam 260 engages the latch 262 due to the bias of the coil spring 304. Specifically, the coil spring 304 causes the actuation cam 528 to be biased in second rotational direction (CW) such that the second extension 299 of the actuation cam 258 contacts the second extension 316 of the latch cam 260, thereby rotating the latch cam 260 in the first rotational direction (CCW). Once the latch cam 260 is sufficiently rotated the second extension 299 of the actuation cam 258 contacts the second extension 316 of the latch cam 260, thereby rotating the engagement face 318 of the latch cam 260 into a position to receive the engagement face 338 of the latch 262. Once the engagement face 338 of the latch 262 engages the engagement face 318 of the latch cam 260 the latch mechanism is in the latched position.

Once both of the floor latch mechanisms 20, 22 are securely latched to strikers 353 the tension in the cable 272 interconnecting the first and second floor latch mechanisms 20,22 is released while the tension in cable 478 interconnecting the first floor latch mechanism 20 and the first recliner mechanism 16 is increased. As such, the latch link 110 and subsequently the main pivot 104 are rotated against the bias of spring 476. In this manner, the latch link 110 rotates the link 482 such that the interlock plate 269 is pulled against the bias of the spring 476 and enabling return of the seat-back support 28 from a forward-fold position to a use or upright position as previously discussed in the first operational mode and shown in FIG. 12. If, on the other hand, either floor-latch mechanism 20,22 is not properly secure, the first interlock cable 478 is slack, causing the interlock plate 269 to bias into engagement with the seat-back support 28 by the wire spring 476. In this situation, return rotation of the seat-back support 28 from a forward-fold position causes the interlock post 472 to engage the interlock notch 46, thereby preventing return of the seat-back support 28 to a use or upright position as shown in FIG. 11.

The third operational mode includes kneeling of the seat assembly 505 relative to the vehicle structure 512. In one In one embodiment, the RFK Assembly 10 is incorporated into a seat 505 as best shown in FIGS. 15–17. The kneeling function allows for the pivotal movement of the seat 505 forward while maintaining use of the vehicle seat 505. Specifically, the front support members 458 of the seat support structure 508 pivot about the lower bracket 394 and also about the seat bottom support brackets 518. In addition, the rear support members 361 pivot about the housings 264 of the first and second floor latch mechanisms 20, 22 and also about the seat bottom support brackets. In this manner, as the front and rear support members 458, 361 pivot forward, the seat bottom support brackets 518 longitudinally move forward while the bottom plate 394 and floor latch housings 462 remain attached to the vehicle structure 512 as best shown FIG. 17.

As previously mentioned the cross member 374 is pivotably supported at by pivot 166 at the junction of the front support members 458 and the seat bottom support brackets 518. As such, if the cross member 374 is in a latched position it is not permitted to slide relative to the housing 382 and the pivotal movement of the seat support structure 508 as previously described is not possible as best shown in FIG. 14*a*. To allow for selective pivotal movement of the seat support structure 508, the first and second kneel mechanisms 24, 26 have to be in an unlatched position such that the cross member 374 is permitted to slide relative to the housing 382 as shown in FIG. 14*b*.

To unlatch the first and second kneel mechanisms 24, 26 a force is applied to the external handle 528 of the second kneel mechanism 26 such that the actuation lever 380 is caused to rotate. As the actuation lever 380 is caused to rotate in the first rotational direction (CCW) the actuation handle 380 compresses the spring 446, thereby causing the ball 448 to rotate in socket 428. Once the actuation lever 380 is sufficiently rotated, the base of the extension 422 disengages the cross member 374. As the actuation lever 380 disengages the cross member 374, the teeth 390 of the cross member 374 disengage the teeth 414 of the locking pawl 376. As previously mentioned, the actuation handle 380 of the first kneel mechanism 24 is operably connected to the actuation handle 26 of the second kneel mechanism 26 by cable 504 and is therefore actuated concurrently with the second kneel mechanism 26.

With both cross members 374 of the first and second kneel mechanisms 24, 26 free to slide in their respective housings 382, the seat support structure 508 is free to pivot forward, as best shown in FIG. 17. To pivot the seat support structure 508 forward, a force is applied generally to the seat 505 once the first and second kneel mechanisms 24, 26 are in the unlatched position such that the seat is caused to move forward. Once the seat 505 begins to move forward, the cross members 374 rotate about pivot 166 at the lower bracket 394 and slide within the housings 382. At this point, the cross members 374 are both moving forward and down as the seat 505 and seat support structure 508 pivot forward and down. Forward movement of the seat 505 is restricted once the front support members 458 contact the lower bracket 394 as best shown in FIG. 17.

To return the first and second kneel mechanisms 24, 26 to the latched position, a force is again applied to the seat 505 such that the seat 505 is caused to move rearward and back into an upright position. Specifically, as the seat 505 is caused to rotate rearward, the cross member 374 slides in the housing 382 until the teeth 390 of the cross member 374 again contact the teeth 414 of the locking pawl 376. Due to the bias of the spring 446 on the actuation lever 380, the bottom face of the extension 422 is slidably engaged with the cross member 374 such that the cross member 374 is biased into engagement with the locking pawl 376. Once the seat 505 is sufficiently rotated rearward the teeth 390 of the cross member 374 engage the teeth 414 of the locking pawl 376, thereby returning the kneel mechanism to the latched position.

Once both of the kneel mechanisms 24, 26 are securely latched to the cross members 374, the tension in the cable 504 interconnecting the first and second kneel mechanisms 24,26 is released while the tension in cable 479 interconnecting the second kneel mechanism 26 and the second recliner mechanism 18 is increased. As such, the interlock plate 269 is rotated against the bias of spring 476. In this manner, the tension in the cable 479 causes the interlock plate 269 to be pulled against the bias of the spring 476 and enables the return of the seat-back support 30 from a forward-fold position to a use or upright position as previously discussed in the first operational mode. If, on the other hand, either kneel mechanism 24, 26 is not properly secure, the second interlock cable 479 is slack, causing the interlock plate 269 to bias into engagement with the seat-back support 30 by the wire spring 476. In this situation, return rotation of the seat-back support 30 from a forward-fold position causes the interlock post 472 to engage the interlock notch 46a, thereby preventing return of the seat-back support 30 to a use or upright position. It should be noted that the first and second kneel mechanisms 24, 26 are operable if the seatback 506 is rotated forward or not.

Figure 18:
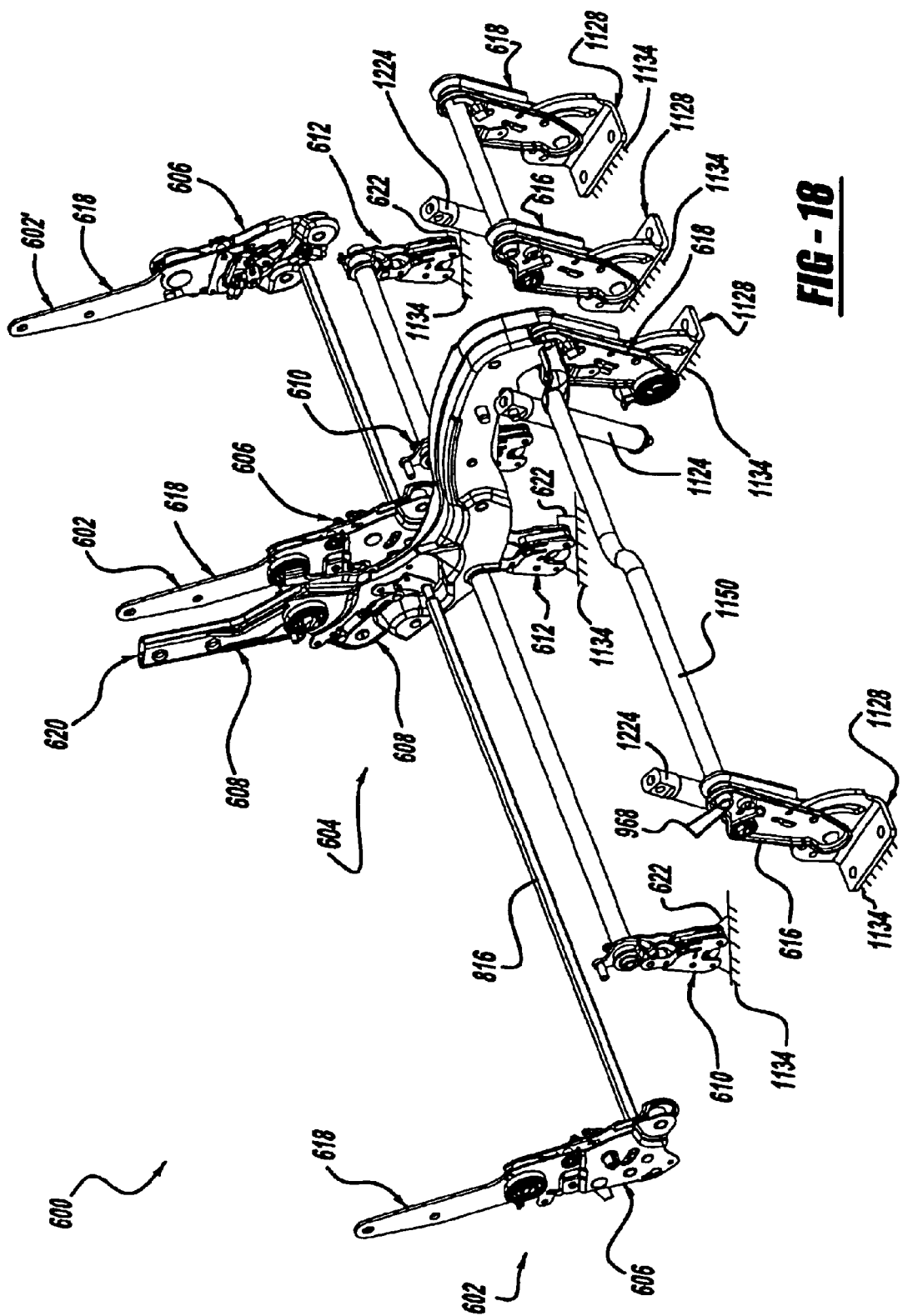
FIG. 18 is a perspective view of a combination recliner, floor-latch, and kneel (RFK) mechanism in accordance with the principals of the present invention.
Figure 19:
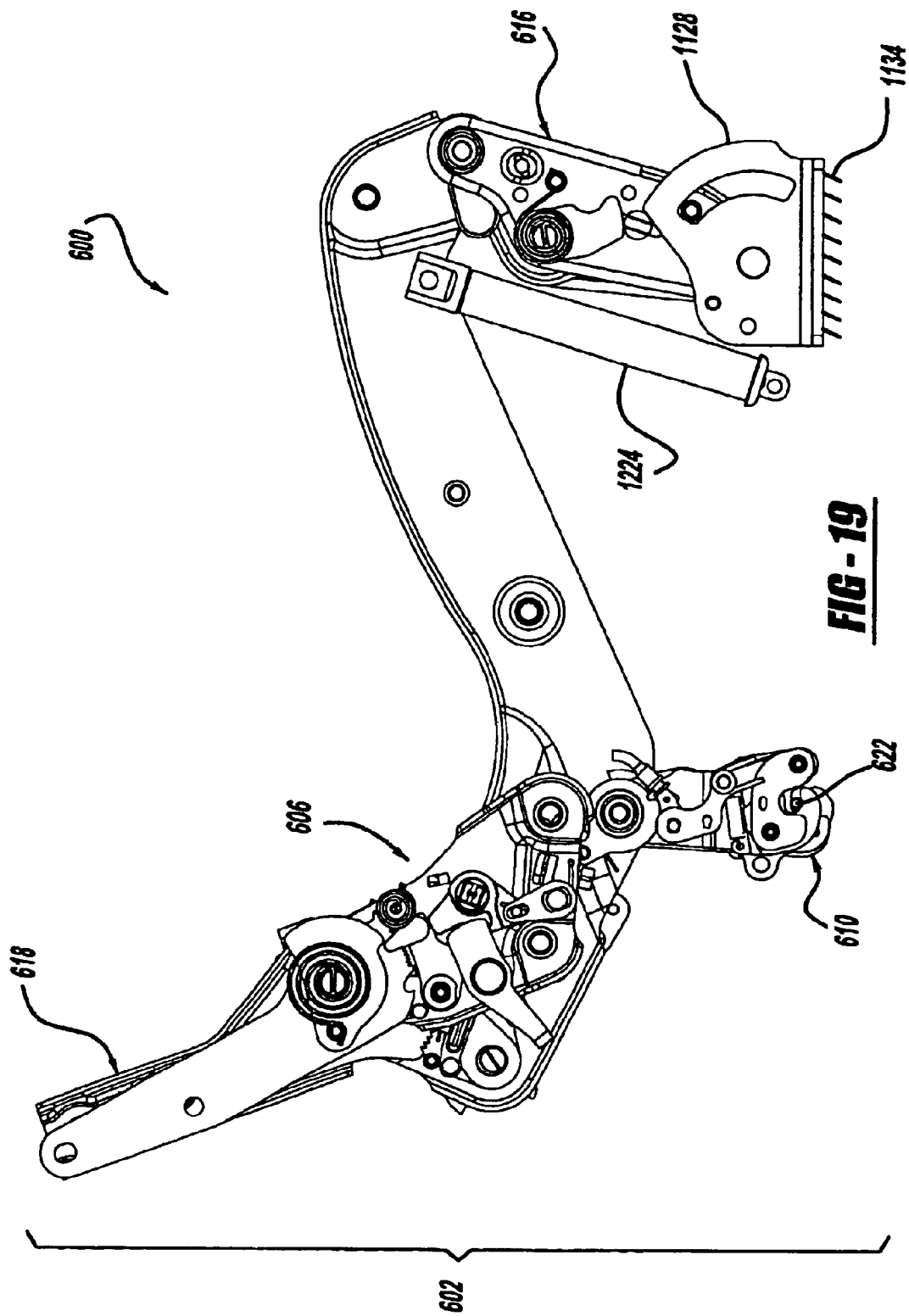
FIG. 19 is a side view of the RFK of FIG. 18 in an upright or usable position.
Figure 20:
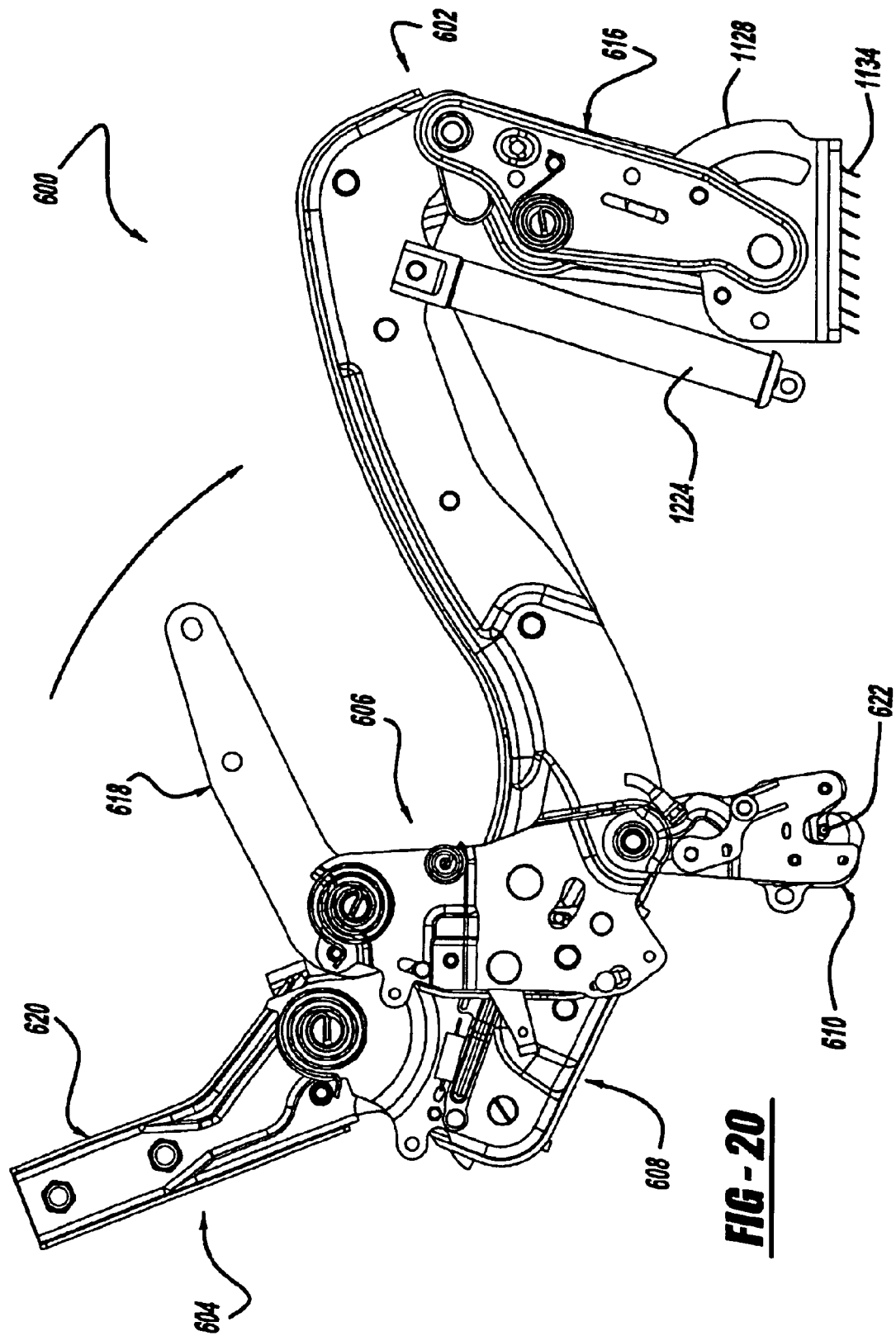
FIG. 20 is a side view of the RFK of FIG. 18 in a forward reclined position.

With reference to FIGS. 18–50, a second embodiment of a combination recliner, floor-latch, and kneel (RFK) assembly 600 is provided for use with a seat assembly. The RFK 600 is operable in a first mode to enable recline or forward folding of a seatback relative to a seat, in a second mode to enable both forward folding of a seatback relative to a seat and forward dumping of a seat assembly, and in a third mode to allow forward articulation of a seat assembly or "kneeling". The RFK assembly 600 includes operably interconnected inboard and outboard mechanisms 602, 604, respectively including first and second recliner mechanisms 606, 608, fist and second floor-latch mechanisms 610, 612, and first and second kneel mechanisms 616, 618. Also provided are upward extending seatback supports 618, 620 operably interconnected with the recliner mechanisms 606, 608 for selectively positioning a seatback. The floor-latch mechanisms 610, 612 selectively engage a pair of strikers 622 disposed on a floor for securing the seat assembly thereto, as shown in FIG. 18 and discussed in further detail below. Kneel mechanisms 616, 618 selectively engage a pair of floor brackets 832 supported on a vehicle structure 835 for securing the seat in an upright position, as shown in FIGS. 18–22 and as discussed in further detail below.

The inboard mechanism 602 includes inner and outer plates 624, 626 from which the first recliner mechanism 606 is operably supported. The first seatback support 618 is pivotally supported between the inner and outer plates 624, 626 and is in selective engagement with the first recliner mechanism 606 for pivotally positioning the first seatback support 618 relative thereto. An actuation lever 628 is pivotally supported by the inner and outer plates 624, 626 and is in operable engagement with the first recliner mechanism 606 and the first and second floor latch mechanisms 610, 612. In addition, the actuation lever 628 is operable to actuate the second recliner mechanism 608 of the outboard mechanism 604 via the first recliner mechanism 606, as will be discussed in more detail below.

The first seatback support 618 includes a generally triangular-shaped plate 630 having a pivot aperture 632 therethrough and an arcuate edge 634. A portion of the arcuate edge 634 includes a plurality of teeth 636 formed therein and an interlock notch 638. Auxiliary apertures 640 are provided for attachment of a seatback frame (not shown) thereto. The seatback support 618 is pivotally supported between the inner and outer plates 624, 626 by a seatback support pivot 642. The seatback support pivot 642 includes a disc end 644, a keyed cylindrical section 646, a first cylindrical section 648 having a bearing surface 650, and a second cylindrical section 652 having a diametric notch 654 formed therein. The support pivot 642 is received through a keyed aperture 656 of the outer plate 624, the pivot aperture 632 of the first seatback support 618, and a pivot aperture 658 of the outer plate 626. The keyed cylindrical section 646 aligns with the keyed aperture 656 of the inner plate 624 for fixing the support pivot 624 from rotating relative to the inner and outer plates 624, 626. The first cylindrical section 648 aligns within the pivot aperture 632 of the first seatback support 618 such that the first seatback support 618 pivots on bearing surface 650. The second cylindrical extension 652 aligns with the pivot aperture 658 of the outer plate 626 having the diametric notch 654 extending from an outer surface thereof.

The first seatback support 618 is biased by a coil spring 660 including a central flat 662 that engages the diametric notch 654 of pivot 642 and an outwardly extending arm 664 that engages a post 666 extending from the first seatback support 618 through attachment aperture 668. The post 666 includes a first cylindrical section 670, a second cylindrical 672, and a central cylindrical section 674 received by attachment aperture 668 of plate 630. The first cylindrical section 670 engages the extending arm 664 of spring 660 to bias the first seatback support 618 in a clockwise (CW) direction relative to the view shown in FIG. 31 while the second cylindrical section 672 engages the outer plate 626 to define a range of motion of the first seatback support structure 618, as will be discussed further below.

The first seatback support 618 further includes a sector plate 676 for interaction with the first recliner mechanism 606 and actuation lever 628. The sector plate 676 includes a first attachment aperture 678 for rotatably receiving the support pivot 642, a second attachment aperture 680 for receiving the post 666, and a cam surface 682 defining a detent 684 and an arcuate surface 686. The post 666 is operable to fix the sector plate 676 for rotation with the first seatback support plate 630 while the detent 684 and arcuate surface 686 are adapted to selectively engage the first recliner mechanism 606 to allow ease of operation of actuation lever 628, as will be discussed further below.

Figure 31:
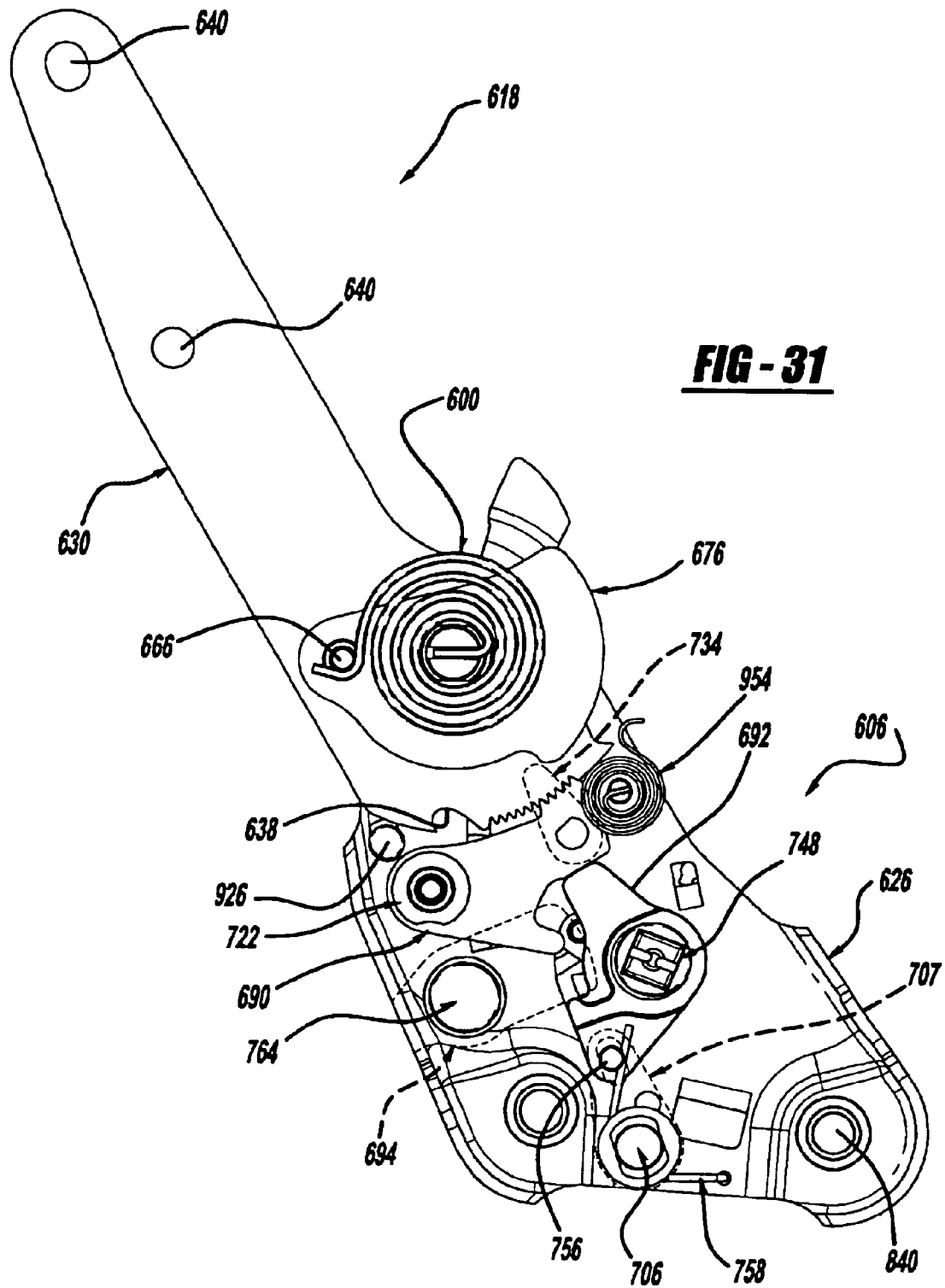
FIG. 31 is a side view of the first side of the recliner mechanism of FIG. 23 in a rearward reclined position.

As the first seatback support 618 is caused to pivot relative to the inner and outer plates 624, 626, the post 666 may abut the outer plate 626 at a first stop 688 during reclining or counterclockwise (CCW) rotation relative to the view shown in FIG. 31 to prohibit further pivotal motion of the first seatback support 618 relative to the inner and outer plates 624, 626. During forward pivoting or clockwise (CW) rotation of the first seatback support 618, the post 666 may abut a second stop 690 and prevent further forward movement of the first seatback support 618 relative to the inner and outer plates 624, 626. In this manner, a range of pivotal motion of the first seatback support 618 is defined.

With particular reference to FIGS. 23–31, the first recliner mechanism 606 is shown to include a pawl 690, a recliner cam 692, a transfer cam 694, an actuation cam 696, a cam link 698, a key 700, first and second floor latch cams 702, 704, and a transfer pivot 706. The pawl 690 includes first and second extensions 708, 710 and a first and second attachment aperture 712, 713. The first extension 708 includes a plurality of teeth 714 for selective engagement with the teeth 636 of the first seatback support 618 for defining a plurality of pivotal positions (i.e., recline positions) of the seat-back support 618 relative to the inner and outer plates 624, 626 and an engagement face 716 for interaction with the recliner cam 692, as will be described further below. The second extension 710 includes an engagement face 718 and is generally opposite engagement face 716 such that a cam recess 720 is defined therebetween.

Figure 24:
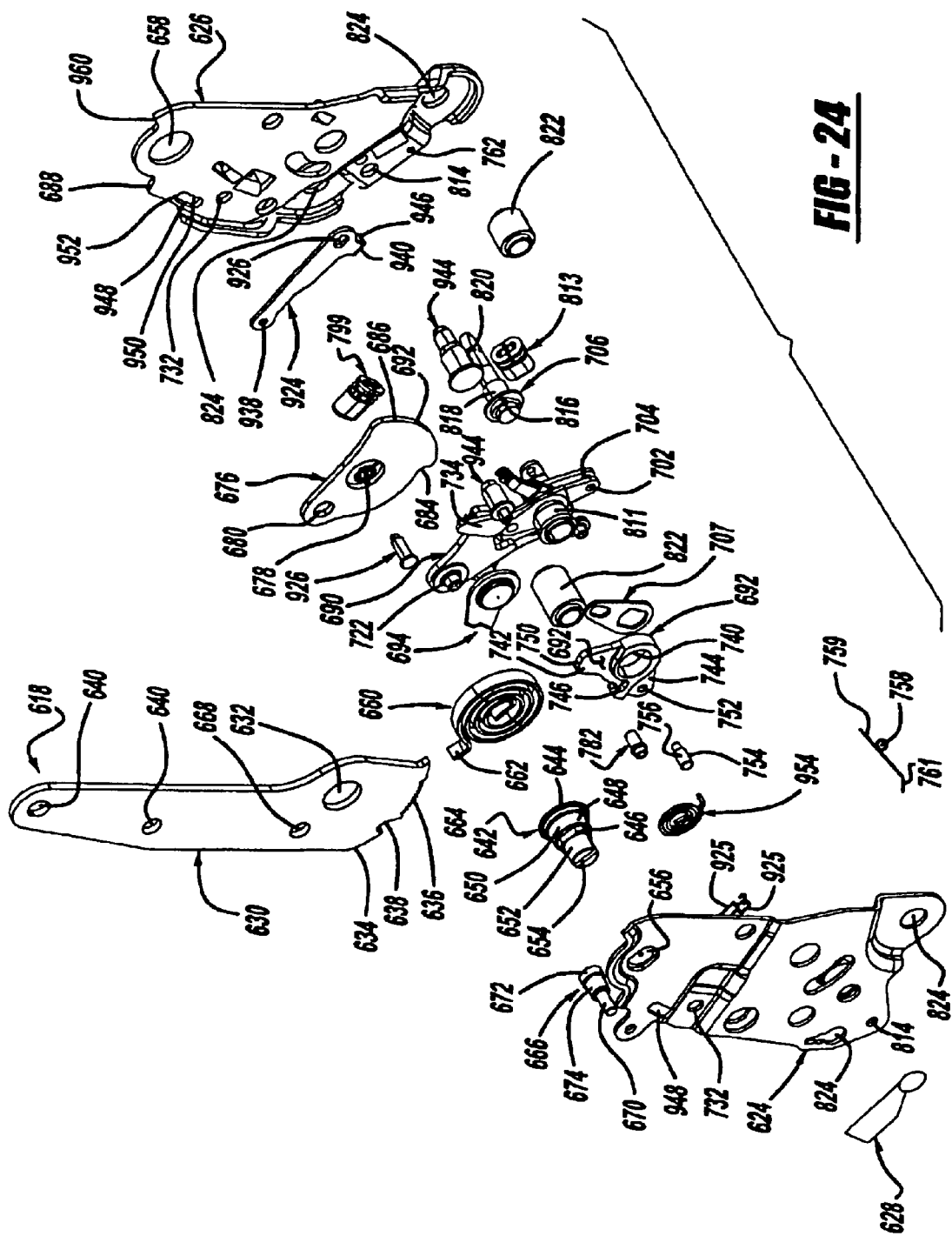
FIG. 24 is an exploded view of the first recliner mechanism of FIG. 23.
Figure 25:
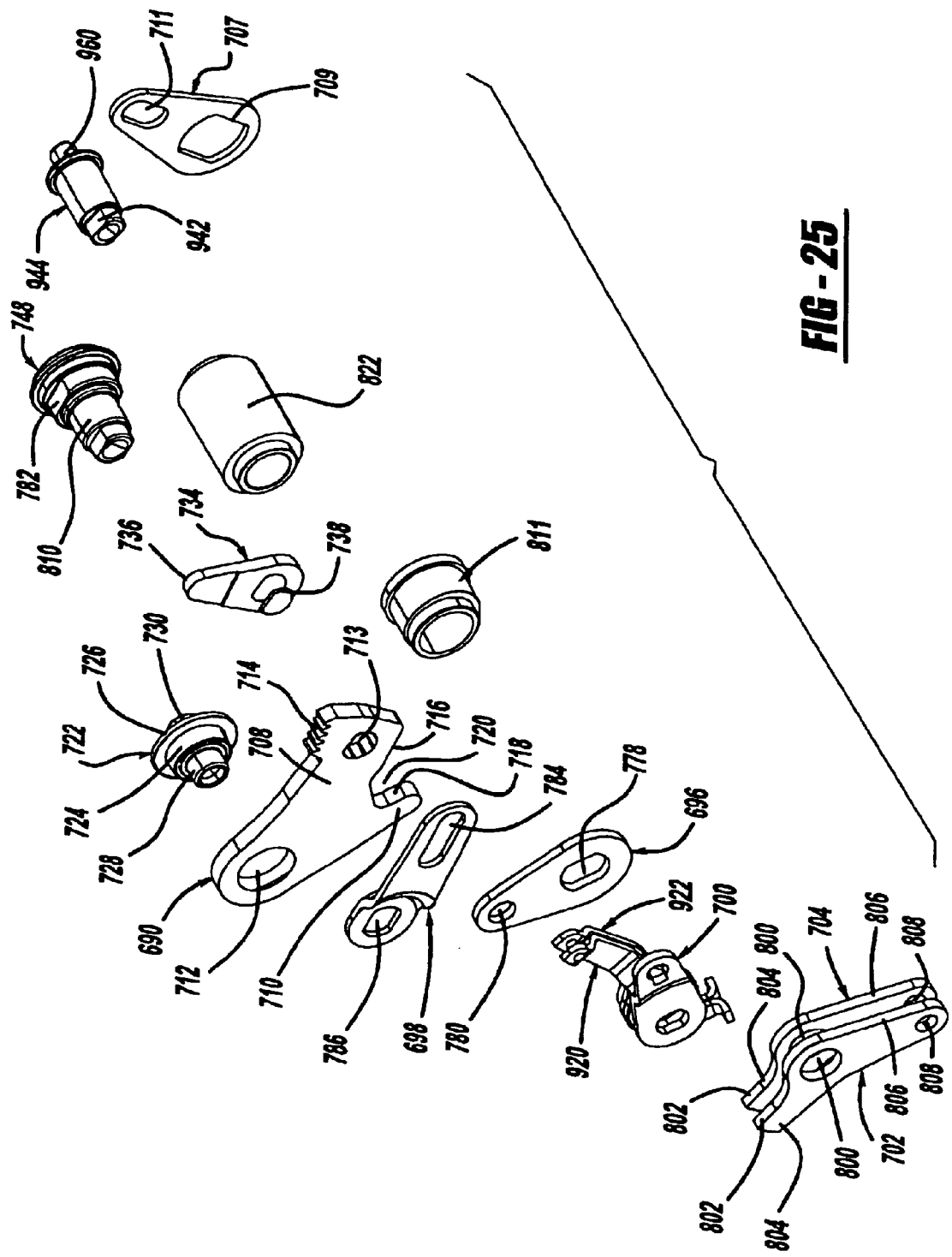
FIG. 25 is an exploded view showing a more detailed view of particular components of FIG. 24.
Figure 26:
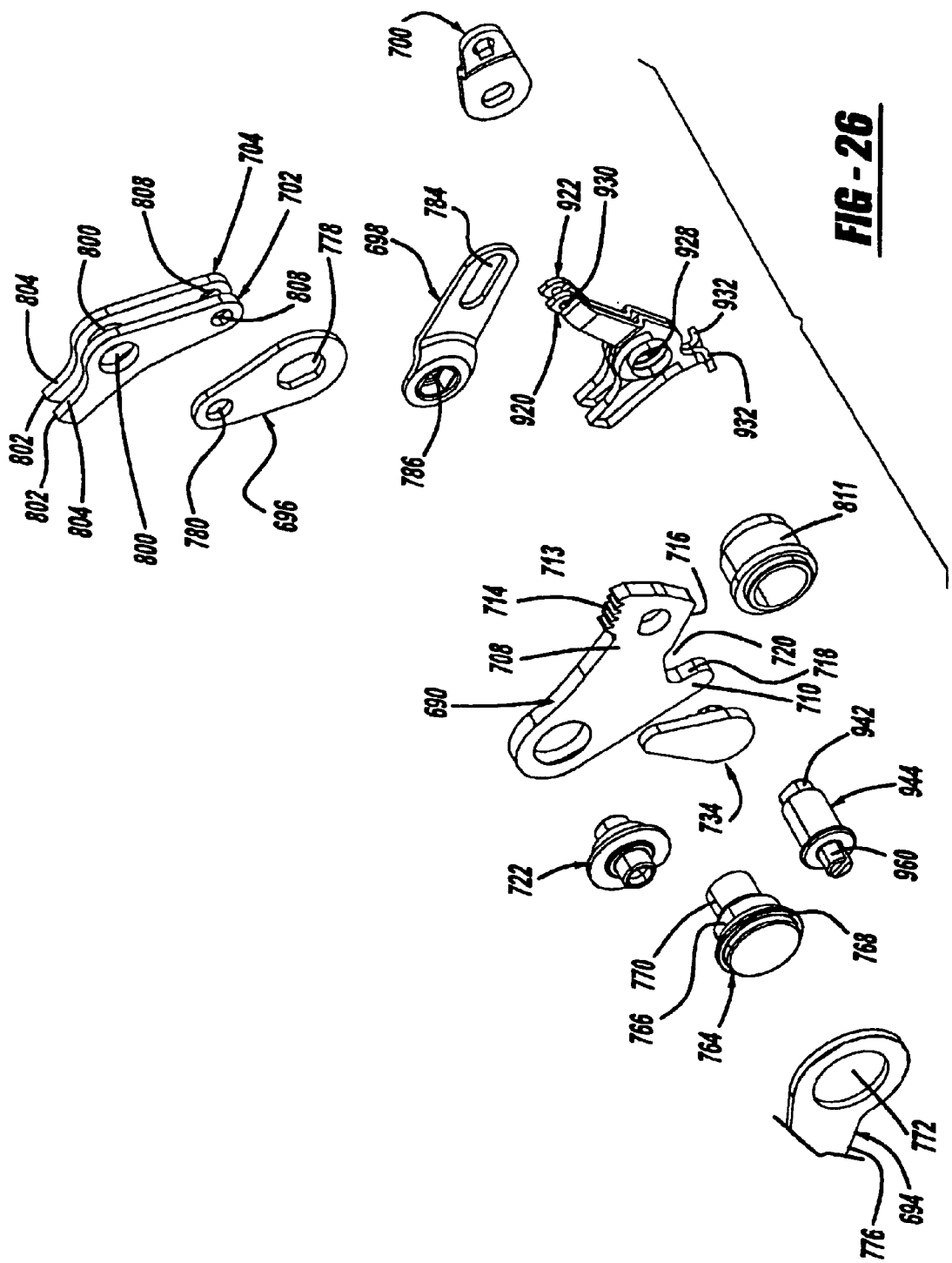
FIG. 26 is an exploded view showing a more detailed view of particular components of FIG. 24.
Figure 28:
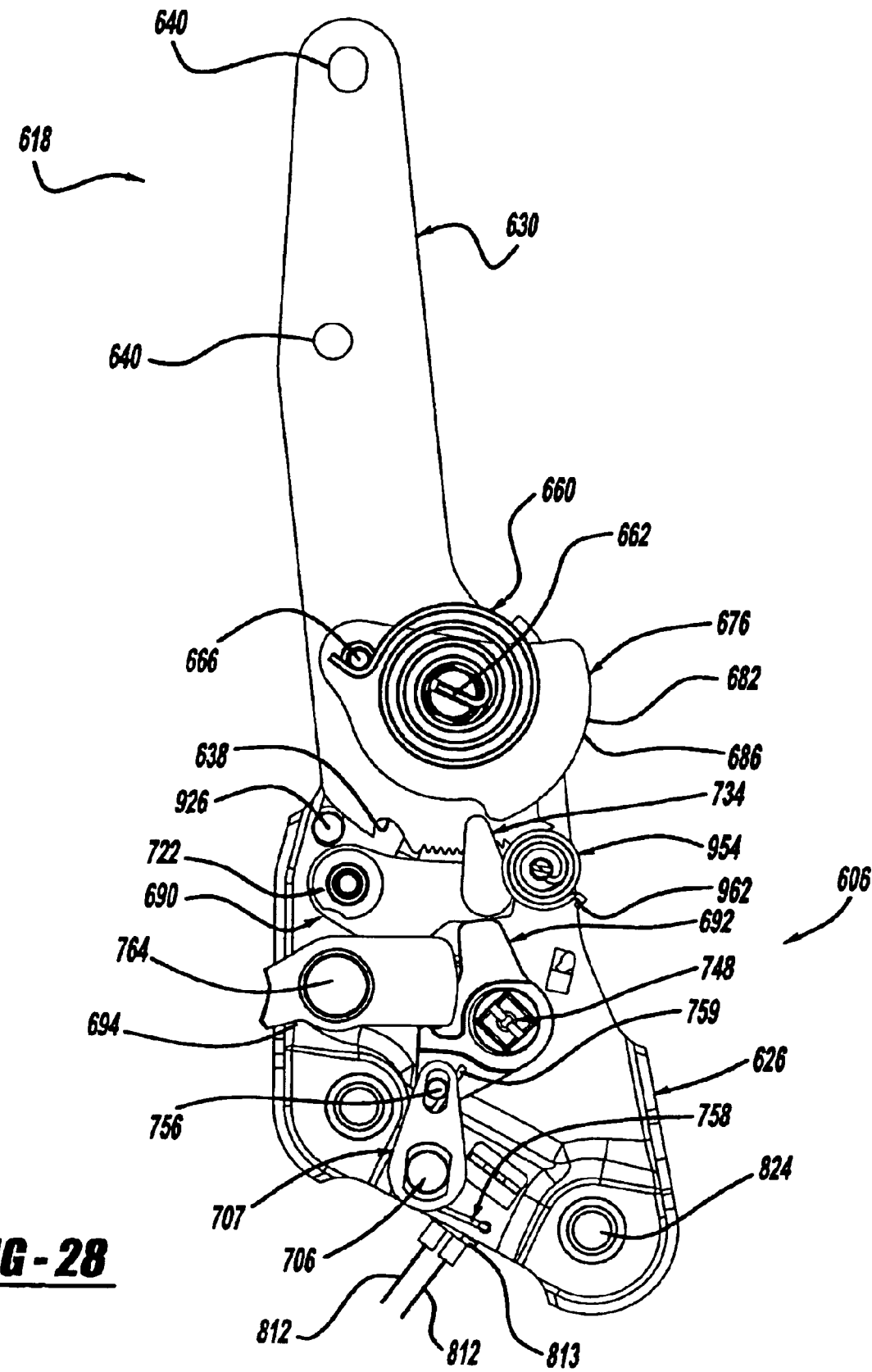
FIG. 28 is a side view of a second side of the recliner mechanism of FIG. 23 in an upright position.
Figure 30:
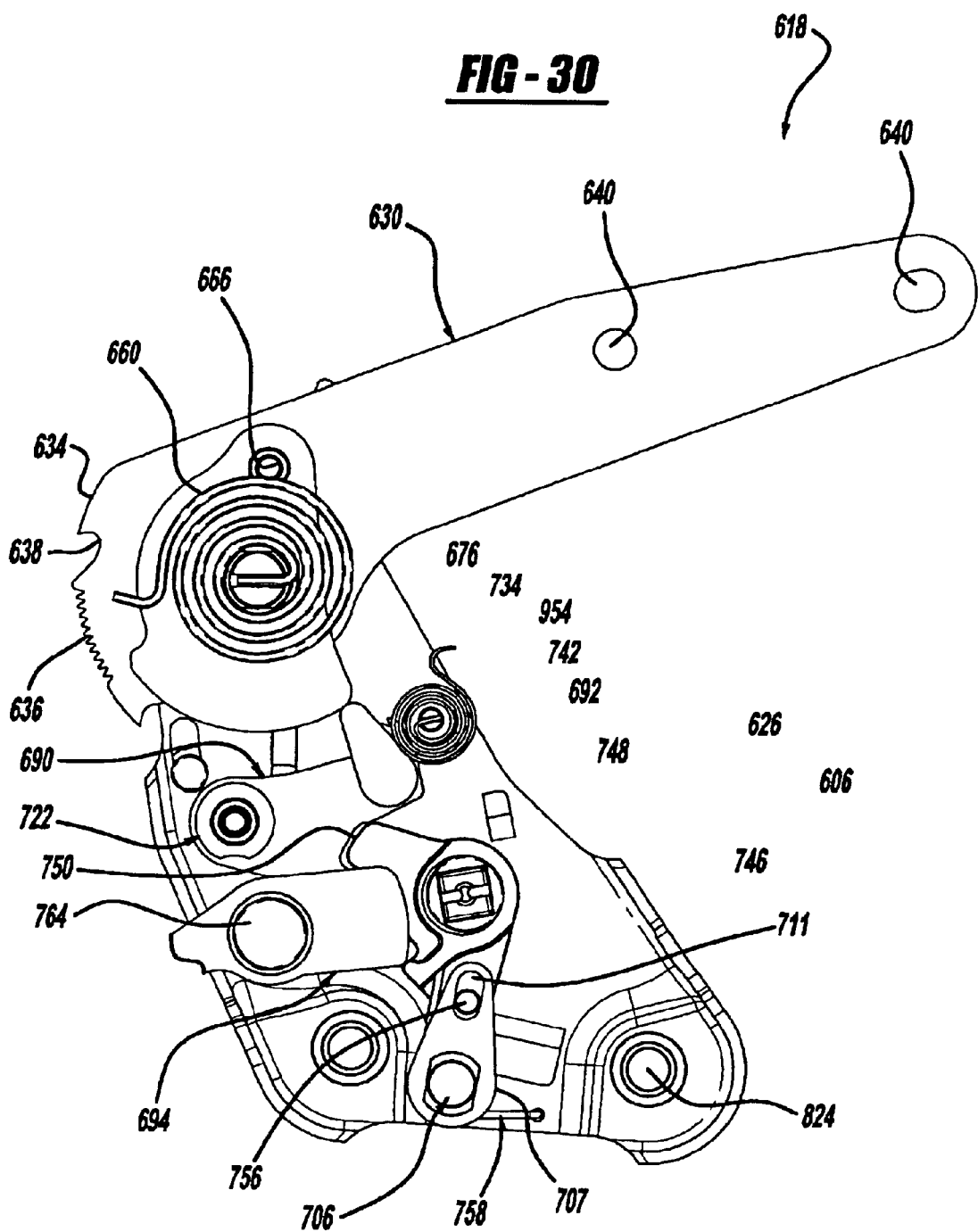
FIG. 30 is a side view of the second side of the recliner mechanism of FIG. 23 in a forward reclined position.

The pawl 690 is pivotally supported between inner and outer plates 624, 626 by a pawl pivot 722, as best shown in FIGS. 28 and 30. Pawl pivot 722 includes a central cylindrical section 724, a flange portion 726, and first and second cylindrical sections 728. The central cylindrical section 724 is received by attachment aperture 712 such that the pawl 690 is fixed for rotation therewith. In this manner, the flange 726 abuts an outer surface of the pawl 690 and cooperates with the central cylindrical section 724 to define a spaced distance between the inner and outer plates 624, 626. The pawl 690 and pawl pivot 722 are rotatably supported between the inner and outer plates 624, 626 by the first and second cylindrical sections 728, 730. Specifically, the first and second cylindrical sections 728, 730 are rotatably attached to the inner and outer plates 624, 626 through apertures 732, as best shown in FIG. 24.

The pawl 690 further includes a finger 734 extending therefrom for interaction with the sector plate 676. The finger 734 includes a cam surface 736 and an attachment flange 738. The attachment flange 736 is received by attachment aperture 713 of the pawl 690 while the cam surface 736 extends from the attachment flange 736 generally toward the sector plate 676, as best shown in FIGS. 28 and 30.

The recliner cam 692 includes a central attachment aperture 740, a first extension 742, a second extension 744, and an engagement leg 746. The central attachment aperture 740 is adapted to fixedly receive a main pivot 748 such that the recliner cam 692 is fixed for rotation with the main pivot 748. The first extension 742 includes an engagement surface 750 operable to selectively engage the first extension 708 of the pawl 690 to hold the pawl 690 in a locked or engaged position and to selectively engage the second extension 710 of the pawl 690 to rotate the pawl 690 into an unlocked position.

The second extension 744 includes an attachment aperture 752 at a distal end for receiving a spring post 754. The spring post 754 is a cylindrical member having an engagement surface 756 operable to receive a spring 758. Spring 758 includes a first end 759 and a second end 761, whereby the first end 759 engages the spring post 754 and the second end 761 engages an attachment aperture 762 formed in the outer plate 626 to bias the recliner cam 692 into engagement with the first extension 708 of the pawl 690. In this manner, the engagement surface 750 of the recliner cam 692 contacts the first extension 708 of the pawl 690, thereby causing the pawl 690 to engage teeth 636 of plate 630 and hold the pawl 690 in the locked position. The engagement leg 746 is disposed generally between the first and second extensions 742, 722 and is raised from a main surface 760 of the recliner cam 692 for interaction with the transfer cam 694.

The transfer cam 694 is rotatably supported between the inner and outer plates 624, 626 by a pivot 764 having a first cylindrical section 766, a flange 768, and a keyed section 770. The transfer cam 694 includes an attachment aperture 772 and an extension 774 having an engagement surface 776. The attachment aperture 772 fixedly receives the first cylindrical section 766 of the pivot 764 such that the transfer cam 694 and the pivot 764 are fixed for rotation. The first extension 774 extends from attachment aperture 772 such that the engagement surface 776 opposes the engagement leg 746 of the recliner cam 692, as will be described further below and as best shown in FIG. 28.

The actuation cam 696 includes a keyed aperture 778 and an attachment aperture 780. A keyed cylindrical section 782 of the main pivot 748 receives the keyed aperture 778 such that the actuation cam 696 rotates with the main pivot 748. The attachment aperture 780 is adapted to receive an actuation post 782 for interaction with the transfer cam 694, as will be discussed further below.

The cam link 698 is an elongate link member having a slot 784 formed at a first end and a keyed attachment aperture 786 formed at a second end. The slot 784 slidably receives the actuation post 782 such that the post 782 is movable between a first end 788 of slot 784 and a second end 790 of slot 784. The keyed attachment aperture 786 matingly receives the keyed cylindrical section 770 of pivot 764 such that the cam link 698 is caused to rotate with pivot 764.

Figure 29:
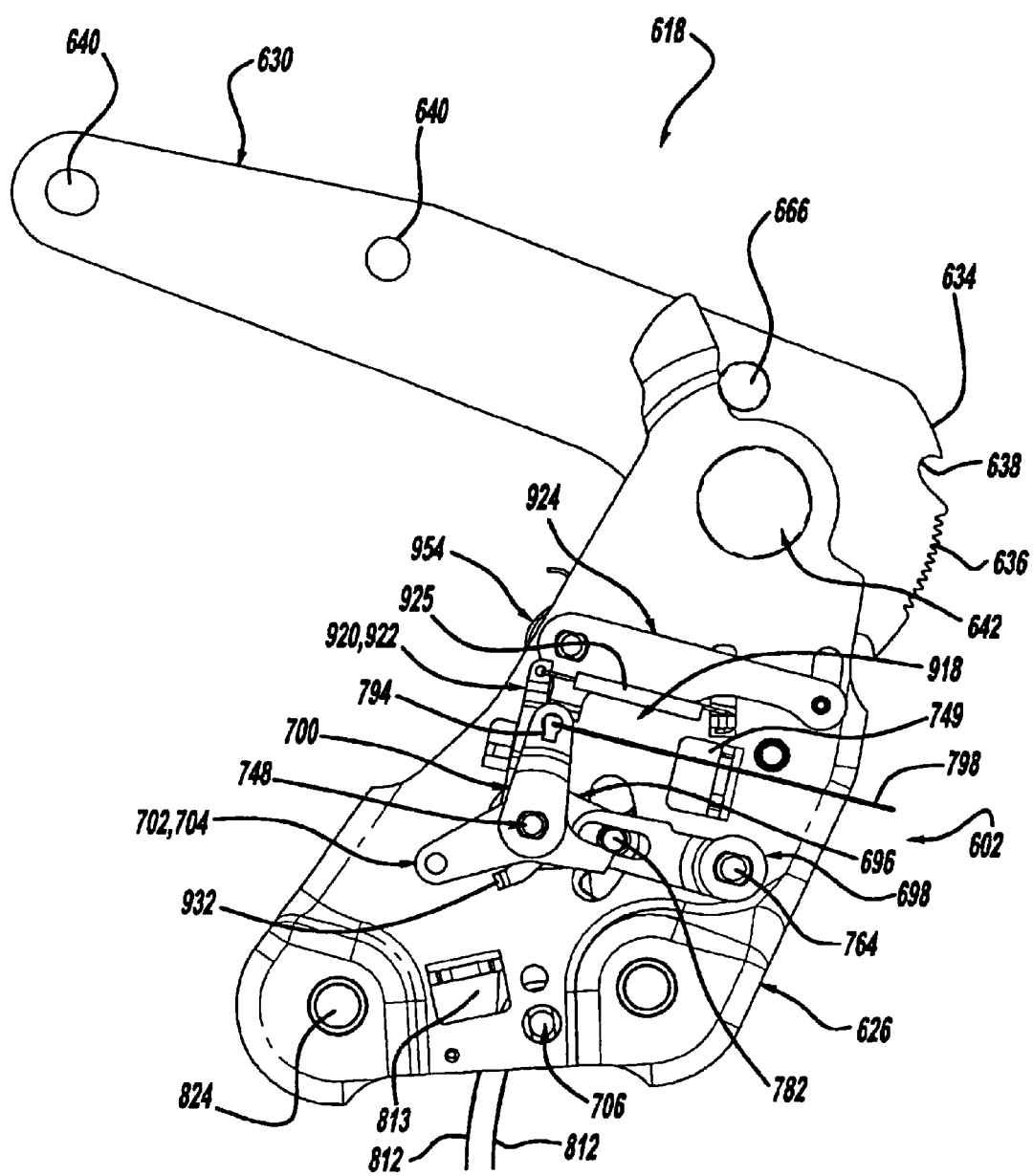
FIG. 29 is a side view of the first side of the recliner mechanism of FIG. 23 in a forward reclined position.

The key 700 includes a keyed attachment aperture 792 at a first end and a cable aperture 794 at a second end. The keyed attachment aperture 792 is matingly received by a keyed cylindrical section 796 of the main pivot 748 such that as the main pivot 748 is caused to rotate, the key 700 concurrently rotates therewith. The cable aperture 794 is adapted to receive a first end of a cable 798 for communication with the first and second floor latch mechanisms 610, 612, as will be discussed further below. The cable 798 is received by the first recliner mechanism 606 at a first cable housing 799 disposed proximate to key 700, as best shown in FIG. 29.

The first and second floor latch cams 702, 704 each include an attachment aperture 800, a first extension 802 having an engagement surface 804, and a second extension 806 having a cable aperture 808. The attachment apertures 800 rotatably receive a cylindrical section 810 of the main pivot 748 such that the first and second floor latch cams 702, 704 rotate relative to the inner and outer plates 624, 626 about the cylindrical section 810. In this manner, the first and second floor latch cams 702, 704 are operable to independently rotate relative to the main pivot 748 about cylindrical section 810 and are disposed generally between the key 700 and actuation cam 696 along a length of the main pivot 748, as best shown in FIG. 29.

The engagement surface 804 of the first extension 802 selectively engages the actuation post 782 of the actuation cam 696 to rotate the first and second floor latch cams 702, 704 about the main pivot 748, as will be discussed further below. The cable apertures 808 each receive a cable 812 for communication between the first recliner mechanism 606 and the first and second kneel mechanisms 616, 618. The cables 812 are received by the first recliner mechanism 606 at a second cable housing 813 disposed proximate the transfer pivot 706, as best shown in FIGS. 28 and 29.

The transfer pivot 706 is received by a pair of attachment apertures 814 formed in the inner and outer plates 624, 626 and includes a flanged end 816 disposed proximate the inner plate 624, a cylindrical section 818, and a keyed section 820 extending thorough the outer plate 626. The cylindrical section 818 extends through the inner and outer plates 624, 626 while the keyed section 820 extends from the outer plate 626 generally toward the second recliner mechanism 608. The keyed section 820 is operable to receive a cross-member 816 for mechanical communication between the first and second recliner mechanisms 606, 608, such that as the recliner cam 692 is rotated, the cross-member 816 will concurrently be rotated. Rotation of the recliner cam 692 is transmitted to the transfer pivot via cam 707, whereby cam 707 includes a keyed attachment aperture 709 fixed for rotation with transfer pivot 706 and a slot 711. The slot 711 slidably receives sprig post 754 such that as the recliner cam 692 is rotated about main pivot 748, post 754 translates within slot 711, thereby rotating the transfer pivot 706 and cross-member 816. In this manner, the cross-member 816 is operable to release the second recliner mechanism 808 when the first recliner mechanism 806 is released.

As described, the main pivot 748 rotatably supports the first and second floor latch cams 702, 704 and fixedly supports the recliner cam 692, actuation cam 696, and key 700. In this manner, rotation of the main pivot 748 causes concurrent rotation of recliner cam 692, actuation cam 696, and key 700 while allowing the floor latch cams 702, 704 to remain stationary or independently rotate. Such rotation of the main pivot 748 is accomplished through rotation of the actuation lever 628 relative to the inner and outer plates 624, 626. Specifically, the actuation lever 628 is fixedly attached to the main pivot 748 generally proximate the recliner cam 692 such that rotation of the actuation lever 692 causes concurrent rotation of the main pivot 748. As can be appreciated, such rotation of the actuation lever 628 is accomplished by applying an external force to the actuation lever 628.

When the actuation lever 628 is rotated, the actuation cam 696 is concurrently rotated such that the engagement surface 776 contacts the engagement leg 746 of the recliner cam 692. Upon sufficient rotation of the actuation cam 696, the recliner cam 692 will be rotated due to the interaction between the actuation cam 696 and the engagement leg 746. When the recliner cam 692 is rotated, the engagement surface 742 releases from contact with the engagement face 716 of the pawl 690 and engages the second engagement face 718 to thereby rotate the pawl 690 in the clockwise (CW) direction relative to the view shown in FIG. 31. As can be appreciated, such rotation of the pawl 690 causes the teeth 714 to disengage the teeth 636 of the first seatback support member 618, thereby allowing the first seatback support member 618 to be reclined or rotated relative to the inner and outer plates 624, 626.

While the main pivot 748 has been described as including a cylindrical section 810 it should be understood that any construction that allows for relative rotation of the first and second floor latch cams 702, 704 relative to the main pivot 748, such as a cylindrical barrel 811 construction, is anticipated and should be considered within the scope of the present invention. In such a construction, the barrel 811 first roatably receives the first and second floor latch cams 702, 704 on an outer perimeter thereof and is fixedly received by the main pivot 748 such that the barrel 811 rotates with the main pivot 748 while concurrently allowing the floor latch cams 702, 704 to rotate on an outer surface thereof.

As described, the pawl 690, recliner cam 692, transfer cam 694, and transfer pivot 706 are operably supported between the inner and outer plates 624, 626. In this manner, the inner plate 624 must be held in a substantially fixed relationship with the outer plate 626 to ensure the components disposed therebetween function as intended. To provide for a constant spacing between the inner and outer plates 624, 626, a pair of spacers 822 are received between the inner and outer plates 624, 626 to set the relative distance therebetween. The cylindrical spacers 822 are fixedly received by apertures 824 formed in the inner and outer plates 624, 626, as best shown in FIGS. 24–31.

With particular reference to FIGS. 32–37, the first and second floor latch mechanisms 610, 612 will be described in detail. As previously discussed, the first and second floor latch mechanisms 610, 612 are operable to provide the inboard and outboard mechanisms 602, 604 with the ability to pivot or dump forward. As each of the first and second floor latch mechanisms 610, 612 are substantially identical, only a detailed description of the first floor latch mechanism 610 will be provided.

The first floor latch mechanism 610 includes a first and second housing plate 826, 828, a claw 830, a lock lever 832, a cam fork 834, a coil spring 836, and a roller 838. The housing plates 826, 828 each include an upper pivot aperture 840, a striker recess 842, and a pair of shrouds 839 operable to dampen any noise associated with the operation of the first and second floor latch mechanisms 610, 612. The claw 830 is disposed between the first and second housing plates 826, 828 and is a substantially flat member having a striker pocket 844, a pivot aperture 846, and a spring aperture 848. The striker pocket 844 is defined between first and second legs 850, 852 of the claw 830 and is operable to receive the striker 622 in a latched position, as shown in FIG. 34. The pivot aperture 846 rotatably receives a pivot 854 such that the claw 830 rotates about the pivot 854 between the latched position and an unlatched position, as will be discussed further below. In addition, the claw 830 includes a shoulder 856 disposed adjacent the first leg 850. The shoulder 856 includes a reaction surface 857 operable to selectively engage the lock lever 832 to toggle the claw 830 between the locked and the unlocked position.

The lock lever 832 is disposed proximate the shoulder 856 of the claw 830 and is a generally flat member having a first pivot aperture 858, a second pivot aperture 860, and an extension 862. The first pivot aperture 858 receives a first pivot 864, whereby the pivot 864 is fixedly received by a pair of apertures 866 formed in the first and second housing plates 826, 828 such that the lock lever 832 rotates relative to, and between, the first and second housing plates 826, 828. The second pivot aperture 860 receives a second pivot 868 having a bearing surface 870. The bearing surface 870 rotatably receives the roller 838 such that the roller 838 rotates relative to both the second pivot 868 and the lock lever 832. The extension 862 is disposed proximate the shoulder 856 of the claw 830 and includes a reaction surface 872 for selective engagement with the reaction surface 857 of the claw 830.

A spring 874 is disposed between the claw 830 and the lock lever 832 and serves to bias both the claw 830 and the lock member 832. The spring 874 includes a first end 876 and a second end 878 separated by a coiled body 880. The spring aperture 848 of the claw 830 fixedly receives the first end 876 of the spring 874 while the second end 878 is fixed to the second pivot 868. In this manner, the spring 874 imparts a force on both the claw 830 and the lock bar 832, as will be described more detail below.

The cam fork 834 is disposed between the first and second housing plates 826, 828 and includes a keyed pivot aperture 882 and a slot 884. The keyed pivot aperture 882 is matingly received by a pivot 886 having a keyed end 888 such that the cam fork 834 is fixed for rotation with the pivot 886. In addition, the pivot 886 includes a first cylindrical section 887 disposed adjacent the keyed end 888, a second cylindrical section 890 disposed adjacent the first cylindrical section 887, and a third cylindrical section 892 having a spring seat 894. The second cylindrical section 890 is rotatably received by an aperture 896 formed through the first and second housing plates 826, 828 such that the pivot 886 rotates about the second cylindrical section 890.

Figure 32:
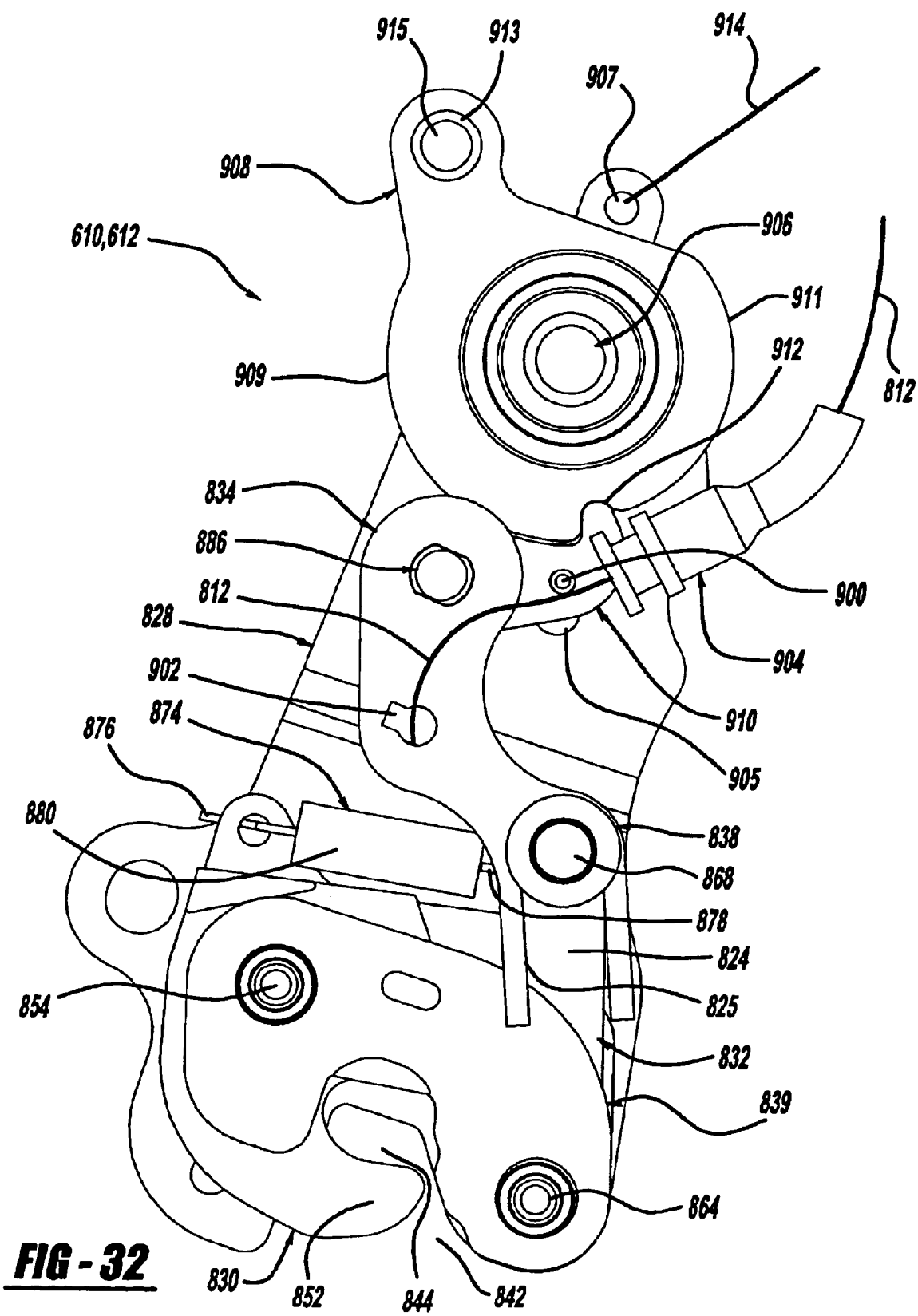
FIG. 32 is a side view of a floor latch mechanism in accordance with the principles of the present invention with part of a housing removed to show the internal working components.
Figure 33:
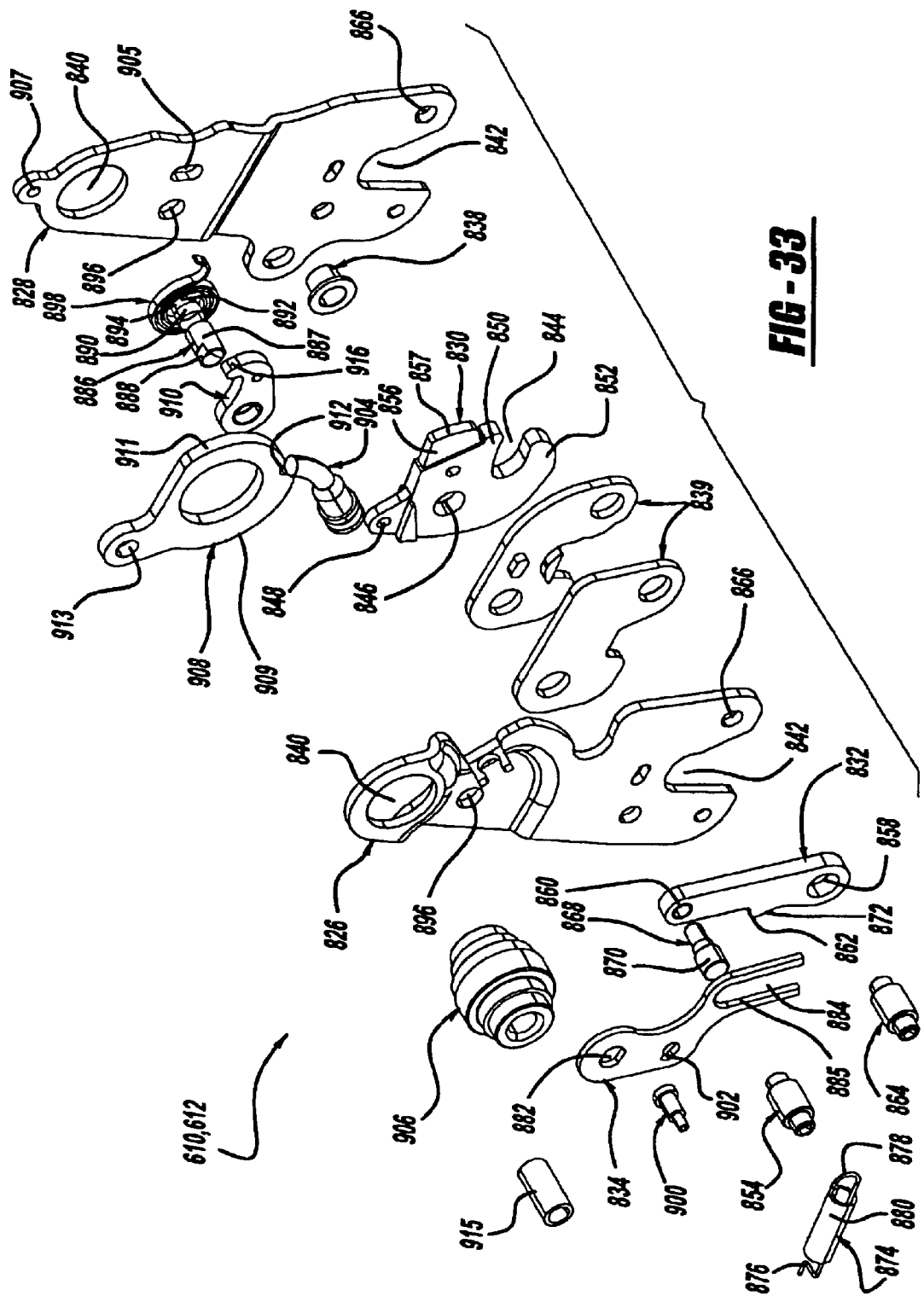
FIG. 33 is an exploded view of the floor latch mechanism of FIG. 32.

The pivot 886 fixedly receives the coil spring 898 such that the pivot 886 is biased into a clockwise (CW) direction relative to the view in FIG. 32. Specifically, the spring seat 894 of the pivot 886 receives a central flat 897 of the coil spring 898 and an outwardly extending arm 1205 of the coil spring 898 engages a spring post 900 to bias the pivot 886 in the clockwise direction. As can be appreciated, as the cam fork 834 is fixed for rotation with the pivot 886, the cam fork 834 is similarly biased by the coil spring 898 in the clockwise direction.

The slot 884 extends from the keyed pivot aperture 882 and includes a reaction surface 885 extending along its length. The slot 884 rotatably receives the roller 838 such that the roller 838 is allowed to travel the length of the slot 884 generally along the reaction surface 885.

The cam fork 834 further includes a cable aperture 902 disposed generally between the keyed attachment aperture 882 and the slot 884. The cable aperture 902 receives the cable 812 from the first recliner mechanism 606 via a cable housing 904. The cable 812 is operable to transmit a force imparted on the actuation lever 628 to the cam fork 834 to rotate the cam fork 834 against the bias of the coil spring 898 and release the claw 830. It should be noted that the second floor latch mechanism 608 similarly receives a cable 812 in a similar fashion such that as the first recliner mechanism 606 releases the first floor latch mechanism 610, the second floor latch mechanism 612 is similarly released.

To operate the floor latch mechanism 610, a force is first applied to the actuation lever 628 to release the first recliner mechanism 606 and second floor latch mechanisms 612. Once the first recliner mechanism 606 is released, the first seatback support 618 is rotated into a fold forward position relative to the inner and outer plates 624, 626. In this position, the actuation post 782 contacts the first and second floor latch cams 702, 704, thereby rotating the cams 702, 704 and placing the cables 812 under tension. Upon further rotation of actuation handle 628, the floor latch cams 702, 704 will rotate such that the cables 812 are caused to rotate the cam fork 834 about pivot 886.

Rotation of the cam fork 834 against the bias of the coil spring 898 causes the roller 838 to travel along the slot 884. Movement of the roller 838 along the slot 884 causes the lock lever 832 to rotate in a counterclockwise direction (CCW) relative to the view shown in FIG. 35 and disengage from the shoulder 856 of the claw 830. The claw 830 is rotated in the clockwise direction (CW) relative to the view shown in FIG. 35 due to the bias imparted thereon by spring 874 once the extension 862 of the lock lever 832 disengages the shoulder 856 of the claw 830. The spring 874 causes the cam 830 to rotate such that the striker pocket 844 aligns with the striker recess 842 to allow the latch mechanism 610 to disengage the striker 622.

Figure 21:
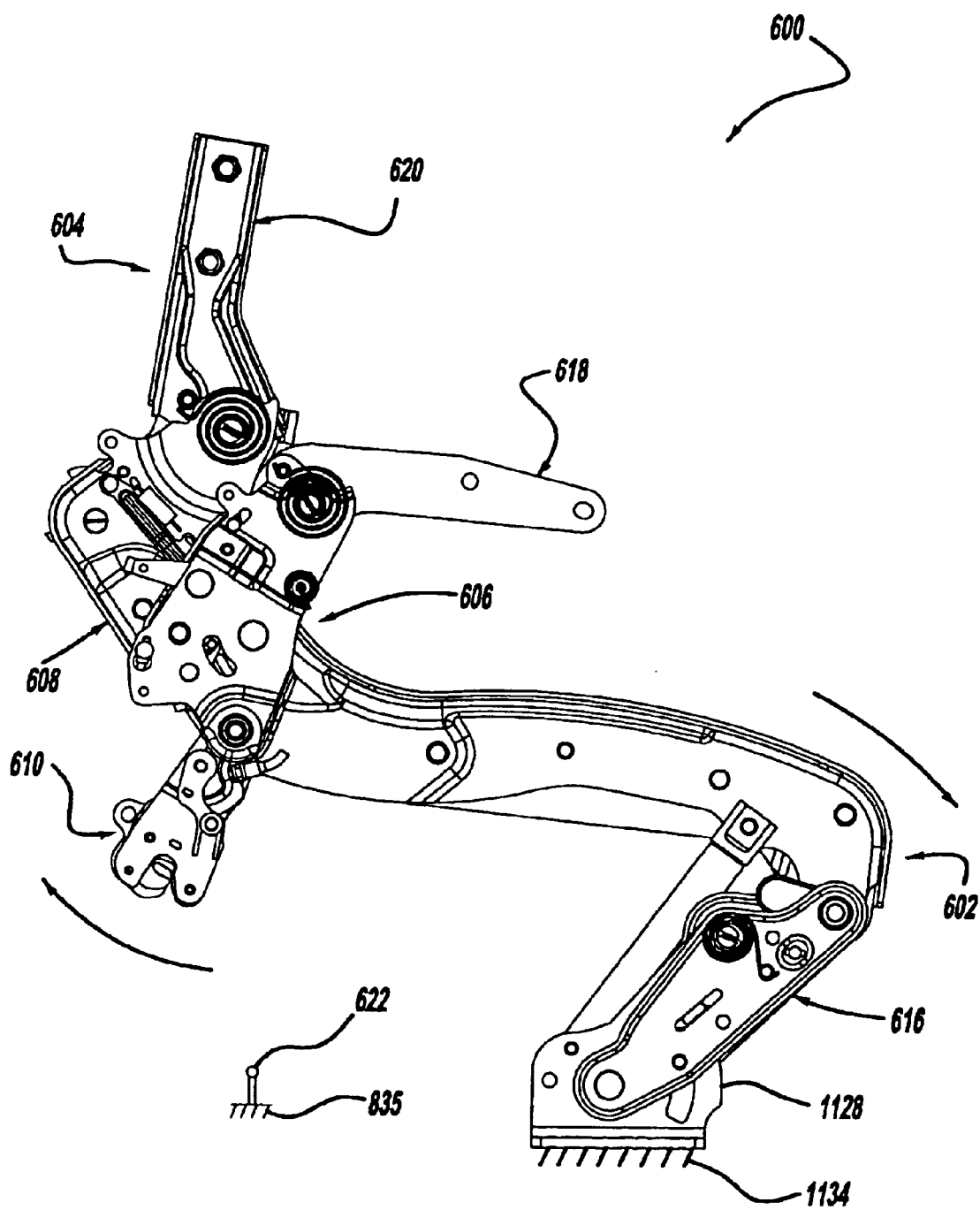
FIG. 21 is a side view of the RFK of FIG. 18 pivoting toward a dumped position.
Figure 22:
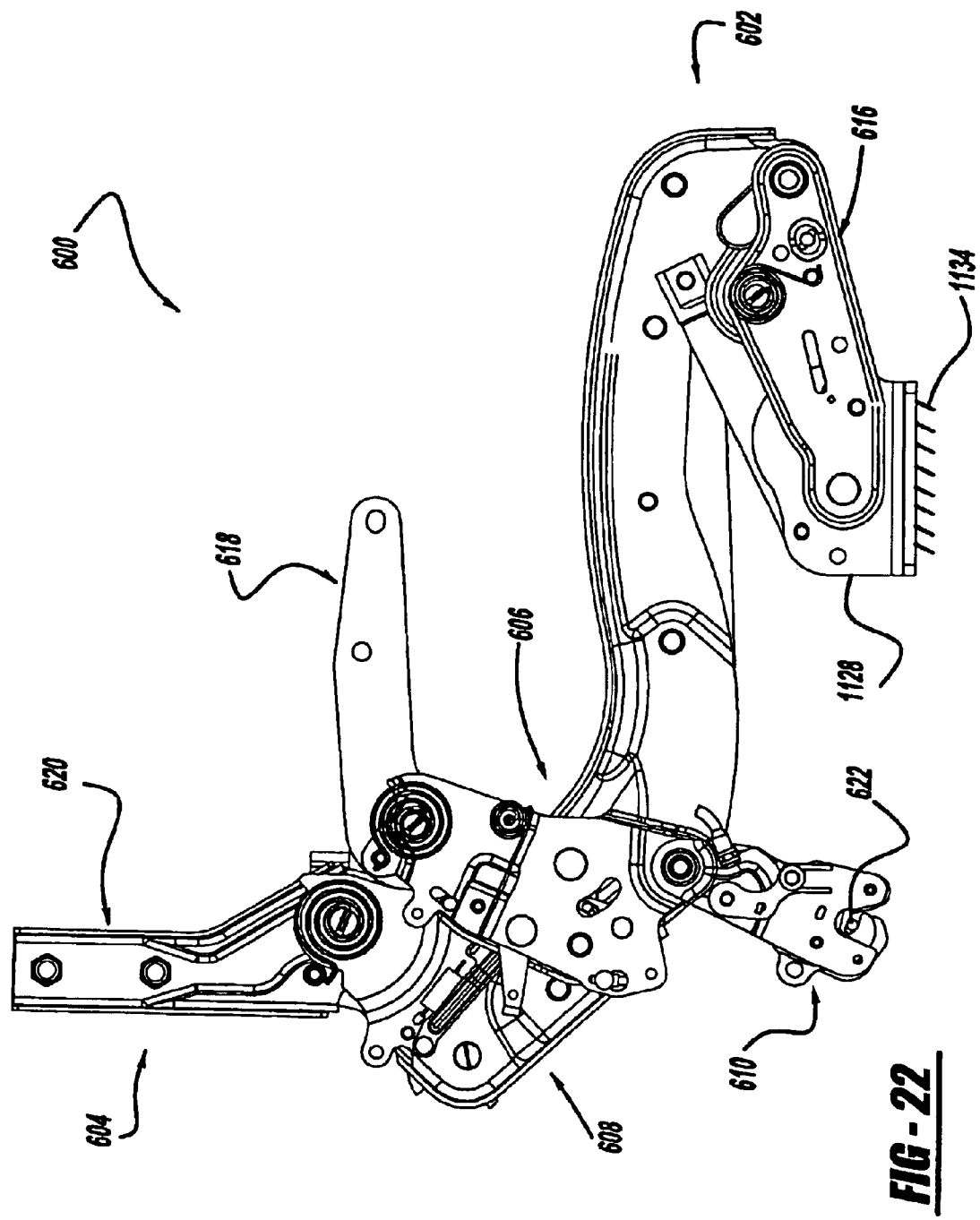
FIG. 22 is a side view of the RFK of FIG. 18 in a kneeled position.

Once the latch mechanism 610 is disengaged from the striker 622, a force may be applied to the RFK 600 to rotate the RFK 600 about the upper pivot aperture 840, as shown in FIG. 21. More particularly, the RFK 600 is rotated about an upper pivot 906 received by the upper aperture 840. As can be appreciated, once the FFK 600 is rotated forward, the latch mechanisms 610, 612 protrude from a bottom surface thereof (i.e., when the RFK 600 is in the dumped position) generally at a 90 degree angle to a bottom surface of the RFK 600. To obviate this condition, a sector plate 908 and cam 910 cooperate to retract the latch mechanisms 610, 612 such that the latch mechanisms 610, 612 are generally flush with a bottom surface of the RFK 600.

The sector plate 908 is rotatably supported by the upper pivot 906 and includes a detent 912, an attachment aperture 913, and a first and second cam surface 909, 911. The attachment aperture 913 receives a rivet 915 to fix the sector plate 908 to the RFK 600 such that the sector plate 908 is restricted from rotating relative to a bottom surface of the RFK 600. In addition, a cable 914 is provided and is attached to the first housing 826 through an attachment aperture 907 at a first end and to the RFK 600 at a second end (not shown).

The cam 910 is a flat plate, roatatably supported by pivot 886 and includes a flange 916. The flange 916 is received by the detent 912 such that the flange 916 is operable to travel from the detent along the cam surfaces 909, 911 during both a kneeling operation and a dumping operation, as will be described further below.

The cam 910 fixedly supports the post 900 such that the coil spring 898 biases the flange 916 into engagement with the detent 912. More particularly, the arm 1205 of the coil spring 898 serves to bias the post 900 within a slot 905 formed in the first housing plate 826 such that the cam is 910 rotated about pivot 886 and into engagement with the detent 912.

Once the latch mechanism 610 is released from the striker 622, the RFK 600 may be rotated about the upper pivot 906, as shown in FIG. 21. Upon rotation, the cable 914 applies a force on the first housing plate 826 such that the flange 916 disengages the detent 912 and travels along cam surface 909. As can be appreciated, once the flange 916 is traveling along cam surface 909, the floor latch mechanism 610 begins to rotate relative to the RFK 600 such that the floor latch mechanisms 610, 612 are generally flush with a bottom portion of the RFK 600 when the RFK 600 is in the fully dumped position.

To return the floor latch mechanism 610 to the use of latched position, a force is applied to the RFK 600 such that the FRK 600 is pivoted about the upper pivot 906. Once the RFK 600 is sufficiently pivoted, the momentum and force associated with returning the RFK 600 to the useable position will be transmitted from the striker 622 to the claw 830, thereby causing the claw 830 to rotate against the bias of spring 874. Upon overcoming the bias of spring 874, the claw 830 will be held in the locked position by the lock lever 832. More particularly, when the claw 830 is rotated in the counterclockwise direction (CCW) relative to the view shown in FIG. 35, the claw 830 imparts a force on the lock lever 832 via the spring 874. Such force causes the lock lever 832 to rotate in the clockwise direction (CW) and engage the shoulder 856 of the claw 830, thereby locking the claw 830 in the latched position.

The inboard mechanism 602 further includes a first interlock mechanism 918 operable to prevent rotation of the first seatback support member 618 to an upright or usable position if at least one of the first or second floor latch mechanisms 610, 612 is in the unlocked position. The first and second floor latch mechanisms 610, 612 are considered to be in the locked condition when the claw 830 of both the first and second latch mechanisms 610, 612 are securely engaged with respective strikers 622.

The first interlock mechanism 918 includes first and second interlock links 920, 922, an interlock bar 924, a pair of springs 925, and an interlock post 926. The first and second interlock links 920, 922 are substantially identical and include a central attachment aperture 928, a spring aperture 930, and an engagement arm 932. The main pivot 748 rotatably receives the central attachment aperture 928 such that the first and second interlock links 920, 922 are permitted to independently rotate relative to the main pivot 748. The engagement arms 932 extend from the central attachment aperture 928 for selective engagement with the first and second floor latch cams 702, 704, as will be discussed further below.

Figure 23:
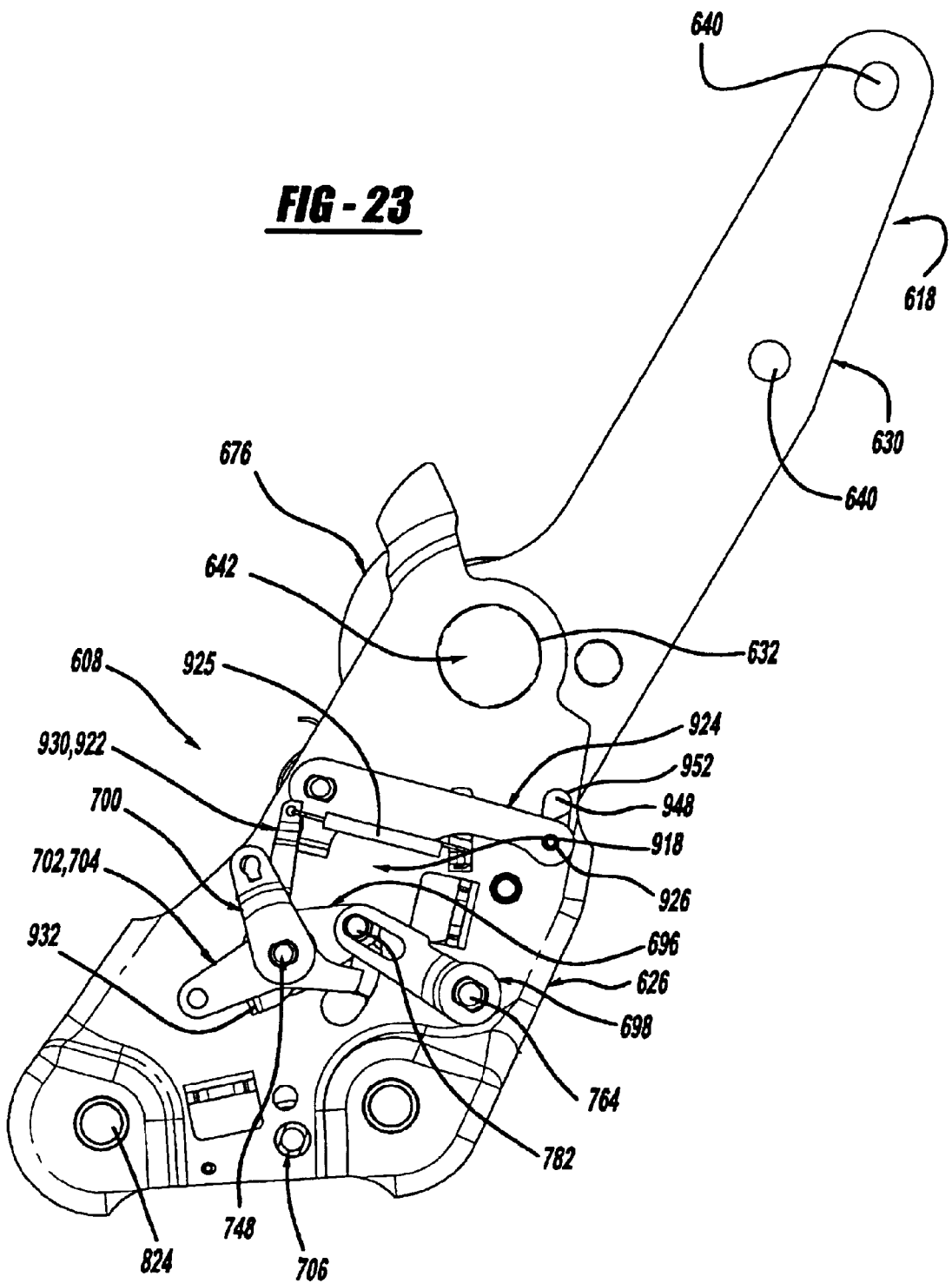
FIG. 23 is a side view of a first side of a first recliner mechanism in accordance with the principals of the present invention.
Figure 27:
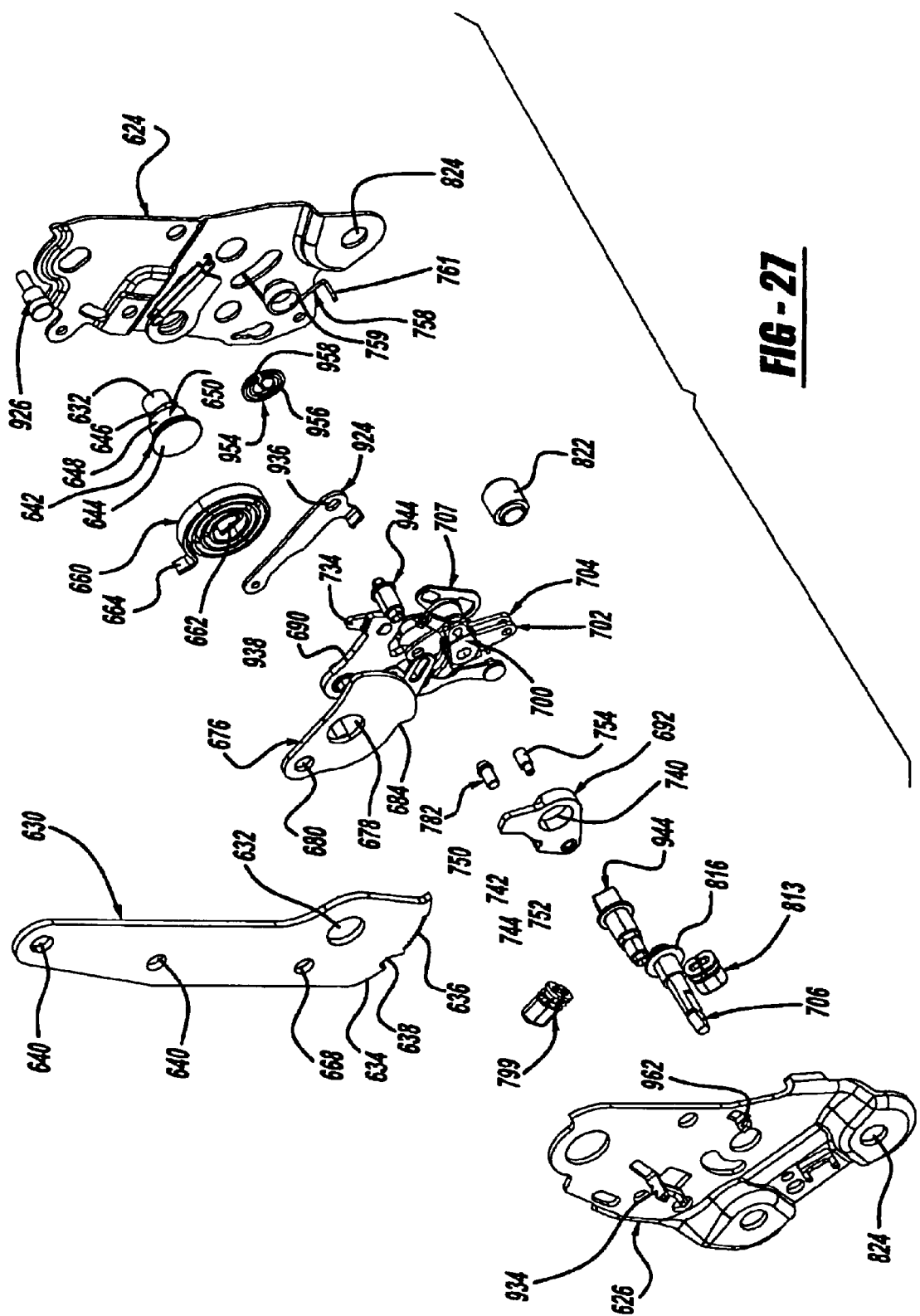
FIG. 27 is an exploded view showing a more detailed view of particular components of FIG. 24.

Each of the springs 925 include a first end fixedly received by the spring apertures 930 of the respective interlock links 920, 922 and a second end received by a spring seat 934 formed on the outer plate 626, as best shown in FIGS. 23 and 27. In this regard, the springs 925 serve to bias the first and second interlock links 920, 922 into a locked condition and into engagement with the first and second floor latch cams 702, 704, thereby restricting rotation of plate 630 relative to the inner and outer plates 624, 626, as will be discussed further below.

The interlock bar 924 is an elongate member having a keyed attachment aperture 936 at a first end, an attachment aperture 938 at a second end, and an arm 940 extending from the first end, as best shown in FIG. 24. The keyed aperture 936 is matingly received by a keyed portion 942 of an interlock pivot 944 such that the interlock bar 924 is fixed for rotation with the interlock pivot 944. The arm 940 extends from the interlock bar 924 generally proximate the keyed attachment aperture 936 and includes an engagement surface 946. The engagement surface 946 engages the first and second interlock links 920, 922 to selectively toggle the interlock bar 924 between an locked and an unlocked condition, as will be discussed further below.

The attachment aperture 938 fixedly receives the interlock post 926 such that the post 926 is fixed for movement with the interlock bar 924. Movement of the interlock bar 924 is defined by movement of the interlock post 926 within an arcuate slot 948 formed in the inner and outer plates 624, 626, as best shown in FIG. 23. The slot 948 includes a first end 950 and a second end 952, whereby the interlock post 926 is in an unlocked position when abutting the first end 950 and in a locked position when abutting the second end 952. When the interlock post 926 is in the unlocked position, the plate 630 is permitted to rotate relative to the inner and outer plates 624, 626 such that the first seatback support 618 may rotate relative to the inner and outer plates 624, 626. When the interlock post 926 is in the locked position, the post 926 engages the interlock notch 638 to restrict rotation of the plate 630 relative to the inner and outer plates 624, 626 to prevent rotation of the first seatback support 618 relative to the inner and outer plates 624, 626, as will be discussed further below.

The interlock post 926 is biased into the unlocked position by a coil spring 958 having a central flat 956 and an arm 958. The central flat 956 is received by a spring post 960 formed in the interlock pivot 944 while the arm 958 is received by a spring seat 962 formed in the inner plate 624. In this manner, the coil spring 958 biases the interlock pivot 944 in a counterclockwise direction (CCW) relative to the view shown in FIG. 23 such that the interlock post 926 is biased into engagement with the first end 950 of slot 948. In other words, coil spring 954 is operable to bias the interlock bar 924 into the unlocked position to allow rotation of plate 630 relative to the inner and outer plates 624, 646.

As previously discussed, the first and second interlock links 920, 922 are free to rotate relative to the main pivot 748. However, interaction between the engagement arms 932 of the interlock links 920, 922 and the second extensions 806 of the floor latch cams 702, 704 restricts movement of the first and second interlock links 920, 922. However, upon rotation of the first and second floor latch cams 702, 704 due to rotation of the actuation handle 628, the interlock links 920, 922 disengage the floor latch cams 702, 704 such that rotation of the interlock links 920, 922 is permitted.

Upon release from the floor latch cams 702, 704, the interlock links 920, 922 will rotate in the clockwise direction (CW) relative to the view shown in FIG. 23 due to the bias imparted thereon by springs 925. Such rotation causes each of the interlock links 920, 922 to rotate the interlock bar 924 against the bias of coil spring 954 due to the interaction between the links 920, 922 and engagement surface 946 of the interlock bar 924. Upon sufficient rotation of the interlock bar 924, the interlock post 926 will move from the first end 950 of the slot 948 to the second end of the slot 952, thereby restricting rotation of first seatback support 618 relative to the inner and outer plates 624, 626.

As previously discussed, rotation of the main pivot 748 causes concurrent rotation of recliner cam 692, actuation cam 696, and key 700 while allowing the floor latch cams 702, 704 to remain stationary or independently rotate. In this manner, the floor latch cams 702, 704 only rotate in response to a direct force applied thereon. Such a force is applied to the floor latch cams 702, 704 when the actuation cam 696 is sufficiently rotated in the clockwise direction (CCW) relative to the view shown in FIG. 23. The floor latch cams 702, 704 are rotated when the actuation post 782 contacts the second extensions 806, thereby rotating the floor latch cams 702, 704 and releasing engagement between the floor latch cams 702, 704 and the interlock links 920, 922. As previously discussed, the cables 812 are placed under tension when the first and second floor latch mechanisms 610, 612 are in the unlatched position. However, once the floor latch mechanisms 610, 612 are released, the tension in cables 812 is released due to the bias imparted on the cam fork 834 by coil spring 898. In this regard, a slack will be experienced in the cables 812, thereby allowing springs 925 to bias the interlock mechanism 918 into the locked position.

The interlock mechanism 918 will remain in the locked position until both of the first and second floor latch mechanisms 610, 612 are returned to the locked position. Specifically, as the interlock links 920, 922 are permitted to rotate independently, if only one of the floor latch mechanisms 810 or 812 returns to the locked position (i.e. a latched position, as previously discussed) only one of the cables 812 will return one of the respective links 920 or 922 to the unlocked position. If only one of the links 920, 922 is returned to the unlocked position, the other of the links 920, 922 will remain in contact with the interlock bar 924, thereby holding the interlock post 926 in the locked position proximate to the second end 952 of the slot 948 until both floor latch mechanisms 610, 612 are returned to the latched position.

With particular reference to FIGS. 38–44, the outboard mechanism 604 is shown to include inner and outer plates 964, 966 from which the second recliner mechanism 608 is operably supported. The second seatback support 620 is pivotally supported between the inner and outer plates 964, 966 and is in selective engagement with the second recliner mechanism 608 for pivotally positioning the second seatback support 620 relative thereto. An actuation lever 968 is pivotally supported by the inboard mechanism 602 and is in operable engagement with the second recliner mechanism 608 and the first and second kneel mechanisms 616, 618. In addition, the actuation lever 968 is operable to actuate the first recliner mechanism 606 of the inboard mechanism 602 via the second recliner mechanism 608, as will be discussed in more detail below.

The second seatback support 620 includes a generally triangular-shaped plate 970 having a pivot aperture 972 therethrough and an arcuate edge 974. A portion of the arcuate edge 974 includes a plurality of teeth 976 for selective engagement with the second recliner mechanism 608. Auxiliary apertures 978 are provided for attachment of a seatback frame (not shown) thereto and for attachment of a clamshell structure 980. The clamshell structure 980 serves to reinforce the plate 970 and provide the second seatback support 620 with increased strength and resistance to bending and includes a plurality of apertures 979 for attachment to plate 970.

The seatback support 620 is pivotally supported between the inner and outer plates 964, 966 by a seatback support pivot 982. The seatback support pivot 982 includes a keyed cylindrical portion 984, a first cylindrical section 986 having a bearing surface 988, and a second cylindrical section 990 having a diametric notch 992 formed therein. The support pivot 982 is received through a keyed aperture 994 of the outer plate 964, the pivot aperture 972 of the second seatback support 620, a pivot aperture 996 of the outer plate 966, and apertures 998 of the clamshell 980. The keyed cylindrical portion 984 aligns with the keyed aperture 994 of the inner plate 964 for fixing the support pivot 982 from rotating relative to the inner and outer plates 964, 966. The first cylindrical section 986 aligns within the pivot aperture 972 of the second seatback support 620 such that the second seatback support 620 pivots on bearing surface 988. The second cylindrical extension 990 aligns with the pivot aperture 996 of the outer plate 966 having the diametric notch 992 extending from an outer surface thereof.

The second seatback support 620 is biased by a coil spring 1000 including a central flat 1002 that engages the diametric notch 992 of pivot 982 and an outwardly extending arm 1004 that engages a post 1006 extending from the second seatback support 620 through attachment aperture 1008. The post 1006 includes a first cylindrical section 1010, a second cylindrical section 1012, a third cylindrical section 1014, a central cylindrical section 1016 received by attachment aperture 1008 of plate 970, and a fourth cylindrical section 1018. The first cylindrical section 1010 engages the extending arm 1004 of spring 1000 to bias the second seatback support 620 in a clockwise (CW) direction relative to the view shown in FIG. 38 while the fourth cylindrical section 1018 engages the outer plate 966 to define a range of motion of the second seatback support structure 620, as will be discussed further below.

Figure 38:
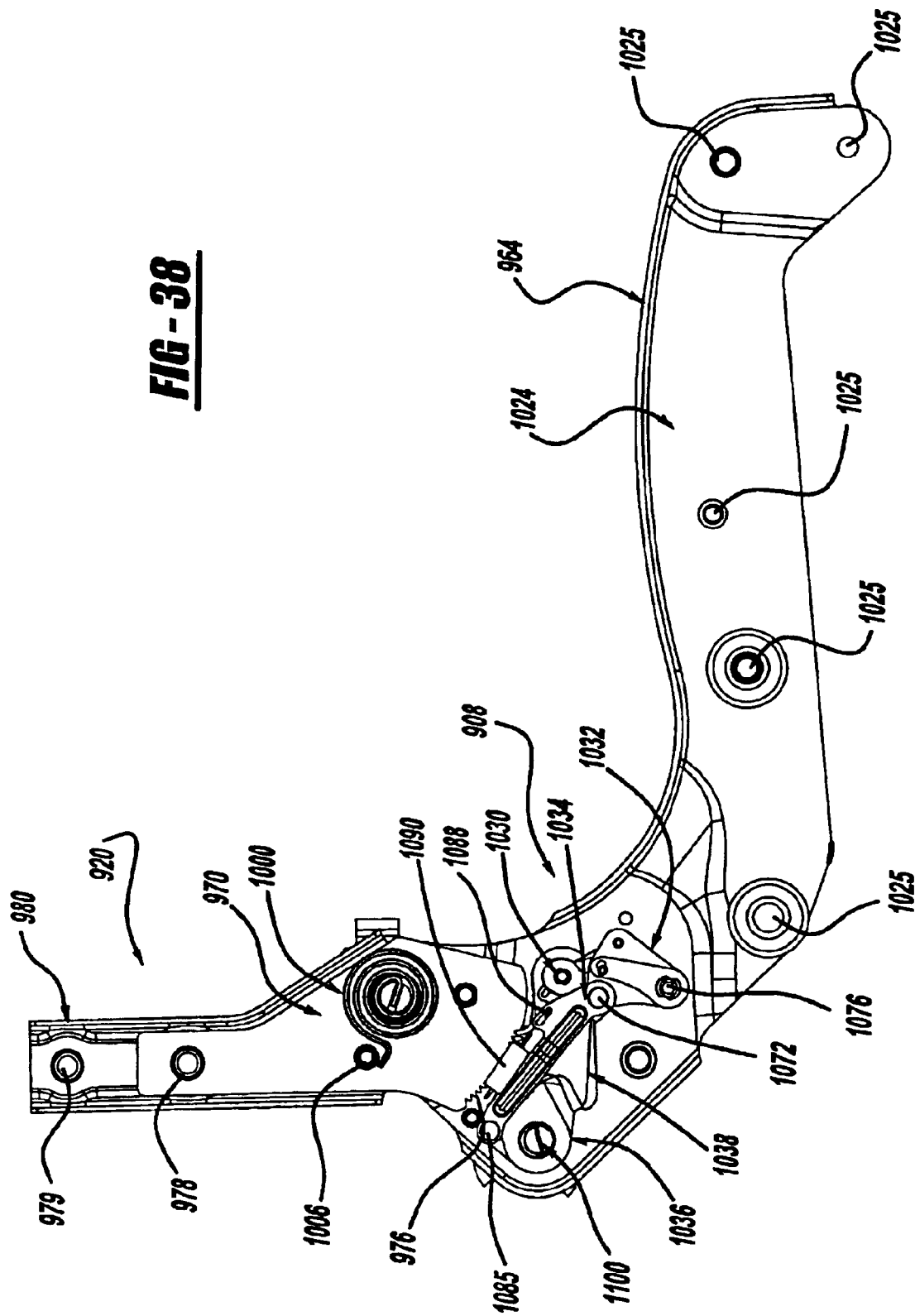
FIG. 38 is a side view of a first side of a second recliner mechanism in accordance with the principals of the present invention.

As the second seatback support 620 is caused to pivot relative to the inner and outer plates 964, 966, the post 1006 may abut the outer plate 966 at a first stop 1020 during rearward reclining or counterclockwise (CCW) rotation relative to the view shown in FIG. 38 to prohibit further pivotal motion of the second seatback support 920 relative to the inner and outer plates 964, 966. During forward pivoting or clockwise (CW) rotation of the second seatback support 620 relative to the view shown in FIG. 38, the post 1006 may abut a second stop 1022 and prevent further forward movement of the second seatback support 620 relative to the inner and outer plates 964, 966. In this manner, a range of pivotal motion of the second seatback support 620 is defined.

The inner plate 964 further includes an extension 1024 integrally formed therewith to further strengthen the inner plate 964 generally between the second recliner mechanism 608 and the second kneel mechanism 618. In addition, the outer plate 966 similarly includes an extension 1026 integrally formed therewith to further strengthen the outer plate 966 between the second recliner mechanism 608 and the second kneel mechanism 618, as best shown in FIGS. 38 and 41–44. The inner and outer plates 964, 966, as well as the extensions 1024, 1026 are held in a fixed relationship by a plurality of posts 1025, whereby the posts 1025 respectively received by a plurality of apertures 1027 formed in extensions 1024, 1026. The posts 1025 are operable to set the overall distance between the inner and outer plates 964, 966 and extensions 1024, 1026.

Figure 39:
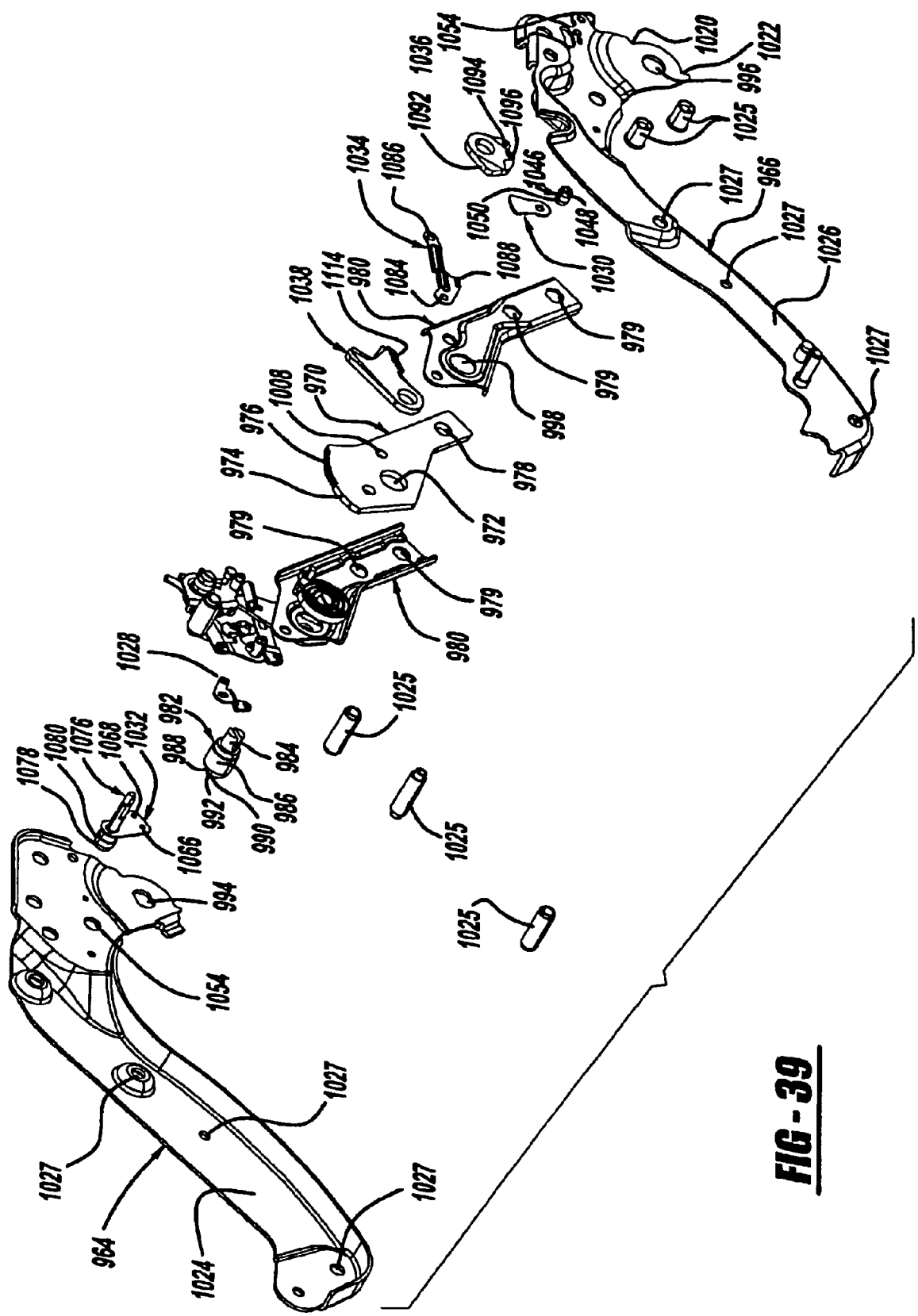
FIG. 39 is an exploded view of the second recliner mechanism of FIG. 38.
Figure 40:
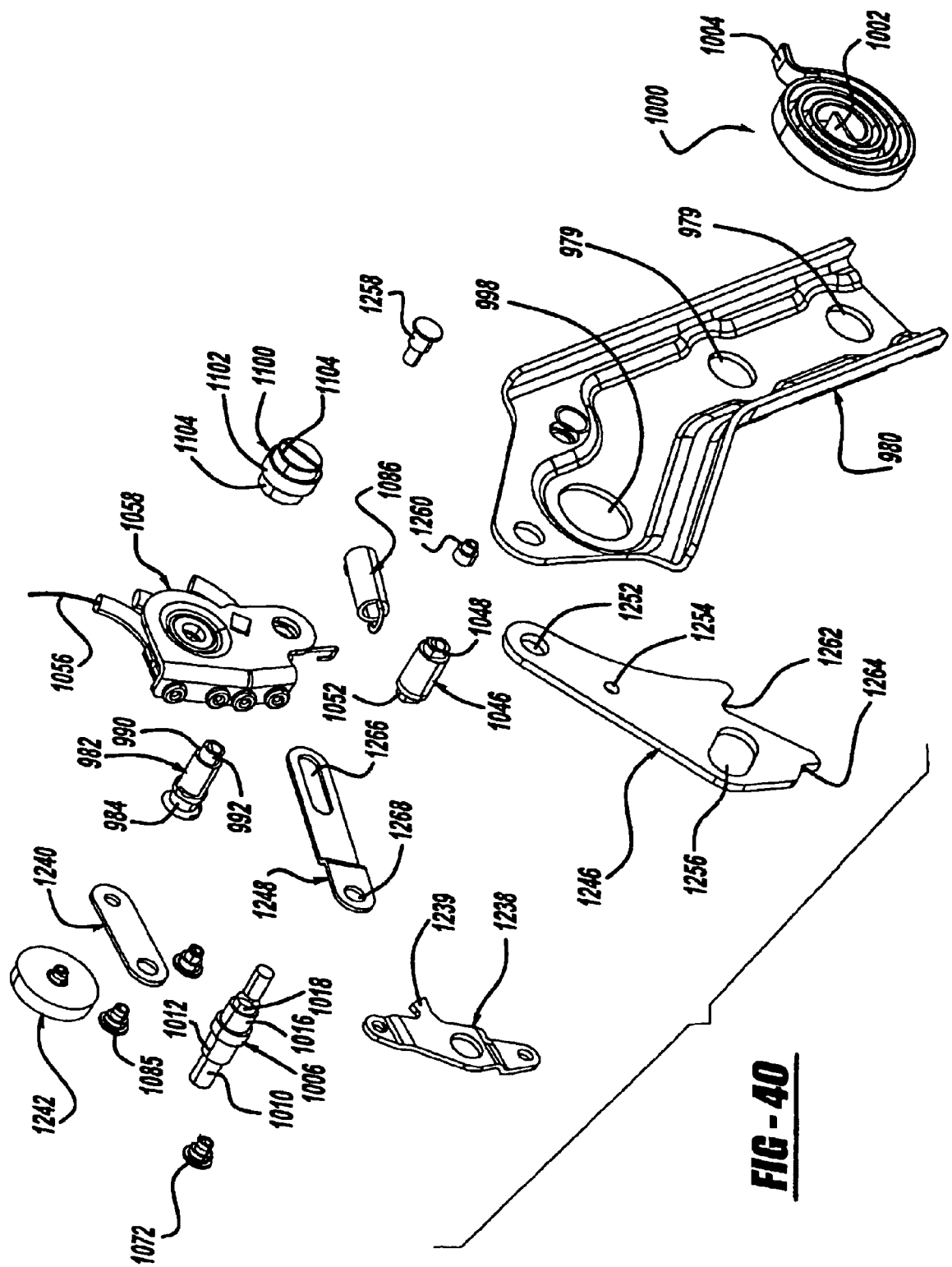
FIG. 40 is an exploded view showing a more detailed view of particular components of FIG. 39.
Figure 42:
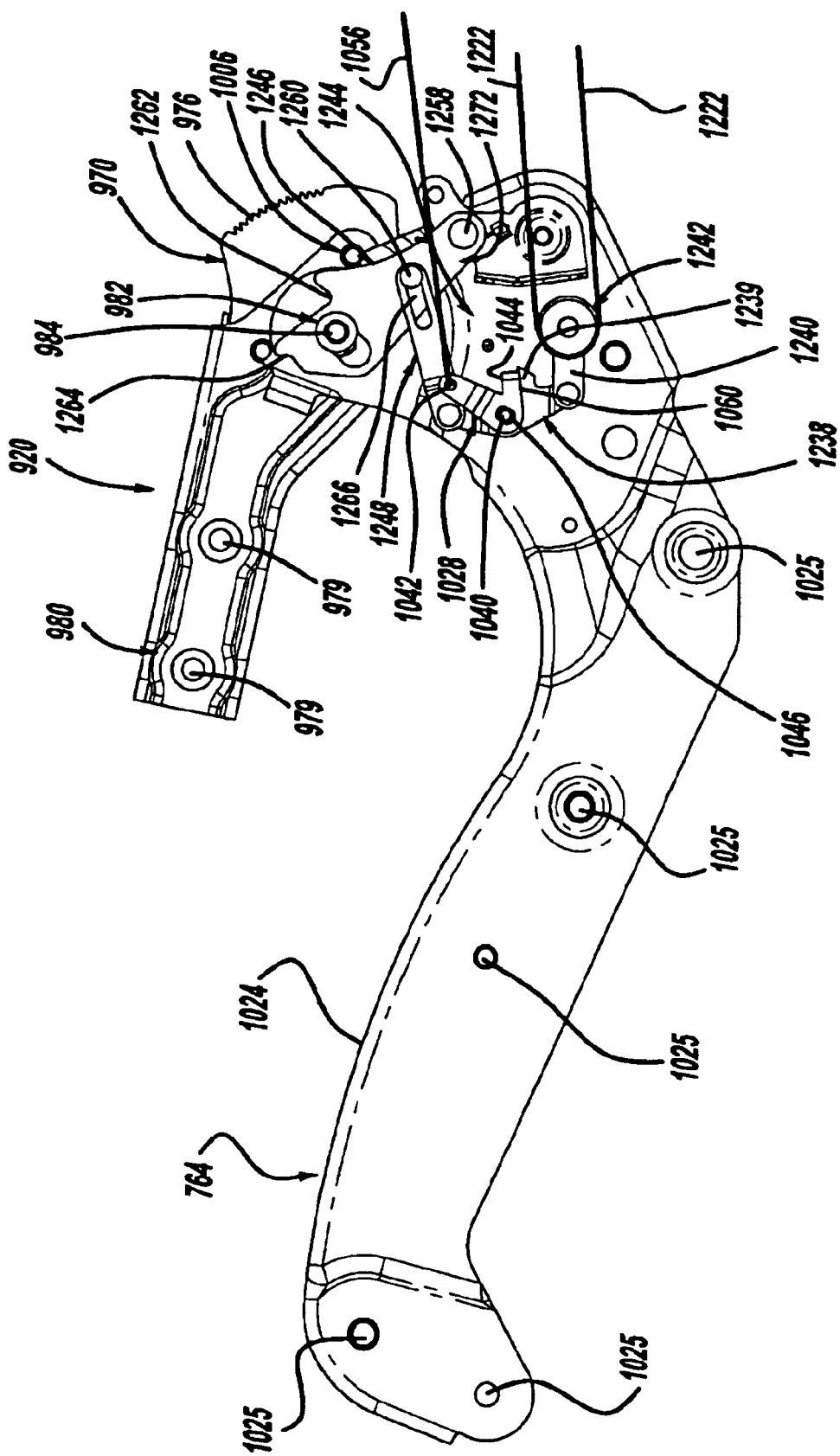
FIG. 42 is a side view of a second side of the recliner mechanism of FIG. 38 in a forward reclined position.

The first recliner mechanism 606 includes an actuation arm 1028, a key 1030, a main cam 1032, a transfer bar 1034, a lock cam 1036, and a pawl 1038. The actuation arm 1028 includes a keyed attachment aperture 1040, a cable aperture 1042, and an engagement arm 1044. The keyed attachment aperture 1040 receives a pivot 1046 such that the actuation arm 1028 is fixed for rotation with pivot 1046. Specifically, the pivot 1046 includes a first keyed portion 1048, a cylindrical portion 1050, and a second keyed portion 1052, whereby the first keyed portion 1048 is matingly received by the first keyed aperture 1040 of the actuation arm 1028 and the cylindrical portion 1050 is rotatably received by an attachment aperture 1054, as best shown in FIGS. 39 and 42. In this manner, the actuation arm 1028 is rotatably supported on an outer surface of the outer plate 966.

The cable aperture 1042 is formed opposite the keyed attachment aperture 1040 and receives a cable 1056 via a cable housing 1058 for communication with the first floor latch mechanism 610. Specifically, as the first floor latch mechanism 610 is released, cable 1058 will be placed under tension, thereby rotating the actuation arm 1028 to release the second recliner mechanism 608. The engagement arm 1044 extends from the actuation arm 1028 generally between the keyed attachment aperture 1040 and the cable aperture 1042 and includes a reaction surface 1060.

Figure 41:
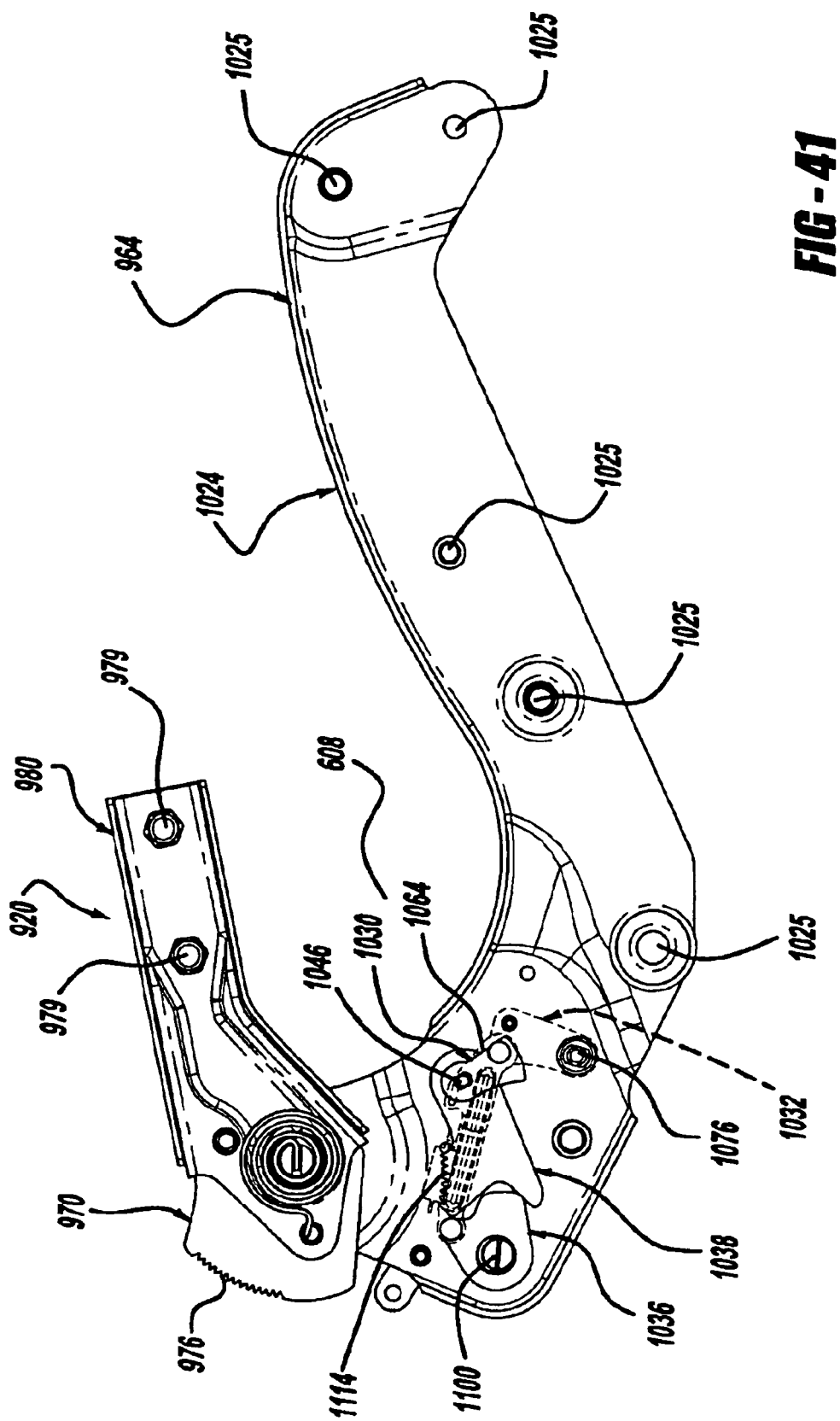
FIG. 41 is a side view of the first side of the recliner mechanism of FIG. 38 in a forward reclined position.
Figure 43:
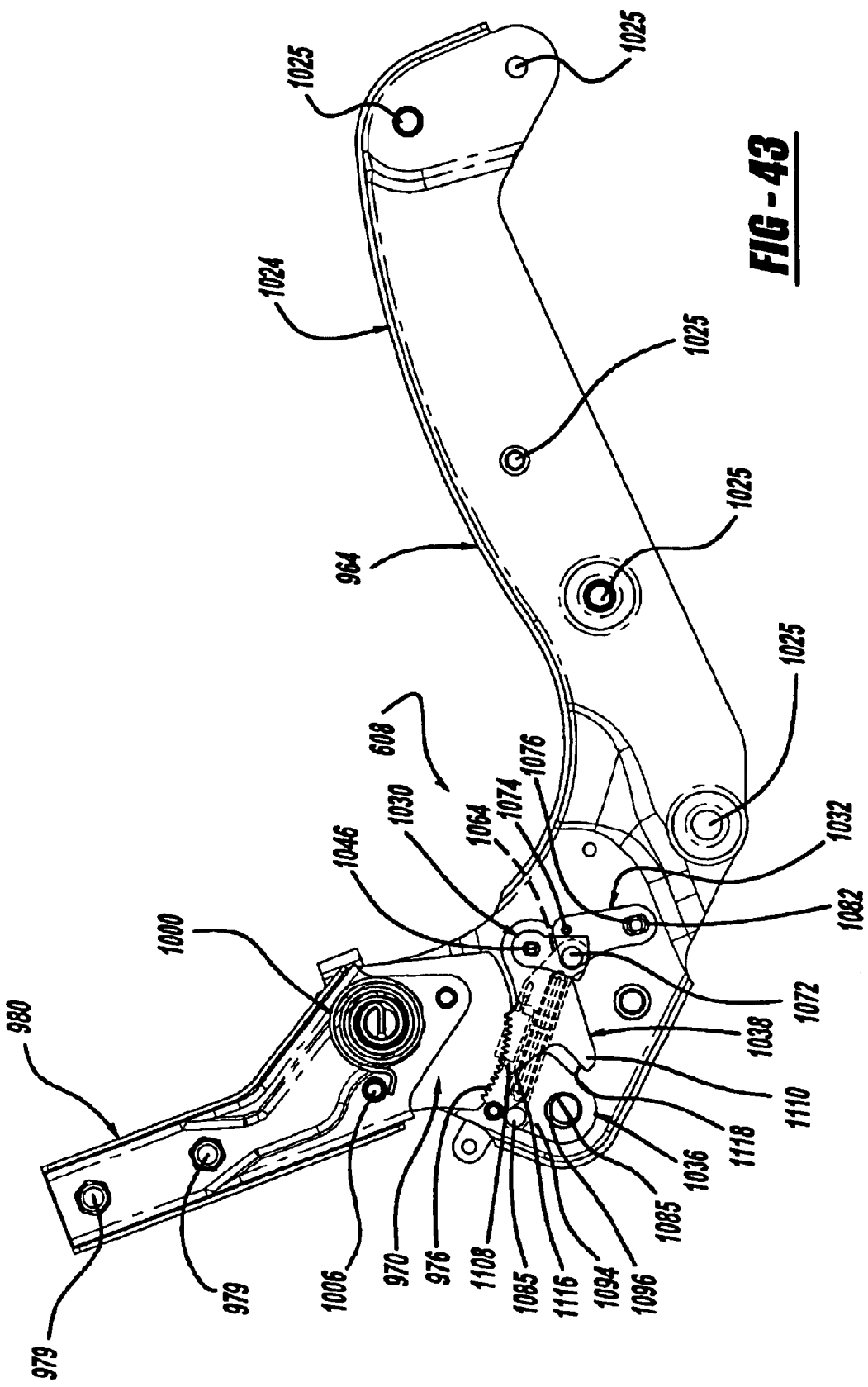
FIG. 43 is a side view of the first side of the recliner mechanism of FIG. 38 in a rearward reclined position.

The key 1030 is a generally flat member having a keyed attachment aperture 1062 and a reaction surface 1064. The keyed attachment aperture 1062 matingly receives the second keyed portion 1052 of pivot 1046 such that the key 1030 is fixed for rotation with pivot 1046 and actuation arm 1028. The reaction surface 1064 is formed along a side surface of the key 1030 for interaction with the main cam 1032, as best shown in FIGS. 41 and 43.

The main cam 1032 includes a first attachment aperture 1066, a second attachment aperture 1068, and a keyed pivot aperture 1070. The first attachment aperture 1066 fixedly receives a pivot 1072 for mechanical communication with the transfer bar 1036, as will be discussed further below. The second attachment aperture 1068 receives a pin 1074 for selective engagement with the reaction surface 1064 of the key 1030. The keyed pivot aperture 1070 receives a transfer pivot 1076 having a flanged end 1078 disposed proximate the inner plate 964, a cylindrical section 1080, and a keyed section 1082 extending thorough the outer plate 966. The cylindrical section 1080 extends through the inner and outer plates 964, 966 while the keyed section 1082 extends from the outer plate 966 generally toward the first recliner mechanism 606. The keyed section 1082 is operable to receive the cross-member 816 for mechanical communication between the first and second recliner mechanisms 606, 608, such that as the main cam 1032 is rotated, the cross-member 816 will concurrently be rotated. In this manner, the cross-member 816 is operable to release the first recliner mechanism 606 when the second recliner mechanism 608 is released.

The transfer bar 1034 includes a first attachment aperture 1084, a second attachment aperture 1086, and a spring slot 1088. The first attachment aperture 1084 receives pivot 1072 such that the transfer bar 1034 is operable to rotate relative to the main cam 1032. In other words, the transfer bar 1034 is operably coupled to the main cam 1032 such that as the main cam 1032 rotates about the transfer pivot 1076, the transfer bar 1034 will be translated. The second attachment aperture 1086 receives a second pivot 1085 for interaction with the lock cam 1036, as will be discussed further below. The spring slot 1088 receives a first end of a spring 1090, whereby the spring 1090 is operable to bias the transfer link 1034 and restrict rotation of the main cam 1032.

The lock cam 1036 includes a first extension 1092, a second extension 1094 having an attachment aperture 1096, and a central pivot aperture 1098. The central pivot aperture 1098 receives a pivot 1100 having a central cylindrical section 1102 and a pair of cylindrical sections 1104 flanking the central section 1102. The central cylindrical section 1102 is received by the central aperture 1098 while the each of the cylindrical sections 1104 are received by the inner and outer plates 964, 966, respectively. In this manner, the lock cam 1036 is rotatably supported between the inner and outer plates 964, 966. The first extension 1092 includes a reaction surface 1106 for selective engagement with the pawl 1034, as will be discussed further below. The second extension 1094 receives pivot 1085 such that the lock cam 1036 is rotatable relative to the transfer bar 1034. In this regard, as the transfer bar 1034 translates, the lock cam 1036 is caused to rotate about pivot 1100.

The pawl 1038 includes first and second extensions 1108, 1110 and a first attachment aperture 1112. The first extension 1108 includes a plurality of teeth 1110 for selective engagement with the teeth 976 of the second seatback support 620 for defining a plurality of pivotal positions (i.e., recline positions) of the seat-back support 620 relative to the inner and outer plates 964, 966 and an engagement face 1116 for interaction with the lock cam 1036, as will be described further below. The second extension 1110 includes an engagement face 1118 and is generally opposite the engagement face 1.116 such that a cam recess 1120 is defined therebetween. The pawl 1038 is pivotably supported between inner and outer plates 964, 966 by pivot 1046, as best shown in FIG. 39.

In operation, the second recliner mechanism 608 is operable to selectively permit and restrict movement of the second seatback support 620 relative to the inner and outer plates 964, 966. To unlock the second recliner mechanism 608, a force is applied to actuation lever 968, whereby the force is transmitted to the actuation cam 1028 via cable 1056. The force is operable to rotate the cam 1028 in the clockwise direction (CW) relative to the view shown in FIG. 42 such that the pivot 1046 and key 1030 are concurrently rotated in the counterclockwise direction (CCW) relative to the view shown in FIG. 42. Such rotation of the key 1030 causes the reaction surface 1064 of the key 1030 to engage the pin 1074 of the main cam 1032, thereby rotating the main cam 1032 in the clockwise direction (CW). Upon sufficient rotation of the key 1030, the transfer bar 1034 will translate in response to rotation of the main cam 1032, thereby causing the lock cam 1036 to disengage the first extension 1108 of the pawl 1038.

Once the lock cam 1036 disengages the first extension 1108, the first extension of the lock cam 1036 engages the second extension 1110 of the pawl 1038, thereby rotating the pawl 1038 in the counterclockwise direction (CCW) relative to the view shown in FIG. 38. At this point the teeth 1114 of the pawl 1038 disengage the teeth 976 of plate 970 such that the second seatback support 620 is permitted to rotate relative to the inner and outer plates 964, 966. Once the second recliner mechanism 608 is released, continued rotation of the actuation handle 968 causes the kneel mechanisms 616, 618 to be released, as will be discussed further below.

With particular reference to FIGS. 45–50, the first and second kneel mechanisms 614, 616 will be described in detail. As previously discussed, the first and second kneel mechanisms 614, 616 are operable to provide the inboard and outboard mechanisms 602, 604 with the ability to articulate forward or "kneel." As each of the first and second kneel mechanisms 614, 616 are substantially identical, only a detailed description of the first kneel mechanism 614 will be provided.

The first kneel mechanism 614 includes a first and second housing plate 1122, 1124, a slide pin 1126, a bracket 1128, a cam plate 1130, and a key 1132. The first and second housing plates 1122, 1124 each include an upper pivot aperture 1136 and a lower pivot aperture 1138. The upper pivot aperture 1136 receives a top pivot 1140 having a central cylindrical section 1142, a first pair of cylindrical sections 1144 flanking, and adjacent to, the central cylindrical section 1142, and a second pair of cylindrical sections 1146 adjacent to, and flanking, the first cylindrical sections 1144. The upper aperture 1136 fixedly receives the central cylindrical section 1142 such that the central cylindrical section 1142 defines the overall width between the inner and outer housing plates 1122, 1124, as best shown in FIG. 46. The upper pivot 1140 further includes a bore 1148 extending along the length of the pivot 1140 generally between second pair of cylindrical sections 1146, as best shown in FIG. 46. The bore 1148 roatably receives a cross-member 1150 such that the cross-member 1150 rotates within an inner diameter of the bore 1148 as the kneel mechanism 614 is articulated.

The lower pivot aperture 1138 fixedly receives a lower pivot 1152 such that the first and second housing plates 1122, 1124 rotate concurrently with the lower pivot 1152. The lower pivot 1152 includes a pair of keyed apertures 1154, a central cylindrical section 1156, and a cylindrical post 1158 extending therefrom. The lower pivot apertures 1138 matingly receive the keyed apertures 1154 such that the lower pivot 1152 is fixed for rotation with the first and second housing plates 1122, 1124. The cylindrical post 1158 extends from an outer surface of the second housing plate 1124 and includes a spring seat 1160. The spring seat 1160 receives a coil spring 1162 having a central flat 1164 and an arm 1166, whereby the central flat 1164 is fixedly received by the spring seat to bias the lower pivot 1124 in a first direction, as will be discussed further below.

The bracket 1128 is a generally L-shaped member having a substantially planer lower portion 1168 and a substantially planar upper portion 1170 extending from the lower portion 1168. The lower portion 1168 includes a pair of attachment apertures 1172 operable to fix the bracket 1128 to an external structure 1134 while the upper portion 1170 includes a central pivot aperture 1174, a pair of attachment apertures 1176, a cam surface 1180, and an arcuate slot 1178 defining a first end 1182 and a second end 1186. The upper portion 1170 is disposed between the first and second housing plates 1122, 1124 such that the central pivot aperture 1174 co-aligns with the lower pivot apertures 1138 of the first and second housings 1122,1124. In this manner, the central pivot aperture 1174 of the bracket 1128 rotatably receives the central cylindrical section 1156 of the lower pivot 1152. In other words, the first and second housing plates 1122, 1124 rotate relative to the bracket 1128 about the central cylindrical section 1156 of the lower pivot 1152, as will be discussed further below.

The slide pin 1126 includes a central cylindrical body 1188 and a pair of ears 1190 flanking the central cylindrical body 1188, as best shown in FIG. 46. The ears 1190 are slidably received by a pair of slots 1192 formed in the first and second housing plates 1122, 1124 and serve to define a range of motion for the slide pin 1126. Specifically, the motion of the slide pin 1126 is defined between a first end 1194 of the slots 1192 and a second end 1196 of the slots 1192, as best shown in FIGS. 45 and 47–50. The central cylindrical body 1188 further includes an engagement surface 1198 for interaction with the cam surface 1180 of the bracket 1128 when the first and second housing plates 1122, 1124 are rotated about the lower pivot 1152, as will be discussed further below.

The cam plate 1130 includes a central attachment aperture 1134 and an arm 837. The cam plate 1130 is rotatably supported between the first and second housing plates 1122, 1124 by a cam pivot 1200, whereby the cam pivot 1200 includes a keyed portion 1202, a pair of cylindrical portions 1204 fixedly received by a pair of apertures 1206 formed in the first and second housing plates 1122, 1124, and a central cylindrical section 1210. The cam plate 1130 fixedly receives the central cylindrical section 1210 at the central attachment aperture 1134 such that the cam pate 1130 is fixed for rotation with the cam pivot 1200. The arm 837 extends from the central attachment aperture 1134 and includes a reaction surface 1214 for selective engagement with the reaction surface 1198 of the slide pin 1126, as best shown in FIG. 46 and as will be discussed in greater detail below. In addition, one of the cylindrical sections 1204 includes spring slot 1205 formed therein for receiving a coil spring 1208.

The coil spring 1208 includes a central flat 1212 and an arm 1216. The central flat 1212 is received by the spring slot 1205 formed in the cam pivot 1200 while the arm 1216 engages a spring seat 1237. In this manner, the coil spring 91 serves to bias the cam plate 1130 in a clockwise direction (CW) relative to the view shown in FIG. 48. In this regard, the coil spring 1208 serves to bias the camp plate 1130 into engagement with the slide pin 1126 and lock the kneel mechanism 606 in the upright or usable position, as will be discussed further below.

The key 1132 is disposed on an outer surface of the outer plate 1122 and includes a keyed attachment aperture 1218 and a cable aperture 1220. The keyed attachment aperture 1218 is fixedly received by the keyed portion 1202 of the cam pivot 1200 such that the key 1132 is fixed for rotation with the cam 1130. The cable aperture 1220 (of each respective kneel mechanism 616, 618) receives an end of a cable 1222 for communication with the second recliner mechanism 608. The cable 1222 is received by the first kneel mechanism 606 by a cable housing 1226, whereby the cable housing 1226 is fixedly attached to the first and second housing plates 1122, 1124 at attachment apertures 1230 prior to being routed to the key 1132. It should be noted that second kneel mechanism 618 similarly receives a cable 1222 such that as the first kneel mechanism 616 is released, the second kneel mechanism 618 is similarly released.

To unlock the kneel mechanisms 616, 618, a force is applied to the actuation lever 968 to rotate the actuation arm 1028 and pivot 1046. As previously discussed, such force causes the second seatback support 620 to rotate relative to the inner and outer plates 964, 966 to position the second seatback support 620 in the fully reclined position. Once the second seatback support 620 is in the reclined position, further rotation of the actuation arm 1028 causes the engagement arm 1044 to contact a kneel plate 1238 at an extension 1239, thereby rotating the kneel plate 1238 about pivot 1046. The kneel plate is operably interconnected to a transfer link 1240 such that as the kneel plate 1238 is rotated about pivot 1046, the transfer link 1240 is caused to translate concurrently.

Translation of the transfer link 1240 causes a wheel 1242 to concurrently translate and impart a tensile force on cable 1222. As can be appreciated, such a tensile force on cable 1222 causes a force to be imparted on each kneel mechanism 616, 618 at the key 1132.

Upon sufficient rotation of the key 1132 and cam plate 1130 due to the force exerted thereon by cable 1222, the reaction surface 1214 of the cam plate 1130 will disengage the slide pin 1126 and allow the slide pin 1126 to travel along the slot 1192 from the second end 1196 to the first end 1194, effectively unlocking the kneel mechanism 606. Such movement of the slide pin 1126 will provide clearance for the slide pin 803 to travel along the cam surface 1180 of the bracket 1128 when an external force is applied to the first and second housing plates 1122, 1124 to rotate the first and second housing plates 1122, 1124 about the lower pivot 1152. In doing so, a pin 1232 is allowed to travel from the first end 1182 of the slot 1178 to the second end 1196 of the slot 1178, thereby allowing the first and second housing plates 1122, 1124 to rotate about the lower pivot 1152 along the arcuate surface 1178. In this manner, the overall length and shape of the slot 1178 generally governs the travel of the first and second housing plates 1122, 1124 relative to the bracket 1128 as the pin 1232 travels within slot 1178, as best shown in FIGS. 47–50. It should be understood that once the kneel mechanisms 616, 618 are in the unlocked position, the cable 1222 will return to a relaxed state, as will be discussed further below.

To further ensure that kneel mechanisms 606, 608 are returned to an upright or useable position, a secondary stop 1236 is provided to restrict rotational movement of the first and second housing plates 1122, 1124 relative to the bracket 1128. The stop 1236 is received by one of the attachment apertures 1176 of the lower bracket 1128, as best shown in FIG. 47. In this manner, as the kneel mechanisms 606, 608 are rotated into the usable position (i.e. from a kneeled or articulated position) the first and second housing plates 1122, 1124 will contact the stop 1236 and prevent further rotation of the first and second housing plates 1122, 1124 in the clockwise direction (CW) relative to the view shown in FIG. 48.

As can be appreciated, returning the kneel mechanisms 606, 608 to the upright or usable position requires an external force to be applied to the inboard and outboard mechanisms 606, 604. To reduce the required force, the coil spring 1162 serves to bias the upper and lower housings 1122, 1124 in the clockwise direction (CW) relative to the view shown in FIG. 48. Specifically, the arm 1166 of the coil spring 1162 engages the secondary stop 1236 such that a rotational force is applied to the first and second housing plates 1122, 1124 to aid in the return of the first and second kneel mechanisms 606, 608 to the upright or usable position. As can be appreciated, each RFK system 10 will be tailored to a particular application and may only require that a single coil spring 1162 be implemented on a single kneel mechanism 606, as shown in FIG. 18, while other systems may require that a coil spring 1162 be implemented on both of the first and second kneel mechanisms 606, 608.

The first and second kneel mechanisms 616, 618 are considered to be in the locked condition when the engagement surface 1214 of the cam plate 1130 is engaged with the slide pin 1126 such that the slide pin 1126 is wedged between the second end 1196 of the slot 1192 and the cam plate 1130. In this position, the slide pin 1126 effectively restricts movement of pin 803 within slot 1178 such that the first and second plates 1122, 1124 are restricted from rotating relative to the bracket 1128, as previously discussed.

The outboard mechanism 604 further includes a second interlock mechanism 1244 operable to prevent rotation of the second seatback support member 620 to an upright or usable position if at least one of the first or second kneel mechanisms 616, 618 is in the unlocked position. The first and second kneel mechanisms 616, 618 are considered to be in the locked condition when the slide pin 1126 is effectively locked against the bracket 1128 and held by the cam 1130.

The second interlock mechanism 1244 includes an interlock plate 1246 and an interlock link 1248. The interlock plate 1246 is a substantially flat member having an attachment aperture 1252, a pin aperture 1254, and a slot 1256. The attachment aperture 1252 receives a pivot 1258 such that the interlock plate 1246 is rotatably supported by pivot 1258 on an outer surface of plate 964. The slot 1256 slidably receives the first cylindrical section 984 of pivot 986 such that the rotational movement of the interlock plate 1246 is bounded by the slot 1256. The pin aperture 1254 fixedly receives a pin 1260 for interaction with the interlock link 1248, as will be discussed further below.

The interlock plate 1246 further includes a first notch 1262 and a second notch 1264 for interaction with the interlock pin 1250 to selectively prevent rotation of the second seatback support 620 relative to the inner and outer plates 964, 966.

The interlock link 1248 includes a slot 1266 and an attachment aperture 1268. The slot 1266 slidably receives the pin 1260 such that as the interlock plate 1246 rotates about pivot 1258, the pin 1260 travels along the slot 1266. The attachment aperture 1268 is rotatably attached to the kneel plate 1238 such that as the kneel plate 1238 rotates about pivot 1046, the interlock link 1248 is caused to translate. It should be noted that initial rotation of the kneel plate 1238 will not cause the interlock link 1248 to translate as the pin 1260 must travel sufficiently along the slot 1266 prior to engaging the slot at a second end 1270 to translate the interlock link 1248.

The interlock plate 1246 is biased into the locked position or clockwise (CW) relative to the view shown in FIG. 42 by a spring 1272 such that the interlock plate 1246 rotates toward the second seatback support 620. In this manner, the first and second notches 1262, 1264 are positioned to selectively receive the post 1006 to thereby lock the plate 970 relative to the inner and outer plates 964, 966 when at least one of the first or second kneel mechanisms 616, 618 are in the unlocked positoin, as will be described further below.

Upon release of the first and second kneel mechanisms 616, 618, cable 1222 is relaxed, thereby allowing the spring 1272 to bias the interlock plate 1246 in the clockwise direction (CW) relative to the view shown in FIG. 42. As can be appreciated, when the cable 1222 is taught, the interaction between wheel 1242, transfer link 1240, and kneel plate 1238 hold the interlock plate 1246 in a retracted position (via interlock link 1248 and pin 1260) against the bias of spring 1272. As previously discussed, the cable 1222 is only taught when the first and second kneel mechanisms 616, 618 are in the locked position. Once the kneel mechanisms 616, 618 are released (i.e. in the unlocked position) the cable 1222 is slack, thereby allowing the interlock plate 1248 to be rotated by spring 1272 such that post 1006 will engage either the first or second notch 1262, 1264, thereby preventing rotation of the second seatback support 620 relative to the inner and outer plates 964, 966.

It should be noted that while the RFK 600 has been described as including dissimilar inboard and outboard mechanisms 602, 604, any combination of inboard and outboard mechanisms is anticipated and should be considered as part of the present invention. For example, FIG. 18 depicts a smaller RFK construction such that the larger inboard mechanism 604 is unnecessary. In such a situation, two similar "inboard" mechanisms 602, 602' may be used, whereby the inboard mechanism 602 controls the second recliner mechanism 606 and kneel mechanisms 616, 618 and the outboard mechanism 602' controls the first recliner mechanism 606 and latch mechanisms 610, 612.

With reference to FIGS. 18–50, the operation of the RFK 600 will be described in detail. In a first mode, a force is applied to the actuation lever 628 to rotate the main pivot 748 and release the first seatback support 618 from engagement with the first recliner mechanism 606. Rotation of the main pivot 748 causes concurrent rotation of the recliner cam 692 to thereby release the pawl 690 from engagement with the teeth 636 of the first seatback support 618, as previously discussed. Once the teeth 714 of the pawl 690 are released from engagement with the teeth 636 of the first seatback support 618, the first seatback support 618 may be rotated relative to the inner and outer plates 624, 626 about pivot 642, as best shown in FIG. 30.

Once the first seatback support 618 has disengaged the pawl 690, continued rotation of the actuation lever 628 will cause the cam surface 736 of finger 734 to ride on the cam surface 682 of sector plate 676. In this manner, the sector plate 676 is operable to hold the paw 690 out of engagement with plate 630 until the first seatback support 618 is once again rotated into the upright or usable position.

Further rotation of the actuation lever 628 will cause the engagement leg 746 of the recliner cam 692 to engage the transfer cam 694, as best shown in FIG. 30. In this manner, the force applied to the actuation lever 628 is no longer rotating the recliner cam 692. As can be appreciated, such a relationship reduces the required force needed to further rotate the main pivot 748 and release the first and second floor latch mechanisms 610, 612.

At this point, further rotation of the actuation lever 628 and main pivot 748 causes the actuation post 782 to contact the first and second floor latch cams 702, 704, thereby rotating the cams 702, 704 and placing the cables 812 under tension. Upon further rotation of actuation handle 628, the floor latch cams 702, 704 will rotate such that the cables 812 are caused to rotate the cam fork 834 about pivot 886, as previously discussed.

Rotation of the cam fork 834 against the bias of the coil spring 898 causes the roller 838 to travel along the slot 884, thereby causing the lock lever 832 to disengage from the shoulder 856 of the claw 830. Once the extension 862 of the lock lever 832 disengages the shoulder 856 of the claw 830, the claw 830 is rotated in the clockwise direction (CW) relative to the view shown in FIG. 37 due to the bias imparted thereon by spring 874, thereby disengaging the striker 622 and unlocking the floor latch mechanisms 610, 612. Once the floor latch mechanisms 610, 612 are released from strikers 622, the RFK 600 may be rotated about pivot 840 into the dumped position. To aid in rotation of the RFK about pivot 840, a plurality of struts 1274 are provided, as best shown in FIG. 18.

As previously discussed, the first interlock mechanism 918 restricts rotation of the first seatback support 618 into the upright or usable position until both of the first and second floor latch mechanisms 610, 612 are returned to a latched position. To return the floor latch mechanisms 610, 612 to the usable position, a force is applied to the RFK 600 to rotated the RFK about pivot 840 such that the floor latch mechanisms 610, 612 approach the strikers 622. Once the floor latch mechanisms 610, 612 contact the strikers 622, the claw 830 is rotated against the bias of spring 874. When the claw 830 is rotated in the counterclockwise direction (CCW) relative to the view shown in FIG. 37, the claw 830 imparts a force on the lock lever 832 via the spring 874. Such force causes the lock lever 832 to rotate in the clockwise direction (CW) and engage the shoulder 856 of the claw 830, thereby locking the claw 830 in the latched position, as previously discussed.

Once the first and second floor latch mechanisms 610, 612 are in the latched position, the first interlock mechanism 918 will allow rotation of the first seatback support 618 relative to the inner and outer plates 624, 626. Specifically, the tension in cables 812 returns when the first and second floor latch mechanisms 610, 612 are returned to the latched condition, thereby causing the floor latch cams 702, 704 to rotate the interlock links 920, 922 against the bias of springs 925. Such rotation of the interlock links 920, 922 causes the interlock bar 924 to rotate in the clockwise direction (CW) relative to the view shown in FIG. 29, thereby removing the interlock post 926 from engagement with plate 630 of the first seatback support 618. Once the interlock post 926 has sufficiently cleared the plate 630, the first seatback support 618 may be rotated against the bias of coil spring 660 into the use position.

In a second mode, a force is applied to actuation lever 968 to first release the second seatback support 620 from engagement with the second recliner mechanism 608. Once the rotational force is applied to the actuation lever 968, the lever 968 will rotate actuation cam 1028 via cable 1056. The force is operable to rotate the cam 1028 in the clockwise direction (CW) relative to the view shown in FIG. 42 such that the pivot 1046 and key 1030 are concurrently rotated in the counterclockwise direction (CCW). Such rotation of the key 1030 causes the reaction surface 1064 of the key 1030 to engage the pin 1074 of the main cam 1032, thereby rotating the main cam 1032 in the clockwise direction (CW). Upon sufficient rotation of the key 1030, the transfer bar 1034 will translate in response to rotation of the main cam 1032, thereby causing the lock cam 1036 to disengage the first extension 1108 of the pawl 1038, as previously discussed.

Once the lock cam 1036 disengages the first extension 1108, the first extension of the lock cam 1036 engages the second extension 1110 of the pawl 1038, thereby rotating the pawl 1038 in the counterclockwise direction (CCW) relative to the view shown in FIG. 41. At this point the teeth 1114 of the pawl 1038 disengage the teeth 976 of plate 970 such that the second seatback support 620 is permitted to rotate relative to the inner and outer plates 964, 966. Once the second recliner mechanism 608 is released, continued rotation of the actuation handle 968 causes the kneel mechanisms 616, 618 to be released, as will be discussed further below.

At this point, the second seatback support 620 is in the fully reclined position such that further rotation of the actuation handle 968 causes operation of the first and second kneel mechanisms 616, 618. It should be noted that once the second recliner mechanism 608 is released from engagement with the second seatback support 620, pin 1074 will engage the key 1030 at a cam surface 1031 such that further rotation of pivot 1046 no longer rotates the main cam 1032. In this manner, the force applied to the actuation lever 968 is no longer rotating the main cam 1032. As can be appreciated, such a relationship reduces the required force needed to further rotate the pivot 1046 and release the first and second kneel mechanisms 616, 618.

Once the second recliner mechanism 608 is in the reclined position, further rotation of the actuation cam via cable 1056 will cause the first and second kneel mechanisms 616, 618 to release. Specifically, the force applied to the actuation lever 968 causes the engagement arm 1044 to contact a kneel plate 1238 at an extension 1239, thereby rotating the kneel plate 1238 about pivot 1046. The kneel plate is operably interconnected to a transfer link 1240 such that as the kneel plate 1238 is rotated about pivot 1046, the transfer link 1240 is caused to translate concurrently. Translation of the transfer link 1240 causes a wheel 1242 to concurrently translate and impart a tensile force on cable 1222. As can be appreciated, such a tensile force on cable 1222 causes a force to be imparted on each kneel mechanism 616, 618 at the key 1132, as previously discussed.

Upon sufficient rotation of the key 1132 and cam plate 1130 due to the force exerted thereon by cable 1222, the reaction surface 1214 of the cam plate 1130 will disengage the slide pin 1126 and allow the slide pin 1126 to travel along the slot 1192 from the second end 1196 to the first end 1194, effectively unlocking the kneel mechanism 606. Such movement of the slide pin 1126 will provide clearance for the slide pin 803 to travel along the cam surface 1180 of the bracket 1128 when an external force is applied to the first and second housing plates 1122, 1124 to rotate the first and second housing plates 1122, 1124 about the lower pivot 1152. In doing so, a pin 1232 is allowed to travel from the first end 1182 of the slot 1178 to the second end 1196 of the slot 1178, thereby allowing the first and second housing plates 1122, 1124 to rotate about the lower pivot 1152 along the arcuate surface 1178. It should be understood that once the kneel mechanisms 616, 618 are in the unlocked position, the cable 1222 will return to a relaxed state, as will be discussed further below.

As the cable 1222 is in a relaxed state, the second interlock mechanism 1244 will prevent the second seatback support 620 from returning to the upright or usable position. Specifically, the interlock plate 1246 is biased into the locked position by a spring 1272 such that the interlock plate 1246 rotates toward the second seatback support 620, as previously discussed. In this manner, the first and second notches 1262, 1264 are positioned to selectively receive the post 1006 to thereby lock the plate 970 relative to the inner and outer plates 964, 966, as previously discussed.

Figure 44:
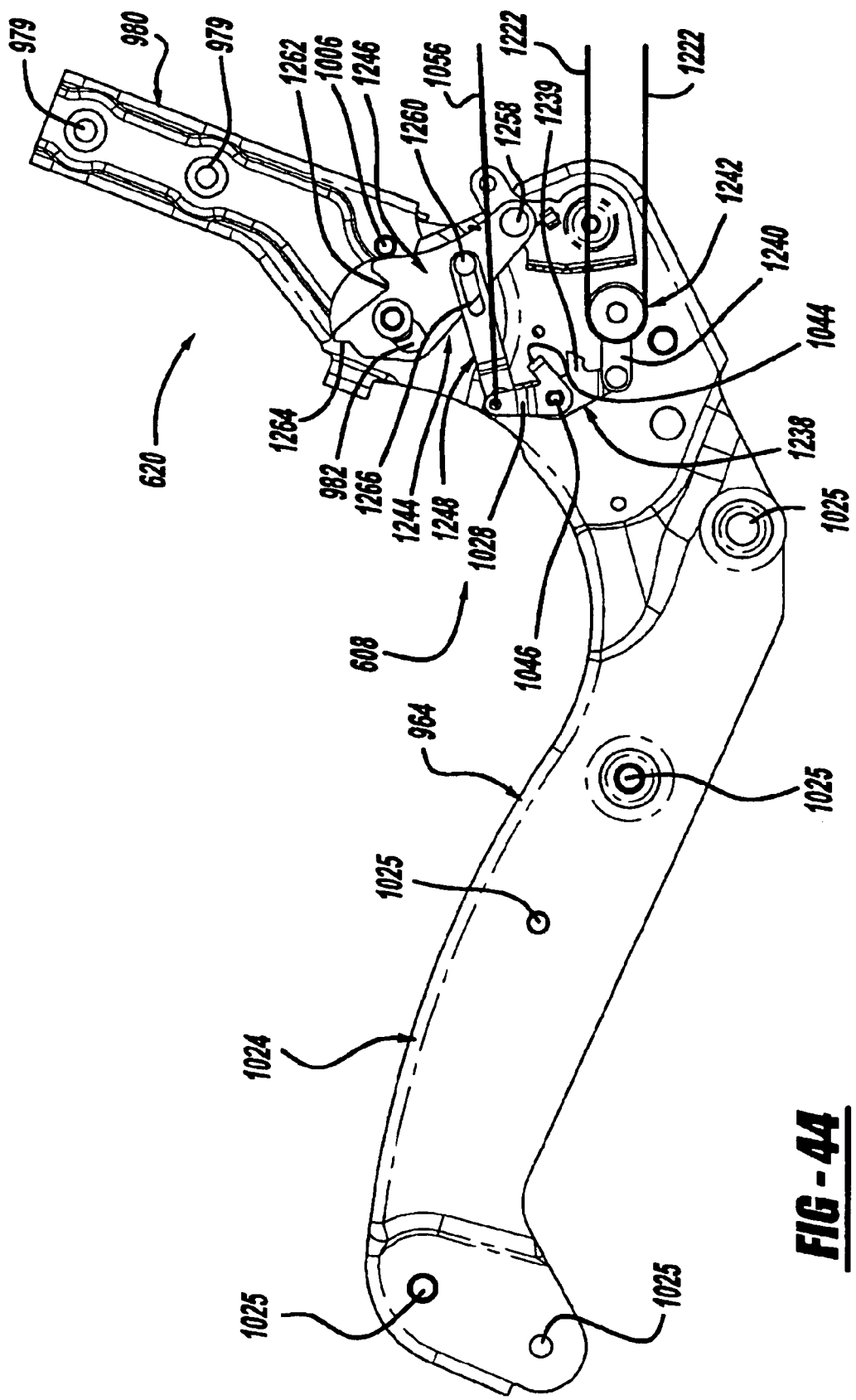
FIG. 44 is a side view of the second side of the recliner mechanism of FIG. 38 in a rearward reclined position.
Figure 49:
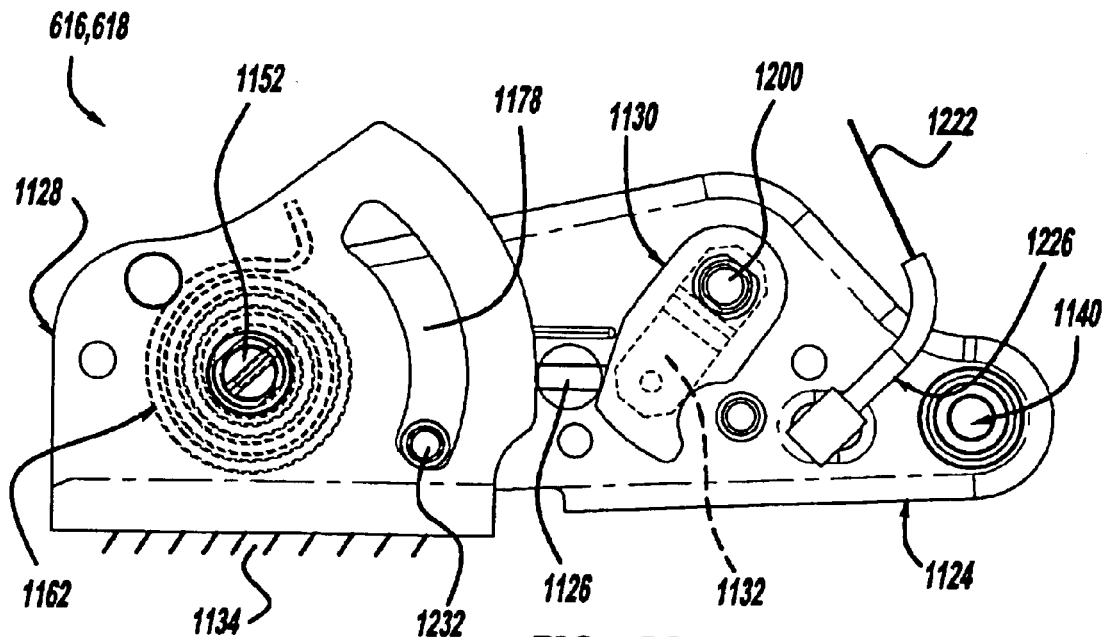
FIG. 49 is a side view of the first side of the kneel mechanism of FIG. 45 in an unlocked or kneeled position.
Figure 50:
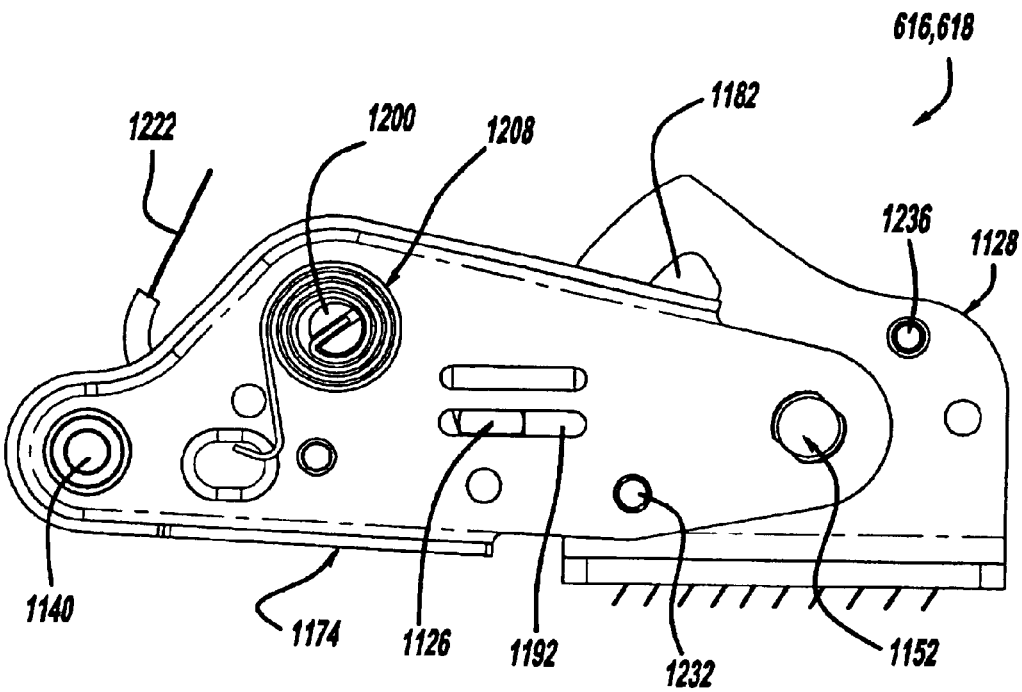
FIG. 50 is a side view of the second side of the kneel mechanism of FIG. 45 in an unlocked or kneeled position.

Upon release of the first and second kneel mechanisms 616, 618, cable 1222 is relaxed, thereby allowing the spring 1272 to bias the interlock plate 1246 in the clockwise direction (CW) relative to the view shown in FIG. 44. As can be appreciated, when the cable 1222 is taught, the interaction between wheel 1242, transfer link 1240, and kneel plate 1238 hold the interlock plate 1246 in a retracted position (via interlock link 1248 and pin 1260) against the bias of spring 1272. Once the kneel mechanisms 616, 618 are released (i.e. in the unlocked position) the cable 1222 is slack, thereby allowing the interlock plate 1248 to be rotated by spring 1272 such that post 1006 will engage either the first or second notch 1262, 1264, thereby preventing rotation of the second seatback support 620 relative to the inner and outer plates 964, 966.

To return the RFK 600 to a usable position, a force is applied to the RFK 600 until the engagement surface 1214 of the cam plate 1130 is engaged with the slide pin 1126 such that the slide pin 1126 is wedged between the second end 1196 of the slot 1192 and the cam plate 1130. In this position, the slide pin 1126 effectively restricts movement of pin 803 within slot 1178 such that the first and second plates 1122, 1124 are restricted from rotating relative to the bracket 1128, as previously discussed. At this point, the cable 1222 is placed under tension due to the rotation of key 1132.

The second interlock mechanism 1244 will permit rotation of the second seatback support 620 relative to the inner and outer plates 964, 966 once both the first and second kneel mechanisms 616, 618 are returned to the locked condition. Again, tension in cable 1222 will indicated that the kneel mechanisms 616, 618 are in the locked position.

Such tension in cable 1222 will cause the actuation arm 1028 to translate the interlock link 1248. Sufficient translation of the interlock link 1248 will cause the interlock plate 1246 to rotate in the counterclockwise direction (CCW) relative to the view shown in FIG. 44 such that the interlock plate 1246 is removed from engagement with the post 1006, thereby permitting rotation of the second seatback support 620 relative to the inner and outer plates 964, 966.

Once the interlock plate 1246 has been removed from engagement with the second seatback support 620, the second seatback support 620 may be rotated against the bias of coil spring 1000 and into the usable position. As previously discussed, the second seatback support 620 is held in the upright or usable position due to the interaction between the pawl 1038 and plate 970.

As described, the RFK 600 is operable in a first mode to enable recline or forward folding of a seatback relative to a seat, in a second mode to enable both forward folding of a seatback relative to a seat and forward dumping of a seat assembly, and in a third mode to allow forward articulation of a seat assembly or "kneeling". In addition, the RFK 600 is operable to restrict rotation of a seatback relative to a seat in the event that any of the floor latch mechanisms 610, 612 or kneel mechanisms 616, 618 are not in the locked or latched position due to the relationship between first and second interlock mechanisms 918, 1244, and the first and second recliner mechanisms 606, 608.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seat adjustment mechanism comprising a first latch mechanism, a first kneel mechanism and a first recliner mechanism operatively interconnected by a first interlock mechanism and associated with a seat frame, said first latch mechanism connected to said seat frame to allow rotation of said seat frame in an unlocked position of said first latch mechanism, said first kneel mechanism connected to said seat frame to allow translation of said seat frame in an unlocked position of said first kneel mechanism, said first recliner mechanism connected to said seat frame to allow adjustment of said seat frame, and said first interlock mechanism selectively blocking adjustment of said seat frame by said first recliner mechanism when either of said first latch mechanism or said first kneel mechanism is in said unlocked position.

2. The seat adjustment mechanism of claim 1, wherein said first interlock mechanism is movable between a first position and second position.

3. The seat adjustment mechanism of claim 1, wherein said first interlock mechanism is operably connected to said first latch mechanism by a first member and operably connected to said first kneel mechanism by a second member.

4. The seat adjustment mechanism of claim 3, wherein said first and second members are cables.

5. The seat adjustment mechanism of claim 1, further comprising a second recliner mechanism, a second latch mechanism and a second kneel mechanism, said second recliner mechanism in communication with said second latch mechanism and said second recliner mechanism and connected to said seat frame to allow adjustment of said seat frame.

6. The seat adjustment mechanism of claim 5, wherein said second recliner mechanism is in operable communication with said first recliner mechanism.

7. The seat adjustment mechanism of claim 5, wherein said second latch mechanism is in operable communication with said first latch mechanism.

8. The seat adjustment mechanism of claim 5, wherein said second kneel mechanism is in operable communication with said first kneel mechanism.

9. The seat adjustment mechanism of claim 5, wherein said second latch mechanism is in operable communication with said first recliner mechanism.

10. The seat adjustment mechanism of claim 5, wherein said second kneel mechanism is in operable communication with said first recliner mechanism.

11. The seat adjustment mechanism of claim 5, wherein said first latch mechanism is in operable communication with said second recliner mechanism.

12. The seat adjustment mechanism of claim 5, wherein said first kneel mechanism is in operable communication with said second recliner mechanism.

13. The seat adjustment mechanism of claim 5, further comprising a second interlock mechanism connected to said second recliner mechanism and operable between a locked state and an unlocked state to selectively restrict movement of said second recliner mechanism.

14. A seat adjustment mechanism comprising:
a first latch mechanism associated with a seat frame and including an unlocked position allowing rotation of said seat frame and a locked position preventing rotation of said seat frame;
a first kneel mechanism associated with said seat frame and including an unlocked position allowing translation of said seat frame and a locked position preventing translation of said seat frame; and
a first recliner mechanism coupled to said seat frame to provide selective rotation of one portion of said seat frame relative to another portion of said seat frame and interconnected to said first latch mechanism and said first kneel mechanism to prevent rotation of said one portion of said seat frame relative to said another portion of said seat frame when at least one of said first latch mechanism and said first kneel mechanism is in said unlocked state.

15. The seat adjustment mechanism of claim 14, further comprising a second recliner mechanism operable between a locked state and an unlocked state, a second latch mechanism operable between a locked state and an unlocked state, and a second kneel mechanism operable between a locked state and an unlocked state.

16. The seat adjustment mechanism of claim 15, wherein said second recliner mechanism is coupled to said seat frame, said second recliner mechanism providing selective rotation of said one portion of said seat frame relative to said another portion of said seat frame and interconnected to said second latch mechanism and said second kneel mechanism to prevent rotation of said one portion of said seat frame relative to said another portion of said seat frame when at least one of said second latch mechanism and said second kneel mechanism is in said unlocked state.

17. The seat adjustment mechanism of claim 15, wherein said second recliner mechanism is in operable communication with said first recliner mechanism.

18. The seat adjustment mechanism of claim 15, wherein said second latch mechanism is in operable communication with said first latch mechanism.

19. The seat adjustment mechanism of claim 15, wherein said second kneel mechanism is in operable communication with said first kneel mechanism.

20. The seat adjustment mechanism of claim 15, wherein said second latch mechanism is in operable communication with said first recliner mechanism.

21. The seat adjustment mechanism of claim 15, wherein said second kneel mechanism is in operable communication with said first recliner mechanism.

22. The seat adjustment mechanism of claim 15, wherein said first latch mechanism is in operable communication with said second recliner mechanism.

23. The seat adjustment mechanism of claim 15, wherein said first kneel mechanism is in operable communication with said second recliner mechanism.

24. A seat adjustment mechanism for a vehicle seat including a seat bottom supported by the vehicle and a seat back coupled to the seat bottom, said mechanism comprising:
- a first kneel mechanism connected to the vehicle seat, said first kneel mechanism having a locking mechanism providing translation of the seat bottom relative to the vehicle in an unlocked state and preventing translation of the seat bottom relative to the vehicle in a locked state; and
- a first recliner mechanism coupled to the seat bottom and seat back and providing selective rotation of the seat back relative to the seat bottom, said recliner mechanism preventing rotation of the seat back relative to the seat bottom when said first kneel mechanism is in said unlocked state.

25. The seat adjustment mechanism of claim 24, further including a first latch mechanism connected to the vehicle seat and providing rotation of the seat bottom relative to the vehicle in an unlocked state and preventing rotation of the seat bottom relative to the vehicle in a locked state.

26. The seat adjustment mechanism of claim 25, wherein said first latch mechanism is operably connected to said first recliner mechanism, said first recliner mechanism preventing rotation of the seat back relative to the seat bottom when said first latch mechanism is in said unlocked state.

27. An adjustable seat assembly, comprising:
- a seat bottom pivotably supported by first and second support members;
- a seat back pivotably connected to said seat bottom;
- a bottom support member pivotably supporting said first and second support members;
- a lower bracket pivotably supporting said bottom support member; and
- an adjustment mechanism comprising:
  - a first kneel mechanism connected to the seat assembly, said first kneel mechanism having a locking mechanism providing translation of said seat bottom relative to said lower bracket in an unlocked state and preventing translation of said seat bottom relative to said lower bracket in a locked state; and
  - a first recliner mechanism coupled to said seat bottom and said seat back and providing selective rotation of said seat back relative to said seat bottom, said recliner mechanism preventing rotation of said seat back relative to said seat bottom when said first kneel mechanism is in said unlocked state.

28. The adjustable seat assembly of claim 27, further including a first latch mechanism connected to the seat assembly and providing rotation of said seat bottom relative to said lower bracket in an unlocked state and preventing rotation of said seat bottom relative to said lower bracket in a locked state.

29. The adjustable seat assembly of claim 28, wherein said first latch mechanism is operably connected to said first recliner mechanism, said first recliner mechanism preventing rotation of said seat back relative to said seat bottom when said first latch mechanism is in said unlocked state.

* * * * *